(12) United States Patent
Ballentine et al.

(10) Patent No.: US 11,271,518 B2
(45) Date of Patent: Mar. 8, 2022

(54) MOUNTING BRACKET FOR MOUNTING PHOTOVOLTAIC MODULES TO TORQUE TUBE BEAM

(71) Applicant: OMCO SOLAR, LLC, Phoenix, AZ (US)

(72) Inventors: Andrew James Ballentine, Tempe, AZ (US); Garrett Scott Murphy, Phoenix, AZ (US); Milos Stancic, Tempe, AZ (US); David J. Wilson, Glendale, AZ (US)

(73) Assignee: OMCO Solar, LLC, Phoenix, AZ (US)

( * ) Notice: Subject to any disclaimer, the term of this patent is extended or adjusted under 35 U.S.C. 154(b) by 0 days.

(21) Appl. No.: 16/678,560

(22) Filed: Nov. 8, 2019

(65) Prior Publication Data

US 2020/0153382 A1 May 14, 2020

Related U.S. Application Data

(60) Provisional application No. 62/862,948, filed on Jun. 18, 2019, provisional application No. 62/757,541, filed on Nov. 8, 2018.

(51) Int. Cl.
*H02S 30/00* (2014.01)
*H02S 20/32* (2014.01)
(Continued)

(52) U.S. Cl.
CPC ............ *H02S 30/00* (2013.01); *F24S 25/636* (2018.05); *F24S 25/65* (2018.05); *F24S 25/67* (2018.05);
(Continued)

(58) Field of Classification Search
CPC .. H02S 30/00; H02S 20/32; F24S 2025/6004; F24S 25/67; F24S 25/65; F24S 30/425;
(Continued)

(56) References Cited

U.S. PATENT DOCUMENTS 3,999,389 A 12/1976 Bryce
4,100,915 A 7/1978 Carlson
(Continued)

FOREIGN PATENT DOCUMENTS

FR 2951208 4/2011
WO WO 2013/082125 6/2013

*Primary Examiner* — Ko H Chan
(74) *Attorney, Agent, or Firm* — Tarolli, Sundheim, Covell & Tummino LLP

(57) ABSTRACT

A mounting bracket assembly for securing facing edge portions of a pair of adjacent photovoltaic panels to a torque tube beam of a solar tracking assembly. The mounting bracket includes a mounting bracket and a fastener assembly including a securing strap for securing the mounting bracket to the torque tube beam. The mounting bracket includes: an upper support structure, a central attachment structure and a lower projection structure extending in a vertical direction downwardly away from the upper support structure. The upper attachment structure includes a first body and a second body spaced apart by the central attachment structure. The lower projection structure including a first rib extending vertically downwardly from the first body and a second rib extending vertically downwardly from the second body. A lower portion of the lower projection structure including a through slot sized to receive the torque tube beam.

25 Claims, 28 Drawing Sheets

(51) Int. Cl.
  *F24S 25/67*    (2018.01)
  *F24S 25/636*   (2018.01)
  *F24S 25/65*    (2018.01)
  *F24S 25/60*    (2018.01)

(52) U.S. Cl.
  CPC ....... H02S 20/32 (2014.12); *F24S 2025/6004* (2018.05); *Y02E 10/47* (2013.01); *Y02E 10/50* (2013.01)

(58) Field of Classification Search
  CPC ......... F24S 25/12; F24S 25/636; Y02E 10/50; Y02E 10/47
  See application file for complete search history.

(56) References Cited

U.S. PATENT DOCUMENTS

| | | | |
|---|---|---|---|
| 4,205,657 A | 6/1980 | Kelly | |
| 4,558,521 A * | 12/1985 | Steck | G01B 5/207 164/154.2 |
| 4,696,285 A | 9/1987 | Zwach | |
| 7,435,134 B2 * | 10/2008 | Lenox | F24S 25/20 439/567 |
| 7,677,242 B2 | 3/2010 | Carcangiu et al. | |
| D625,588 S | 10/2010 | Norris et al. | |
| D625,589 S | 10/2010 | Norris et al. | |
| 8,052,100 B2 | 11/2011 | Zante et al. | |
| 8,161,962 B2 | 4/2012 | Kuo | |
| 8,267,359 B2 | 9/2012 | Zante et al. | |
| 8,353,650 B2 | 1/2013 | Wiley et al. | |
| 8,480,041 B2 * | 7/2013 | Myers | F16L 3/1211 248/72 |
| 8,495,997 B1 | 7/2013 | Laubach | |
| 8,511,009 B2 * | 8/2013 | Kobayashi | F24S 25/61 52/173.3 |
| 8,757,567 B2 * | 6/2014 | Ciasulli | F24S 25/617 248/219.4 |
| 8,763,601 B2 | 7/2014 | Doyle | |
| 8,806,813 B2 | 8/2014 | Plaisted et al. | |
| 8,939,648 B2 | 1/2015 | Schneider et al. | |
| 8,991,114 B2 | 3/2015 | West | |
| 9,035,176 B2 * | 5/2015 | Keller | H01R 4/64 174/51 |
| 9,276,521 B2 * | 3/2016 | Reed | F24S 25/00 |
| 9,584,062 B2 | 2/2017 | Ganshaw et al. | |
| 9,660,569 B2 * | 5/2017 | Zuritis | H02S 20/10 |
| 9,806,669 B2 | 10/2017 | Michotte De Welle | |
| 2001/0004099 A1 | 6/2001 | Onishi | |
| 2009/0314280 A1 | 12/2009 | Banerjee | |
| 2010/0163015 A1 | 7/2010 | Potter et al. | |
| 2010/0275975 A1 | 11/2010 | Monschke et al. | |
| 2010/0294340 A1 | 11/2010 | Cunningham | |
| 2011/0179606 A1 | 7/2011 | Magno, Jr. et al. | |
| 2011/0214365 A1 | 9/2011 | Aftanas | |
| 2011/0240101 A1 | 10/2011 | Sagayama et al. | |
| 2011/0296773 A1 | 12/2011 | Kellerman | |
| 2012/0031488 A1 | 2/2012 | Kaufman et al. | |
| 2012/0102853 A1 | 5/2012 | Rizzo | |
| 2012/0227791 A1 | 9/2012 | Vari | |
| 2012/0312356 A1 | 12/2012 | Mizuo et al. | |
| 2012/0325761 A1 | 12/2012 | Kubsch et al. | |
| 2013/0193297 A1 | 8/2013 | Hartellus et al. | |
| 2013/0240466 A1 | 9/2013 | Sponseller | |
| 2013/0334151 A1 | 12/2013 | Kanczuzewski et al. | |
| 2013/0335877 A1 | 12/2013 | Keller | |
| 2015/0000725 A1 | 1/2015 | Reilly et al. | |
| 2015/0183066 A1 | 7/2015 | Lippert et al. | |
| 2015/0184896 A1 | 7/2015 | Lippert et al. | |
| 2015/0222218 A1 | 8/2015 | Koyama | |
| 2016/0111997 A1 | 4/2016 | Ganshaw et al. | |
| 2017/0102168 A1 | 4/2017 | Childress | |
| 2017/0104445 A1 | 4/2017 | Depauw | |
| 2017/0133975 A1 | 5/2017 | Ganshaw et al. | |
| 2017/0310275 A1 | 10/2017 | Owen et al. | |
| 2017/0346437 A1 | 11/2017 | Owen | |
| 2017/0359017 A1 * | 12/2017 | Corio | H02S 20/32 |
| 2018/0062567 A1 * | 3/2018 | Oh | F24S 25/632 |
| 2018/0123505 A1 | 5/2018 | Prat et al. | |
| 2018/0335067 A1 | 11/2018 | Owen | |
| 2019/0341878 A1 * | 11/2019 | Watson | H02S 20/10 |

\* cited by examiner

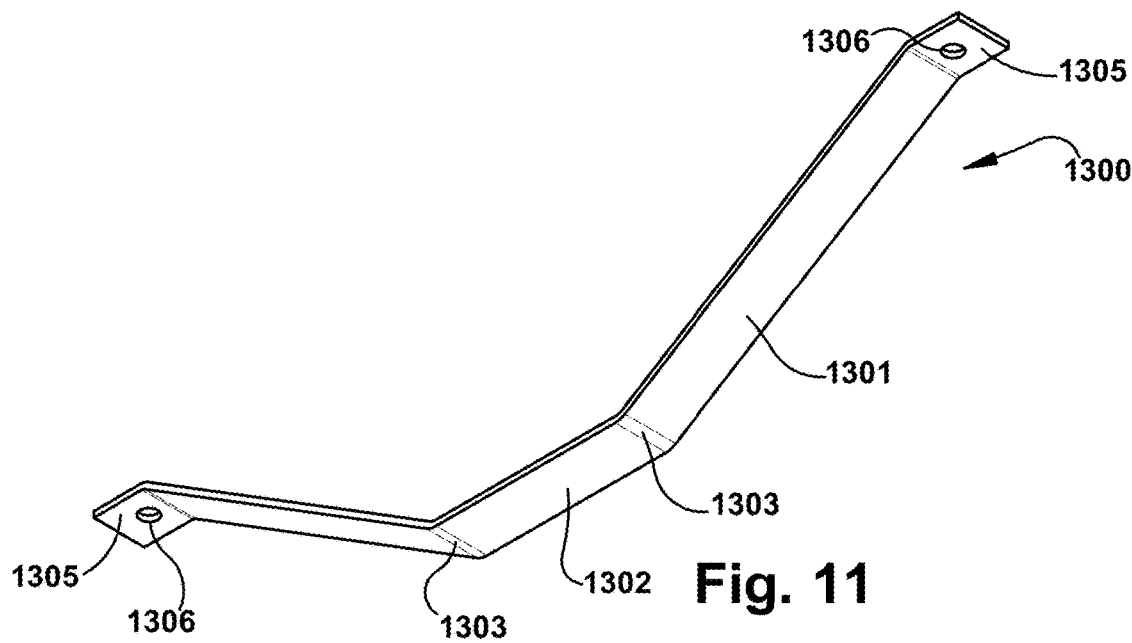
Fig. 11
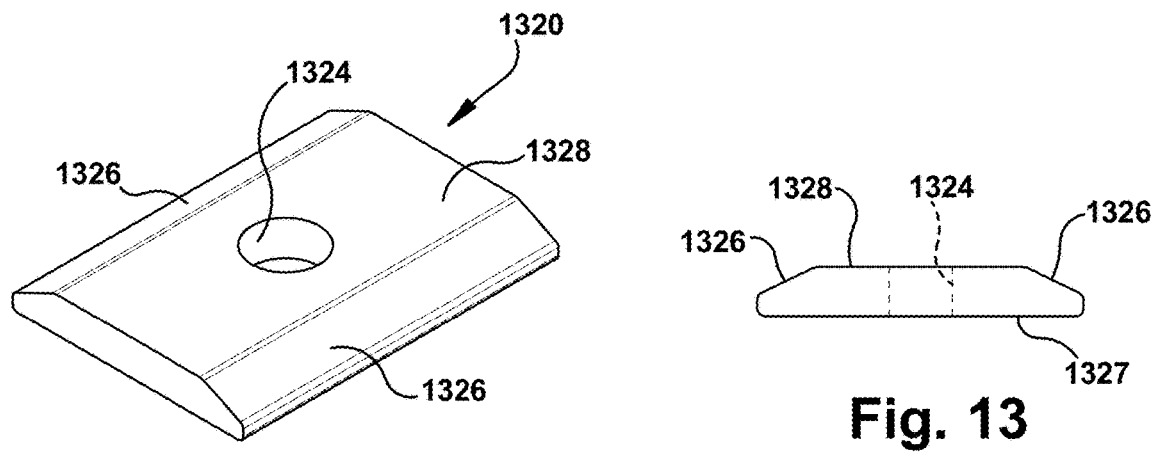
Fig. 12
Fig. 13

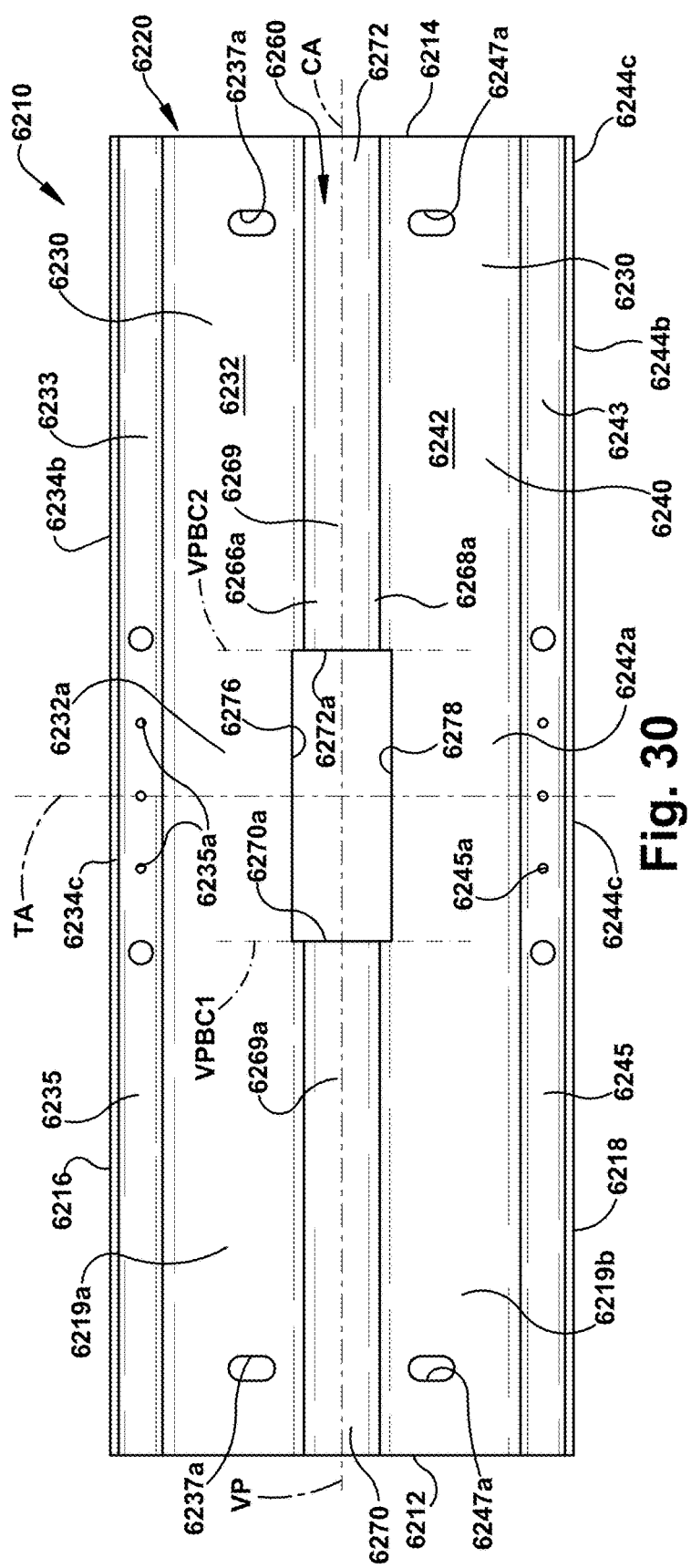
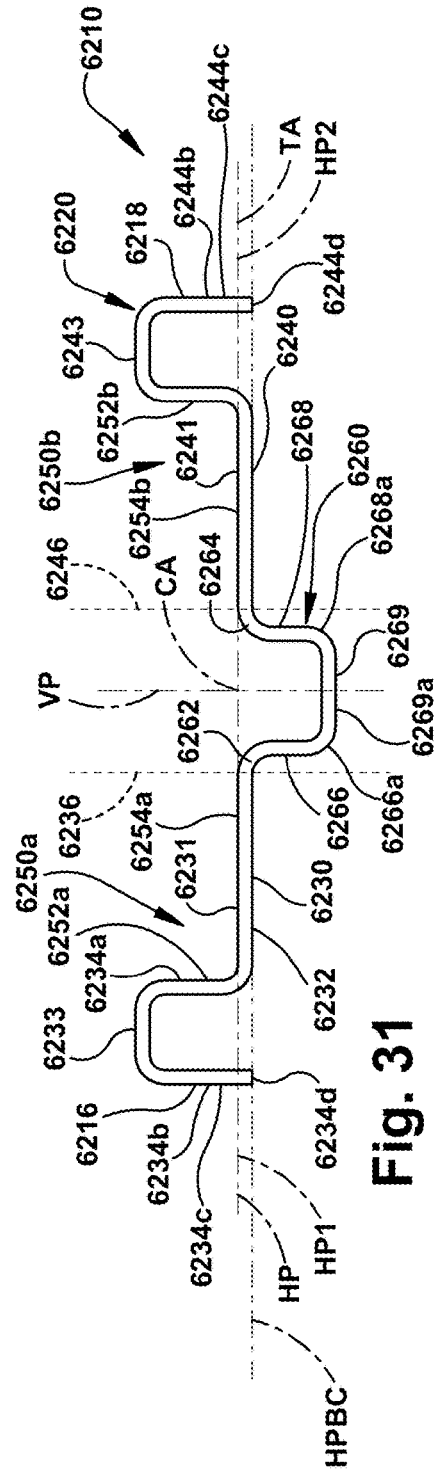
Fig. 30
Fig. 31

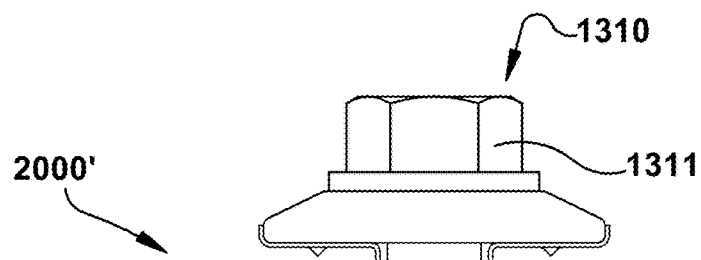
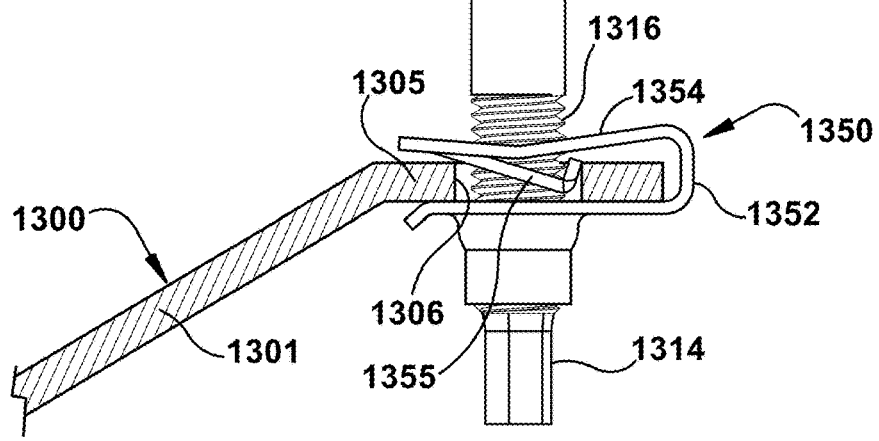
Fig. 37
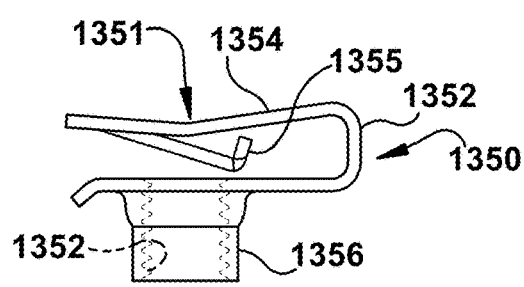
Fig. 38
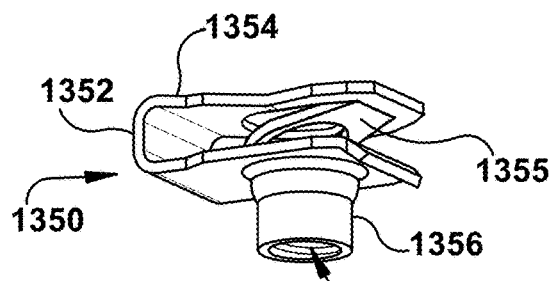
Fig. 39

MOUNTING BRACKET FOR MOUNTING PHOTOVOLTAIC MODULES TO TORQUE TUBE BEAM

CROSS REFERENCE TO RELATED APPLICATIONS

The following application claims priority under 35 U.S.C. § 119(e) to U.S. Provisional Patent Application Ser. No. 62/862,948, filed Jun. 18, 2019, entitled Mounting Bracket Assembly For Mounting Photovoltaic Modules to Torque Tube Beam and to U.S. Provisional Patent Application Ser. No. 62/757,541, filed Nov. 8, 2018, entitled Mounting Bracket For Mounting Photovoltaic Modules to Torque Tube Beam. The above-identified U.S. provisional patent applications are incorporated herein by reference in their respective entireties for any and all purposes.

TECHNICAL FIELD

The present disclosure relates to a mounting bracket assembly for a solar tracker system and more specifically to a mounting bracket assembly for securing facing edge portions of a pair of adjacent photovoltaic modules to a torque tube beam of a solar tracker system.

BACKGROUND

Various types of solar tracker systems are known including a horizontal, single axis solar tracker system. A horizontal, single axis solar tracker system includes a torque tube beam and a plurality of photovoltaic modules. The plurality of photovoltaic modules is coupled to the torque tube beam via various components including mounting brackets, clamps and fasteners. The torque tube beam is typically comprised of one or more torque tube beam segments affixed in a linear fashion by couplers between adjacent segment ends. The torque tube beam may be comprised of a plurality of segments of predetermined length, i.e., 40 foot segments. The modules of the plurality of photovoltaic modules are typically spaced uniformly along the torque tube beam. The solar tracking system includes a table which includes everything that pivots or swings about an axis of rotation. The table of the solar tracking system includes: a) the torque tube beam; b) the plurality of photovoltaic modules; c) the movable or pivoting portions of a plurality of solar tracking bearing apparatuses that support the torque tube along its length; and d) various mounting components, such as module rails, clamps, brackets and/or fasteners, which are used to affix the plurality of photovoltaic modules to the torque tube beam. The axis of rotation of the table of the solar tracker system extends parallel to the torque tube beam and is defined by the axes of rotation of the pivoting portions of a plurality of solar tracking bearing apparatuses. A solar tracking system may comprise a single row layout, i.e., a single torque tube beam extending in a north-south direction or, alternately, a solar tracking system may comprise an array of solar tracking systems comprised of multiple parallel rows of solar tracking systems, that is, an array including multiple, spaced apart, parallel rows of torque tube beams, each extending in a north-south direction.

An extent of the table of a solar tracking system extends in two dimensions, length, generally perpendicular to the path or arc of the sun in the sky, and width, generally parallel to the path of sun in the sky. An actuator mechanism, such as a slew drive, is coupled to the torque tube beam to pivot or swing the torque tube beam about the axis of rotation to change an angle of inclination of the frame and thereby adjust the light receiving surfaces of the plurality of photovoltaic modules to track the movement of the sun across the sky so that the photovoltaic modules are maximally exposed to the sun throughout the day. That is, the goal of the solar tracker system is to move or pivot the table about an axis of rotation such that the light receiving surfaces of the photovoltaic modules is generally orthogonal to the position of the sun, within, of course, the limits of the angle of inclination range of the solar tracking system table.

In one typical embodiment of a horizontal, single axis solar tracker system, the torque tube beam extends horizontally along the length of the table and, to achieve a proper balance, plurality of photovoltaic modules are positioned such that each is centered about the torque tube beam so that a total weight of the frame and the plurality of photovoltaic modules; and associated mounting components (e.g., module rails, clamps, brackets and fasteners), is approximately equally distributed on either side of the torque tube beam. A slew drive is approximately centered along the length of the torque tube beam and includes first and second couplers. A first portion of the torque tube beam is affixed to and extends from the first journal on one side of the slew drive and a second portion of the torque tube beam is affixed to and extends from the second journal on the opposite side of the slew drive. For example, the first portion of the torque tube beam may extend north from the slew drive and may be comprised of five, 40-foot torque tube beam segments, while, the second portion of the torque tube beam may extend south from the slew drive and may similarly be comprised of five, 40-foot torque tube beam segments, thus providing a total north-south extent or length of the torque tube beam of 400 feet. Couplers are used between adjacent torque tube beam segments to splice the two torque tube beam segments together. The slew drive pivots the table about the axis of rotation of the table.

The torque tube beam is supported for pivoting movement about the axis of rotation by the plurality of solar tracker bearing apparatuses. Each of the solar tracker bearing apparatuses are affixed to a respective one of a plurality of spaced apart upright support posts which are anchored to or anchored in a substrate, such as the ground. The upright support posts are stationary and support the plurality of solar tracker bearing apparatuses, which, in turn, pivotally support the frame and the plurality of photovoltaic modules. Typically, one solar tracker bearing apparatus is mounted or coupled to each upright support post. Each solar tracker bearing apparatus includes a stationary portion, affixed to a support post, and a rotating portion supporting the torque tube beam, which rotates about the axis of rotation. Additionally, the slew drive is also mounted to its own support post.

The plurality of solar tracker bearing apparatuses pivotally support the torque tube beam for movement or pivoting about the axis of rotation. The actuator/controller mechanism, i.e., the slew drive, coupled to the torque tube beam provides the motive force to pivot the table about the axis of rotation and thus change the angle of inclination of the table. The plurality of solar tracker bearing apparatuses rotatably disposed between the torque tube beam and the upright support posts permit the torque tube beam to pivot with respect to the upright support posts and thereby allows the angle of inclination of the table to be changed by the slew drive such that the plurality of photovoltaic modules is maximally exposed to the sun within the range of the angle of inclination of the solar tracking system. The axis of rotation of the table of the solar tracker system is defined by a combination of aligned individual axes of rotation of the individual solar tracker bearing apparatuses. The slew drive is positioned such that it pivots the torque tube beam about the axis of rotation. In a solar tracking system that includes an array of multiple, spaced apart, parallel rows of torque tube beams, each extending in a north-south direction, each row may include an independent slew drive coupled to the torque tube beam to pivot the table. Alternately, the torque tube beams of multiple rows may be mechanically coupled such that a single, larger slew drive, or another type of drive, may be used to pivot the respective tables of the multiple rows in unison.

Solar tracker systems are often erected or installed at remote locations where sun exposure is maximized. As such, the solar tracker system components are utilized in outdoor locations, exposed to varying and potentially harsh weather conditions such as high wind and snow conditions. Under high wind load and snow load conditions, the mounting components of the table must be sufficiently strong and stable to mount the photovoltaic modules securely to the torque tube beam and mitigate undue flexing or wiggling of the mounting components and the photovoltaic modules.

Various combinations and configurations of module rails, brackets, clamps and fasteners have been successfully used in conventional solar tracker systems to mount the photovoltaic modules to the torque tube. The more table components used, however, adds expense and complexity to a solar tracker system. That is, the use of module rails, brackets and clamps in a solar tracker system table increases material cost and increases the labor cost associated with assembling the table on location.

Moreover, the use of mounting components between adjacent photovoltaic modules necessarily creates a gap between the modules, as measured along the torque tube beam, typically, gaps may be on the order of 1 inch or more. Such large module gaps are undesirable because: a) to support a desired number of photovoltaic modules, the larger the module gap size, the greater the length of the torque tube beam will be, thereby increasing the overall length of the solar tracker system and, therefore, increasing the total cost of the solar tracker assembly; and b) the larger the gap size between adjacent photovoltaic modules, the lower the "ground coverage ratio" of the solar tracker assembly. The "ground coverage ratio" is an efficiency measure commonly used in the industry that is a ratio of the total effective solar collection area of the photovoltaic modules to the total area, as viewed in plan view, or footprint of the solar tracker system.

Accordingly, to the extent that the table of a solar tracker system utilizes a plurality of mounting bracket assemblies to mount the photovoltaic modules to the torque tube beam, it is desirable that the mounting bracket assemblies be sufficiently strong and stable to mount the photovoltaic modules to the torque tube beam such that, even under high wind load and/or snow load conditions, the mounting bracket assemblies are sufficiently strong and stable to mount the photovoltaic modules securely to the torque tube beam and mitigate undue flexing or wiggling of the mounting bracket assemblies and the photovoltaic modules. It is also desirable to utilize mounting bracket assemblies that, to the extent possible, minimize the gap between adjacent photovoltaic modules and thereby increase ground coverage ratio of the solar tracker system. Finally, it is desirable that the mounting bracket assemblies be design to minimize the number of different components necessary to securely mount the photovoltaic modules to the torque tube beam.

SUMMARY

In one aspect, the present disclosure relates to a mounting bracket for mounting to a torque tube beam of a solar tracking assembly and for supporting respective edge portions of a pair of photovoltaic modules, the mounting bracket comprising: an upper support structure, a central attachment structure and a lower projection structure extending in a vertical direction downwardly away from the upper support structure, the mounting bracket including a first end and a spaced apart second end defining a length of the mounting bracket with respect to a first direction and a first side and a second side defining a width of the mounting bracket in a second direction, the first direction and the second direction being mutually orthogonal and transverse to the vertical direction, the mounting bracket bisected by a central vertical plane extending in the first direction; the upper support structure of the mounting bracket including a first body and a second body spaced apart and spaced from the central vertical plane by the central attachment structure, the first body including a first upper support surface for supporting an edge portion of a first photovoltaic module and the second body defining a second upper support surface for supporting an edge portion of a second photovoltaic module; and the lower projection structure extending vertically downward with respect to the first and second bodies, a first rib extending vertically downwardly from the first body, a second rib extending vertically downwardly from the second body, a lower portion of the lower projection structure including a through slot, an extent of the through slot in the first direction being sized to receive a torque tube beam.

In another aspect, the present disclosure relates to a combination of a mounting bracket assembly and a torque tube beam of a solar tracking assembly, the mounting bracket assembly mounted to the torque tube beam and for supporting respective edge portions of a pair of photovoltaic modules, the combination comprising: the torque tube beam including an upper wall and a lower wall spaced apart by first and second vertically extending side walls; the mounting bracket assembly including: a mounting bracket including: an upper support structure, a central attachment structure and a lower projection structure extending in a vertical direction downwardly away from the upper support structure, the mounting bracket including a first end and a spaced apart second end defining a length of the mounting bracket with respect to a first direction and a first side and a second side defining a width of the mounting bracket in a second direction, the first direction and the second direction being mutually orthogonal and transverse to the vertical direction, the mounting bracket bisected by a central vertical plane extending in the first direction; the upper support structure of the mounting bracket including a first body and a second body spaced apart and spaced from the central vertical plane by the central attachment structure, the first body including a first upper support surface for supporting an edge portion of a first photovoltaic module and the second body defining a second upper support surface for supporting an edge portion of a second photovoltaic module; and the lower projection structure extending vertically downward with respect to the first and second bodies, a first rib extending vertically downwardly from the first body, a second rib extending vertically downwardly from the second body, a lower portion of the lower projection structure including a through slot, an extent of the through slot in the first direction being sized to receive a torque tube beam; and a fastener assembly including: a securing strap including a first end section and a second end section spaced apart by an intermediate section and first and second fasteners, the first fastener coupled to the central attachment structure and coupled to the first end section of the securing strap and the second fastener coupled to the central attachment structure and coupled to the second end section of the securing strap, the securing strap extending around the torque tube beam to secure the mounting bracket to the torque tube beam.

In another aspect, the present disclosure relates to a mounting bracket for mounting to a torque tube beam of a solar tracking assembly and for receiving and securing respective edge portions of a pair of photovoltaic modules to couple the pair of photovoltaic modules to the torque tube beam, the mounting bracket comprising: an upper attachment structure and a lower projection structure extending in a vertical direction downwardly away from the upper attachment structure, the mounting bracket including a first end and a spaced apart second end defining a length of the mounting bracket with respect to a first direction and a first side and a second side defining a width of the mounting bracket in a second direction, the first direction and the second direction being mutually orthogonal and transverse to the vertical direction, the mounting bracket bisected by a central vertical plane extending in the first direction; the upper attachment structure of the mounting bracket including a first body and a second body spaced apart and spaced from the central vertical plane by the lower projection structure, the first body extending from a first upper end portion of the lower projection structure and the second body extending from a second end portion of the lower projection structure, the lower projection structure extending vertically downward with respect to the first and second bodies, a first rib disposed between the first side of the mounting bracket and the first body and extending vertically upwardly from the first body, a second rib disposed between the second side of the mounting bracket and the second body and extending vertically upwardly from the second body, the first and second ribs extending parallel to the central axis of the mounting bracket, the first body and the first rib defining a first pedestal for receiving an edge portion of a first photovoltaic module and the second body and the second rib defining a second pedestal for receiving an edge portion of a second photovoltaic module; and the lower projection structure including a first portion adjacent the first end of the mounting bracket, a second portion adjacent the second end of the mounting bracket, and a slot intermediate the first and second portions, an extent of the slot in the first direction being sized to receive the torque tube beam such that portions of the first and second bodies of the upper attachment structure in a region of the slot overlie an upper surface of the torque tube beam.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 11 is a schematic top perspective view of the securing strap of the fastener assembly of the mounting bracket assembly of FIG. 3;

FIG. 12 is a schematic top perspective view of a clamp body of the pair of clamp bodies of the fastener assembly of the mounting bracket assembly of FIG. 3;

FIG. 13 is a schematic front elevation view of the clamp body of FIG. 12;

FIG. 30 is a schematic bottom plan view of the mounting bracket of FIG. 27;

FIG. 31 is a schematic front elevation view of the mounting bracket of FIG. 27;

FIG. 37 is a schematic front elevation view of a portion of an alternate exemplary embodiment of a fastener assembly of the mounting bracket assembly of FIG. 3 wherein a fastener engagement member of the fastener assembly comprises a clip style, threaded U-nut;

FIG. 38 is a schematic bottom, front perspective view of the clip style, threaded U-nut of FIG. 37; and FIG. 39 is a schematic front elevation view of the clip style, threaded U-nut of FIG. 37.

DETAILED DESCRIPTION

Figure 1:
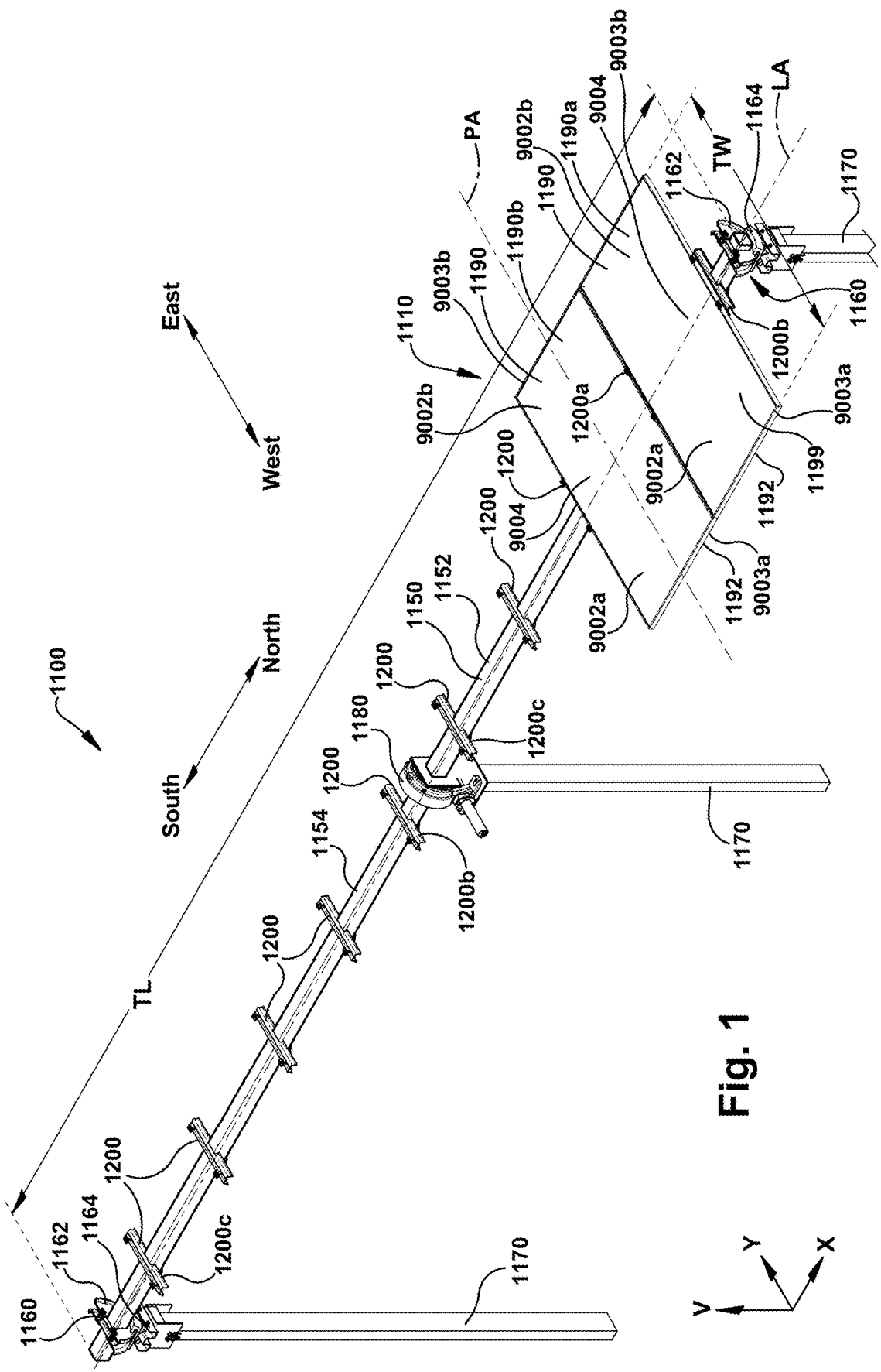
FIG. 1 is a schematic perspective view of a first exemplary embodiment of a solar tracker assembly of the present disclosure including a torque tube beam, a plurality of photovoltaic modules, and a plurality of mounting bracket assemblies for securing the plurality of photovoltaic modules to the torque tube beam.
Figure 2:
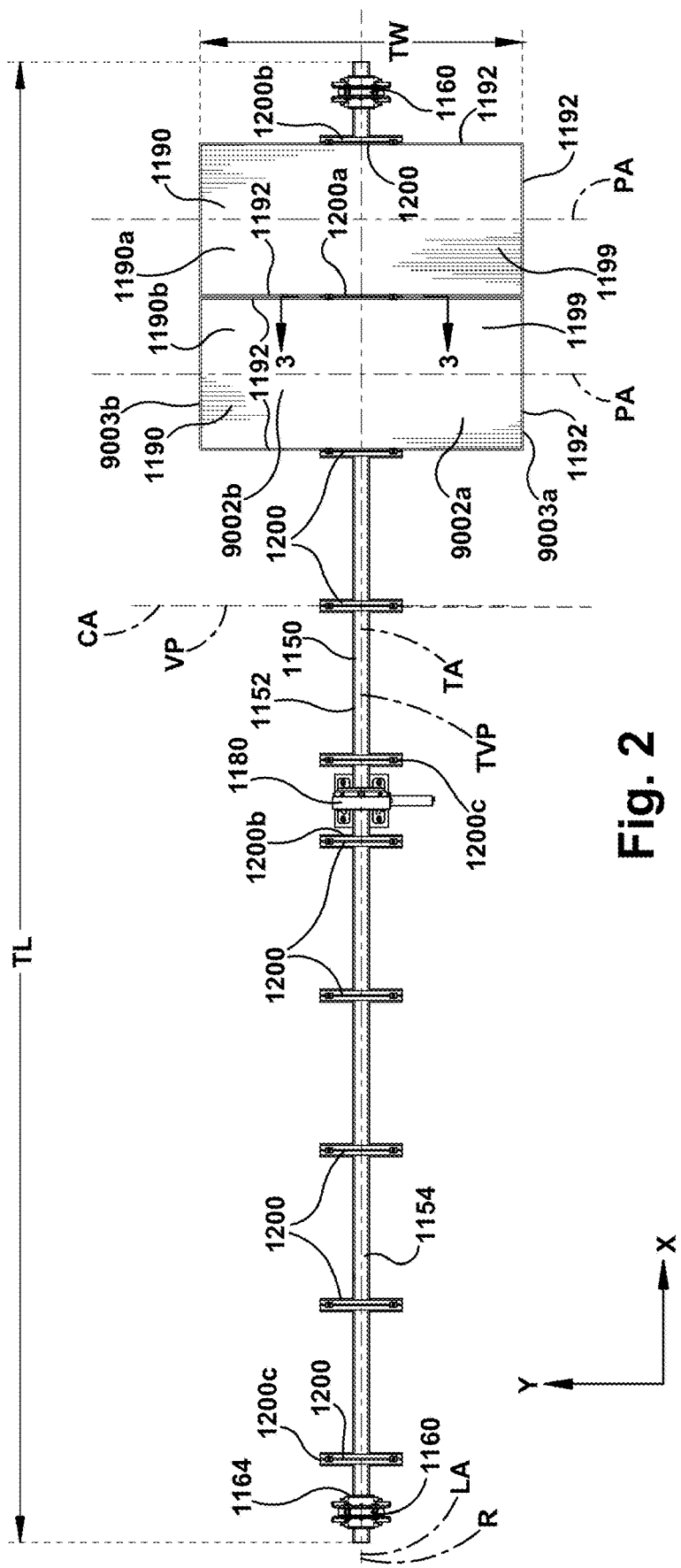
FIG. 2 is a schematic top plan view of the solar tracker assembly of FIG. 1.
Figure 3:
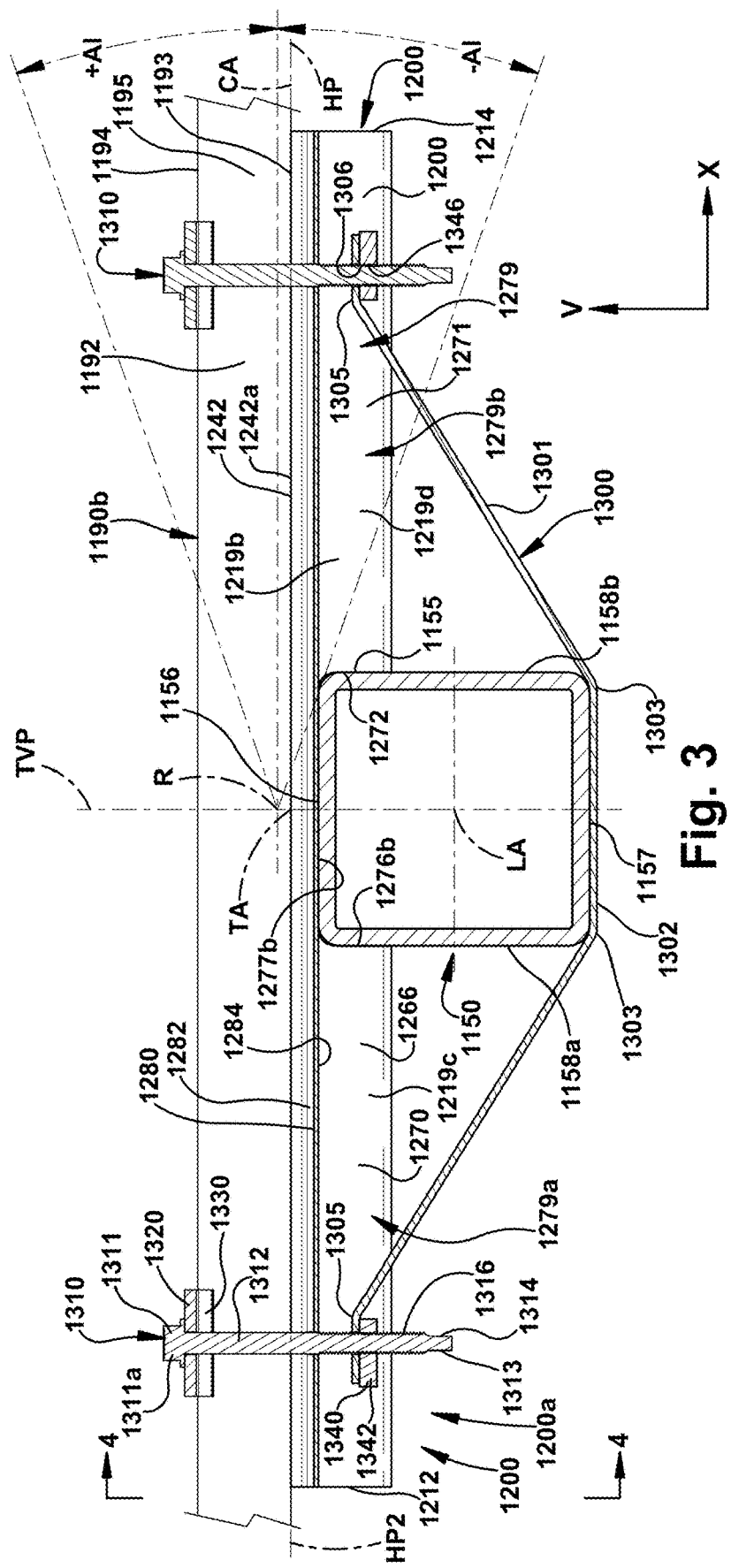
FIG. 3 is a schematic vertical section view of a portion of the solar tracker assembly of FIG. 1 including a first exemplary embodiment of a mounting bracket assembly of the present disclosure and the torque tube beam to which the mounting bracket assembly is affixed, as seen from a plane indicated by the line 3-3 in FIG. 2.

The present disclosure relates to a solar tracker system 1100 including a mounting bracket assembly or mounting bracket apparatus, a first exemplary embodiment of which is shown generally at 1200 in FIGS. 1-7. In the exemplary embodiment disclosed in FIGS. 1-3, the solar tracker system 1100 is a horizontal, single axis solar tracker system, however, it should be appreciated that the mounting bracket assembly 1200 of the present disclosure can be advantageously utilized in a variety of solar tracker systems having a plurality of photovoltaic modules 1190 needing to be affixed or secured to a torque tube beam 1150. Depending on the specific configuration of the solar tracker system 1100, typically, a series of adjacent photovoltaic modules of the plurality of photovoltaic modules 1190 are arranged in a side by side arrangement with facing edges. In FIGS. 1 and 2, two representative photovoltaic modules 1190a, 1190b of the plurality of photovoltaic modules 1190 are shown. It should be understood that the plurality of photovoltaic modules 1190 comprise an aligned series of adjacent photovoltaic modules, each pair of which are separated by and securely coupled to the torque tube beam 1150 by a mounting bracket assembly 1200. That is, a mounting bracket assembly 1200 will be interposed between each adjacent pair of facing photovoltaic modules 1190. For example, as schematically represented in FIGS. 1 and 2, a mounting bracket assembly 1200a will be interposed between first and second photovoltaic modules 1190a, 1190b of a first series of adjacent photovoltaic modules 1190c. As explained below, in the schematic depictions of FIGS. 1 and 2, there are two series of aligned, adjacent photovoltaic modules, namely, a first series of modules and a second series of modules, separated by a slew motor 1180. The mounting bracket assembly 1200a functions to secure facing edge portions 1191a, 1191b of the respective first and second photovoltaic modules 1190a, 1190b. Except for the mounting bracket assemblies 1200b, 1200c which are disposed at the beginning and end of a series of adjacent photovoltaic modules, each mounting bracket assembly 1200 functions to couple or secure facing edge portions of two adjacent photovoltaic modules 1190 to the torque tube beam 1150. The first and last mounting bracket assemblies 1200b, 1200c disposed at the beginning and end of the series of adjacent photovoltaic modules will necessarily only secure one edge portion of a photovoltaic module since there is no other photovoltaic module present on the opposite side of the mounting bracket assembly for the first and last mounting bracket assemblies in a series. Accordingly, these first and last mounting bracket assemblies 1200b, 1200c may be configured the same as the remaining plurality of mounting bracket assemblies 1200 or they may be configured differently since they are not required to secure two facing edge portions of two photovoltaic modules. However, for simplicity, each of the plurality of mounting bracket assemblies 1200 will be assumed to be substantially identical. Further, while the schematic depictions of FIGS. 1 and 2 show five mounting bracket assemblies providing spaces for four photovoltaic modules in each of the first and second series of modules, it should be understood that a typical 40-foot segment of the torque tube beam 1150 will include many more than five mounting bracket assemblies. Thus, the series of photovoltaic modules supported on a segment of the torque tube beam will be much greater than a series of four photovoltaic modules depicted in FIGS. 1 and 2.

In the disclosed exemplary embodiment, the plurality of mounting bracket assemblies 1200 are part of a table 1110 of the solar tracker system 1100 and used to mount the plurality of photovoltaic modules 1190 to the torque tube beam 1150 of the table 1110. The table 1110 includes all components of the solar tracker system 1110 that are driven by a slew drive 1180 to pivot about an axis of rotation R of the table 1110 of the solar tracker system 1100. The table 1110 includes the plurality of photovoltaic modules 1190, the torque tube beam 1150 and a plurality of rotatable bearing assemblies 1160 that support the torque tube beam 1150. Additional details regarding the solar tracker system 1100 and the various components thereof are disclosed in U.S. patent application Ser. No. 16/058,418, filed Aug. 8, 2018 entitled Solar Tracker Bearing Apparatus application Ser. No. 16/058,418 is assigned to the assignee of the present application and is hereby incorporated in its entirety herein by reference.

Individual mounting bracket assemblies, for example, representative mounting bracket assembly 1200a of the plurality of mounting bracket assemblies 1200 are positioned in uniformly spaced apart locations along an extent of the torque tube beam 1150, that is, spaced along a longitudinal axis LA of the torque tube beam 1150. A mounting bracket assembly, e.g., mounting bracket assembly 1200a of the plurality of mounting bracket assemblies 1200 is disposed or positioned between each adjacent pair of photovoltaic modules, e.g., between adjacent representative modules 1190a, 1190b of the series of adjacent photovoltaic modules 1190. By the series of adjacent photovoltaic modules it is meant a set of photovoltaic modules 1190 that are aligned, one adjacent to the next, with adjacent modules having facing edge portions 1191a, 1191b, as viewed along the longitudinal axis LA of the torque tube beam 1150. For example, adjacent modules 1190a, 1190b are part of the first series of the plurality of photovoltaic modules 1190, each of the modules being separated only by a mounting bracket assembly 1200a of the plurality of mounting bracket assemblies 1200. For example, in the schematic depiction of FIGS. 1 and 2, the torque tube beam 1150 is rotated by the slew drive 1180 positioned approximately at a midpoint of a longitudinal extent of the torque tube beam 1150. This results in the first series of four photovoltaic modules (only two of which, namely, modules 1190a, 1190b are shown in FIGS. 1 and 2) on one side of the slew drive 1180 and the second series of four photovoltaic modules (none of which are shown in FIGS. 1 and 2) on the opposite side of the slew drive 1180. The first series of four photovoltaic modules 1190 are supported by five mounting bracket assemblies 1200 which function to secure or mount the four modules 1190 to the torque tube beam 1150, while the second series of the four photovoltaic modules 1190 are supported by five mounting bracket assemblies 1200 which function to secure or mount the four modules 1190 to the torque tube beam 1150.

Mounting Bracket Assembly 1200A

Each of the mounting bracket assemblies of the plurality of mounting bracket assemblies 1200 are substantially identical and thus it will be understood that the reference numbers 1200, 1200a, 1200b, 1200c may be interchangeably used herein to refer to the plurality of mounting bracket assemblies or to a representative mounting bracket assembly, as the case may be. In one exemplary embodiment, each mounting bracket assembly 1200a includes: a) a mounting bracket 1210; b) a securing strap 1300 for securing the mounting bracket 1210 to the torque tube beam 1150; c) a pair of fasteners 1310 coupled between the mounting bracket 1210 and respective opposite end portions 1305 of the securing strap 1300; d) a pair of clamp bodies 1320 coupled to respective ones of the pair of fasteners 1310 for securing the facing edge portions 1191a, 1191b of an adjacent pair of photovoltaic modules 1190a, 1190b to the mounting bracket 1210; e) a pair of bonding clips 1330 interposed between respective ones of the pair of clamp bodies 1320 to provide an electrical ground pathway between the frame of the photovoltaic modules 1190a, 1190b, various components of the solar tracking system 1100 and earth ground; and f) a pair of fastener engagement members 1340 coupled to respective ones of the pair of fasteners 1310 and bearing against respective opposite end portions 1305 of the securing strap 1300 to tighten or cinch the securing strap 1300 against the torque tube beam 1150 and thereby fasten the mounting bracket 1210 to the torque tube beam 1150 and secure the pair of photovoltaic modules 1190, 1190b to the torque tube beam 1150. The specific representative mounting bracket assembly positioned between the depicted adjacent pair of photovoltaic modules 1190a, 1190b will be referred to as mounting bracket assembly 1200a. The mounting bracket assembly 1200a supports and spaces apart the adjacent pair of modules 1190a, 1190b and functions to secure or mount the facing edge portions 1191a, 1191b of the pair of photovoltaic modules 1190a, 1190b to the torque tube beam 1150. Advantageously, the cross sectional configuration and size of the mounting bracket assembly 1200a and, specifically, a fastener assembly 2000 of the mounting bracket assembly 1200a, determines a distance or gap G (schematically depicted in FIG. 4) between distal edges 1192c, 1192d of the facing edge portions 1191a, 1191b of the adjacent pair of photovoltaic modules 1190a, 1190b, as measured in a direction parallel to the longitudinal axis LA of the torque tube beam 1150. In one exemplary embodiment, the gap G between adjacent modules 1190a, 1190b is determined by the configuration of a pair of bonding clips 1330 of the fastener assembly 2000 of the mounting bracket assembly 1200a. In one exemplary embodiment the gap G (schematically depicted in FIG. 4) is approximately 0.394 in. and is defined by the spacing of a pair of side walls 1333a, 1333b of the bonding clip 1330.

For any given photovoltaic module, e.g., module 1190a, of the plurality of photovoltaic modules 1190, the module 1190a is supported by and secured to the torque tube beam 1150 by a pair of mounting bracket assemblies 1200a, 1200b thereby providing greater structure support to the module 1190a and minimizing the tendency for the module to flex, vibrate or wiggle under wind load conditions. Additionally, and advantageously, each of the pair of mounting bracket assemblies 1200a, 1200b includes a securing strap 1300 which overlies and, upon tightening of the pair of fasteners 1290, is urged into contact with and snugly bears against a bottom or lower wall 1157 of the torque tube beam 1150. This cinching action of the securing strap 1300 against the lower wall 1157 of the torque tube beam 1150 pulls the mounting bracket 1210 downwardly to bear strongly against three walls of the torque tube beam 1150, namely, an upper wall 1156 and opposite side walls 1158a, 1158b of the torque tube beam 1150, while the securing strap 128 and provides excellent clamping strength of the mounting bracket assemblies 1200a, 1200b against the torque tube beam 1150. Accordingly, the mounting bracket assemblies 1200 of the present disclosure are useful in high wind conditions. In one exemplary embodiment, the mounting bracket assemblies 1200 are configured to securely hold the plurality of photovoltaic modules 1190 in place under high wind speed rated conditions, e.g. withstanding three second wind gusts up to 105 mph, applied in any direction (front, back, side) to the photovoltaic modules 1190 and at any orientation or angle of inclination within the range of angle of inclination of the table 1110, e.g., +/−60 degrees from horizontal. A maximum angles of inclination of the table 110 are schematically depicted as +AI/−AI in FIG. 3.

In one exemplary embodiment, the mounting bracket 1210 is a unitary, one-piece mounting bracket fabricated by roll-forming and/or press-breaking metal forming operations. Such metal forming operations, especially roll-forming, provide for efficient and cost effective production of high volumes of the unitary, one-piece mounting brackets 1210 from a long sheet or coil of steel stock. Thus, material usage per bracket is low and fabrication costs for fabricating high volumes of the bracket 1210 is cost efficient. In one exemplary embodiment, the mounting bracket 1210 is fabricated of galvanized steel, although other materials having similar characteristics of strength, rigidity, durability, corrosion resistance, etc. could alternatively be used. It should also be understood that the dimensions of the mounting bracket 1210 are dependent on a number of factors including the size and configuration of the photovoltaic modules 1190 to be supported by the mounting bracket assembly 1200, the size and configuration of the torque tube beam 1150, the expected-environmental conditions, including wind and snow loads. With this understanding, in one exemplary embodiment of the present disclosure, the mounting bracket 1210 has the following approximate dimensions, a length L of 20.00 in., a width W of 3.15 in., a height H of 1.41 in. and a thickness of 0.06 in., all of which may be greater or less, depending on wind and snow loads, size, number and weight of the photovoltaic modules 1190 to be mounted to the torque tube beam 1150. A typical size for each of the plurality of photovoltaic modules 1190 is two meters by one meter (i.e., approximately 78.7 in. by 39.4 in.). To maximize the number of photovoltaic modules 1190 that may be mounted per a given length of the torque tube beam 1150, the plurality of modules 1190 are typically mounted such that the longer dimension of each of the modules is oriented in the east-west direction (i.e., the direction Y) as schematically portrayed in FIGS. 1 and 2. That is, a width TW (FIGS. 1 & 2) of the table 1110 is approximately two meters The resulting mounting brackets 1210 are strong and resilient to mount the plurality of photovoltaic modules 1190 to the torque tube beam 1150 without undue flexing, movement, vibration, and/or wiggling of the mounted photovoltaic modules 1190. Further, utilizing the mounting bracket assembly 1200 of the present disclosure permits adjacent photovoltaic modules 1190a, 1190b to be mounted to the torque tube beam 1150 such that facing sides or edge portions 1191, 1191b of the modules 1190a, 1190b have a reduced gap G between adjacent modules 1190a, 1190b thereby advantageously increasing the ground coverage ratio of the solar tracker system 1100.

Additionally, the remaining components of the plurality of mounting bracket assembly 1200 are either standard, off-the-shelf, readily available components or are components designed to be efficiently fabricated utilizing high volume production runs. Advantageously, the mounting bracket assemblies 1200 of the present disclosure eliminates the need for multiple, custom designed components such as module rails, brackets, and clamps utilized by prior frame designs to mount the plurality of photovoltaic modules 1190 to the torque tube beam 1150.

The solar tracker system 1100 includes a plurality of solar tracker bearing apparatuses 1160 which constrain the torque tube beam 150 to pivot or swing about the axis of rotation R. The axis of rotation R essentially is the axis that the table 1110 pivots about as the table 1110 moves through positive and negative angles of inclination to allow light receiving upper surfaces of plurality of photovoltaic modules 1190 to track the sun as the sun moves from east to west across the sky. The plurality of solar tracker bearing apparatuses 1160 are positioned at spaced apart locations along the torque tube beam 1150 to pivotally support the torque tube beam 1150.

Advantageously, each of the plurality of solar tracker bearing apparatuses 1160 includes a stationary saddle assembly 1164 that rotatably supports the rotatable bearing assembly 1162. That is, the rotatable bearing assembly 1162 is confined to rotate about the axis of rotation R by the saddle assembly 1164. In turn, the rotatable bearing assembly 1162 supports the torque tube beam 1150 and constrains the torque tube beam 1150 to pivot or swing about the axis of rotation R. Thus, the axis of rotation R that the torque tube beam 1150 is constrained to swing or pivot about is defined by the solar tracker bearing apparatuses 1160. In one exemplary embodiment, the torque tube beam 1150 is a metal tube that is substantially square in cross section, having a hollow interior, and is centered about the torque tube beam longitudinal axis LA. In one exemplary embodiment the torque tube beam 1150 is approximately 100 mm. by 100 mm. (approximately 4 in. by 4 in.).

The solar tracker system 1100 includes components that move or pivot about the axis of rotation R, i.e., components of the table 1110, and other components which are stationary. Stationary components of the solar tracker system 1100 include: a) a plurality of upright support posts 1170 that support the saddles 1164 of the solar tracer bearing apparatuses 1160; b) the stationary saddles 1164 of the plurality of solar tracking bearing apparatuses 1160; and c) stationary portions of the slew drive 1180. In one exemplary embodiment, the slew drive 1180 bisects the torque tube beam 1150 along its length at approximately a midpoint defining a first portion 1152 of the torque tube beam 1150 and a second portion 1154 of the torque tube beam 1150. The slew motor 1180 is positioned on a support post 1170 such that it drives the torque tube beam 1150 and the table 1110 about the axis of rotation R. The first aligned series of photovoltaic modules are mounted on or affixed to the first portion 1152 of the torque tube beam 1150 (via the mounting bracket assemblies 1200), while the second series of photovoltaic modules are mounted on or affixed to the second portion 1154 of the torque tube beam 1150 (via the mounting bracket assemblies 1200).

Much of the weight of the table 1110 is accounted for by the plurality of photovoltaic modules 1190 which are supported by the plurality of mounting bracket assemblies 1200 that position the modules 1190 in a position that is generally vertically above the upper wall 1156 of the torque tube beam 1150. A vertical direction V is shown FIG. 1. As such, a center of mass of the table 1110 if calculated, will typically be found to be vertically aligned with the longitudinal axis LA of the torque tube beam 1110, but positioned vertically above the upper wall 1156 of the torque tube beam 1110, that is, outside of and vertically above the torque tube beam 1150. Of course, the exact position or location of the center of mass of the table 1110 will depend on the configuration, and weight of the components comprising the table 1110 of the solar tracker system 1100. For proper balance and stability of the table 1110 under varying load conditions (i.e., wind and snow loads, etc.), it is advantageous if the axis of rotation R of the plurality of solar tracker bearing apparatuses 1160 is approximately aligned with or is very close to the center of mass of the table 1110.

As mentioned above, in one exemplary embodiment, a typical size of a photovoltaic module 1190a is one meter by two meters resulting in the width TW of the table 1110 of the solar tracker system 1100 being approximately two meters. A length of the table 1110 of the solar tracker system 1100 is primarily determined by an extent or length TL of the torque tube beam 150. In one exemplary embodiment, the torque tube beam 1150 is comprised of a plurality of predetermined lengths or segments, i.e., 40 foot segments, which are coupled together in an end to end configuration by collars. For simplicity, in FIG. 1, a shortened, schematic version of the torque tube beam 1150 is shown. The slew drive 1180, which rotates the torque tube beam 1150, bisects or interrupts the torque tube beam 1150 at or near a longitudinal center along the length TL of the beam 1150. The first portion 1152 of the torque tube beam 1150 extends from a first coupler affixed to one side of the slew drive 1180, while the second portion 1154 of the torque tube beam 1150 extends from a second coupler affixed to an opposite side of the slew drive 1180. As noted above, the schematic representation of the solar tracking system 1100 depicted in FIG. 1 includes a relatively short toque tube beam 1150. In an actual application, the length of the torque tube beam 1150 may include five, 40-foot beam segments comprising the first portion 1152 of the torque tube beam 1150 and five, 40-foot beam segments comprising the second portion 1154 of the torque tube beam 1150 for a total length of approximately 400 feet and an ability to support over 100 photovoltaic modules 1190.

In one exemplary embodiment, each of the plurality of photovoltaic modules 1190 includes a rectangular light-receiving photovoltaic panel 1199 with a generally C-shaped, electrically conductive frame member 1192 disposed about the periphery of the rectangular panel 1199. The facing edge portions 1191a, 1191b of the representative photovoltaic modules 1190a, 1190b are thus portions of the C-shaped frame member 1192 including a lower surface 1193 and an axially or vertically spaced apart parallel upper surface 1194 spaced apart by a vertically extending side wall 1195. Thus, the facing edge portions 1191a, 1191b of the photovoltaic modules 1190a, 1190b are defined by lower, upper and side wall surfaces 1193, 1194, 1195 of the C-shaped frame member 1192.

First Exemplary Embodiment of Mounting Bracket Assembly 1200

As best seen in FIGS. 3-10, a first exemplary embodiment of the mounting bracket assembly 1200 of the present disclosure includes a mounting bracket 1210 configured to be mounted to an upper portion 1155 of the torque tube beam, and the fastener assembly 2000. The fastener assembly 2000 of the present disclosure advantageously functions both to: a) secure the facing edge portions 1191a, 1191b of the first and second adjacent photovoltaic modules 1190a, 1190b to the mounting bracket 1200a; and b) tighten or cinch the securing strap 1300 against the torque tube beam lower wall 1157 to thereby firmly secure the mounting bracket 1200a to the torque tube beam 1150 and securely couple the first and second photovoltaic modules 1190a, 1190b to the torque tube beam 1150. The fastener assembly 2000 includes: a) a pair of fasteners 1310; b) a pair of clamp bodies 1320; c) a pair of bonding clips 1330; d) a pair of fastener engagement members 1340; and e) a securing strap 1300.

Mounting Bracket 1210

Figure 9:
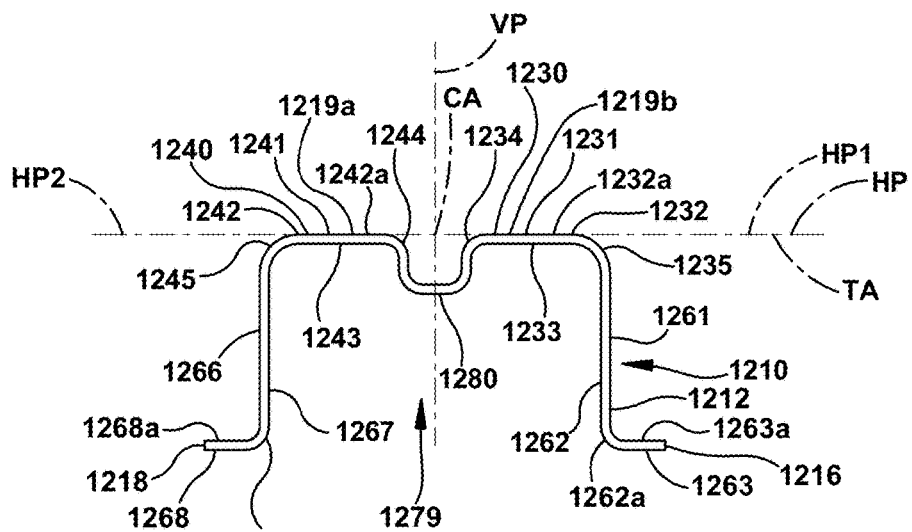
FIG. 9 is a schematic left side elevation view of the mounting bracket of the mounting bracket assembly of FIG. 3.
Figure 10:
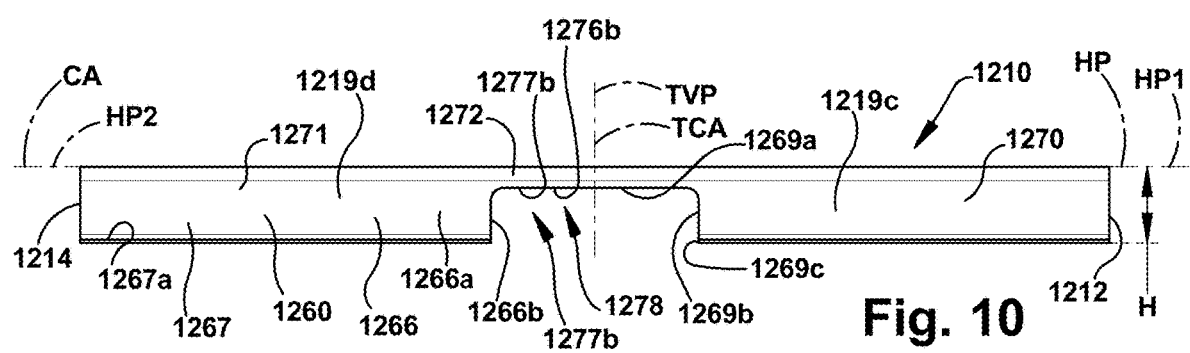
FIG. 10 is a schematic front elevation view of the mounting bracket of FIG. 7.
Figure 14:
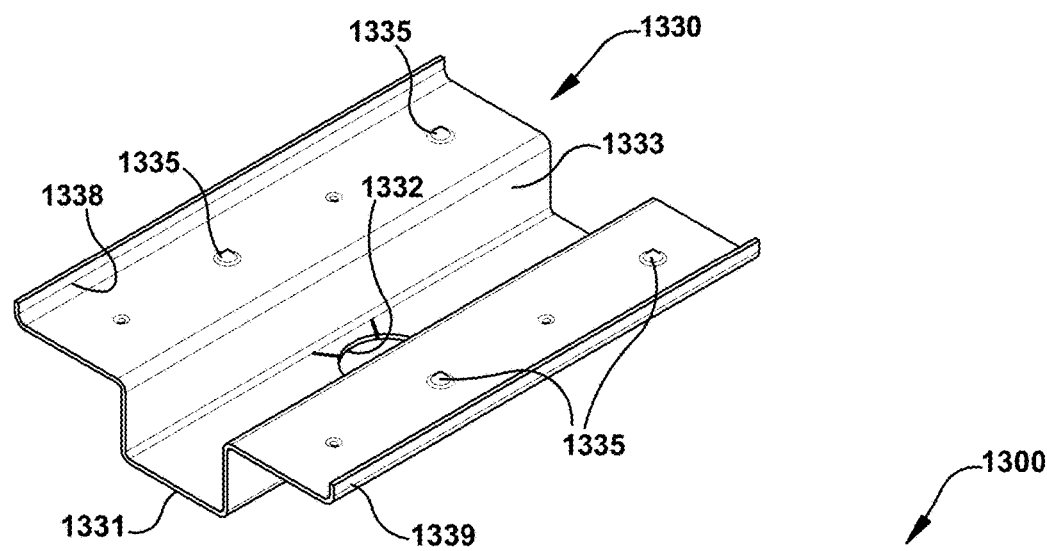
FIG. 14 is a schematic top perspective view of a bonding clip of the pair of bonding clips of the fastener assembly of the mounting bracket assembly of FIG. 3.
Figure 15:
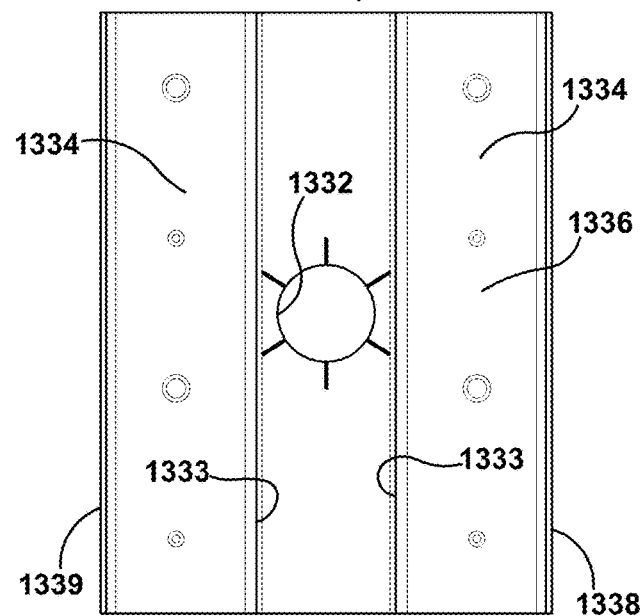
FIG. 15 is a schematic top plan view of the bonding clip of FIG. 14.
Figure 16:
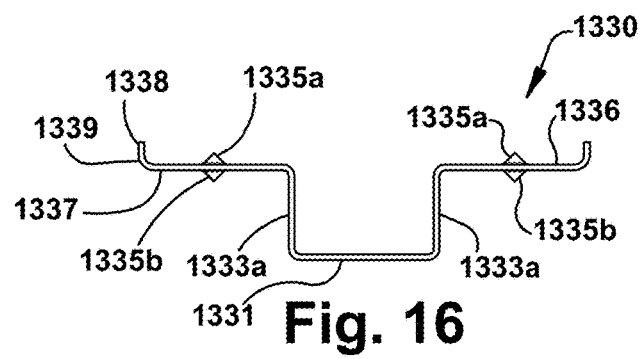
FIG. 16 is a schematic front elevation view of the bonding clip of FIG. 14.
Figure 17:
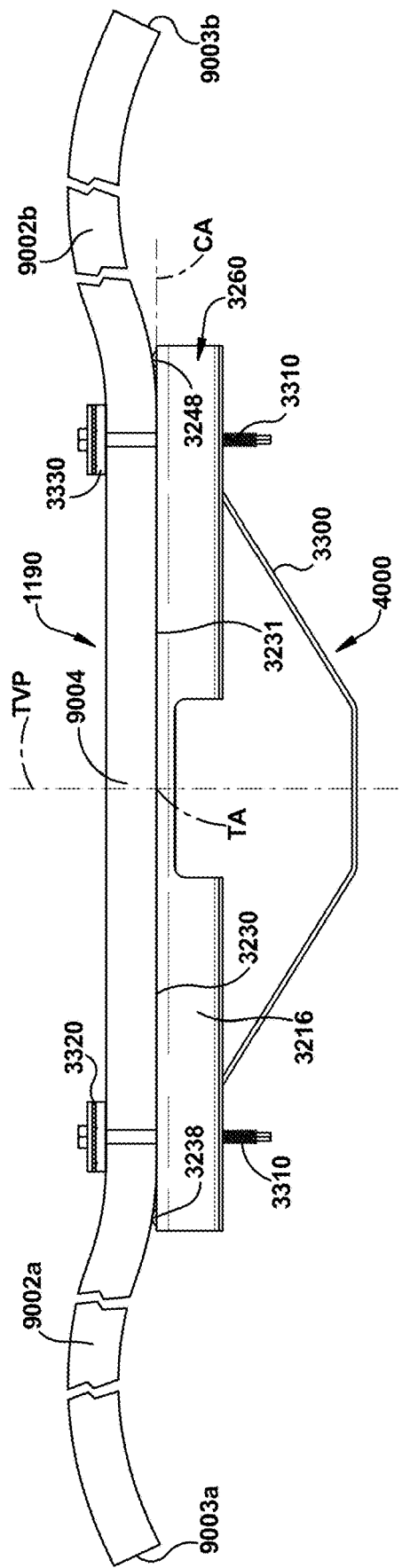
FIG. 17 is a schematic front elevation view of a second exemplary embodiment of a mounting bracket assembly of the present disclosure.
Figure 18:
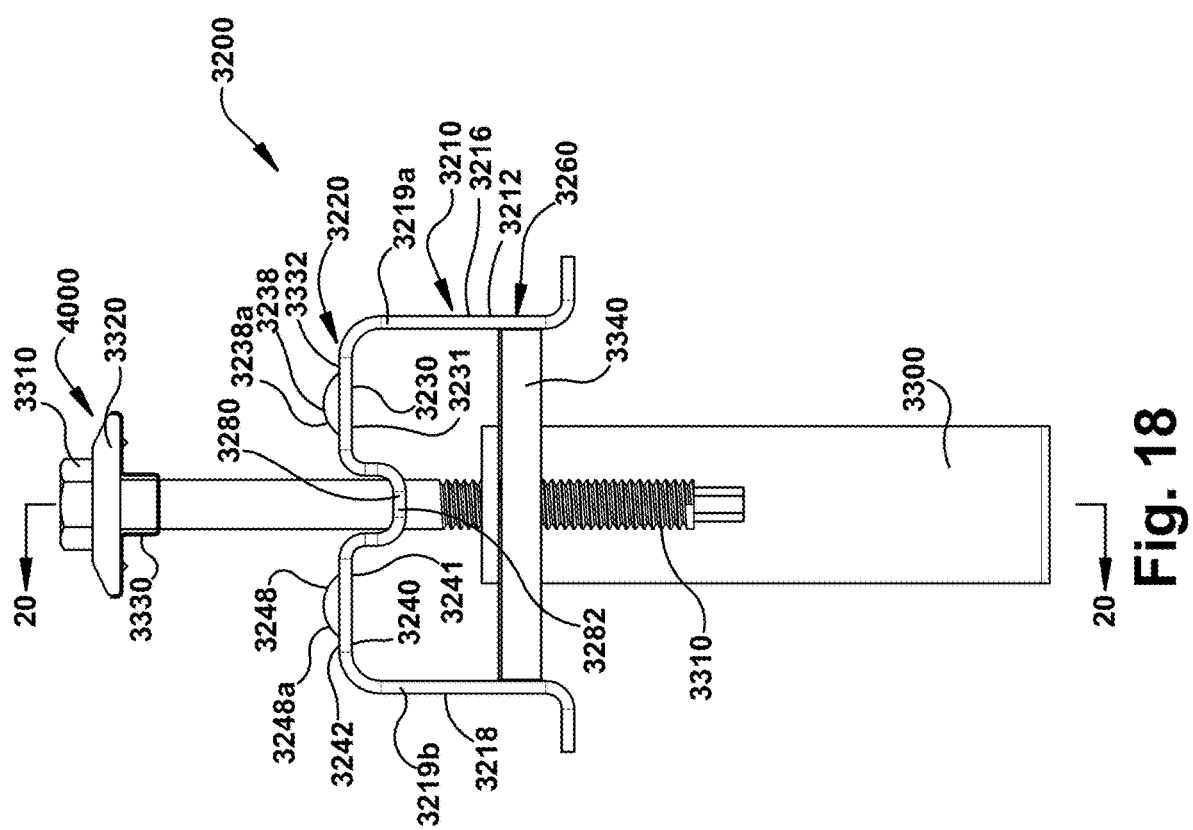
FIG. 18 is a schematic side elevation view of the mounting bracket assembly of FIG. 17.
Figure 19:
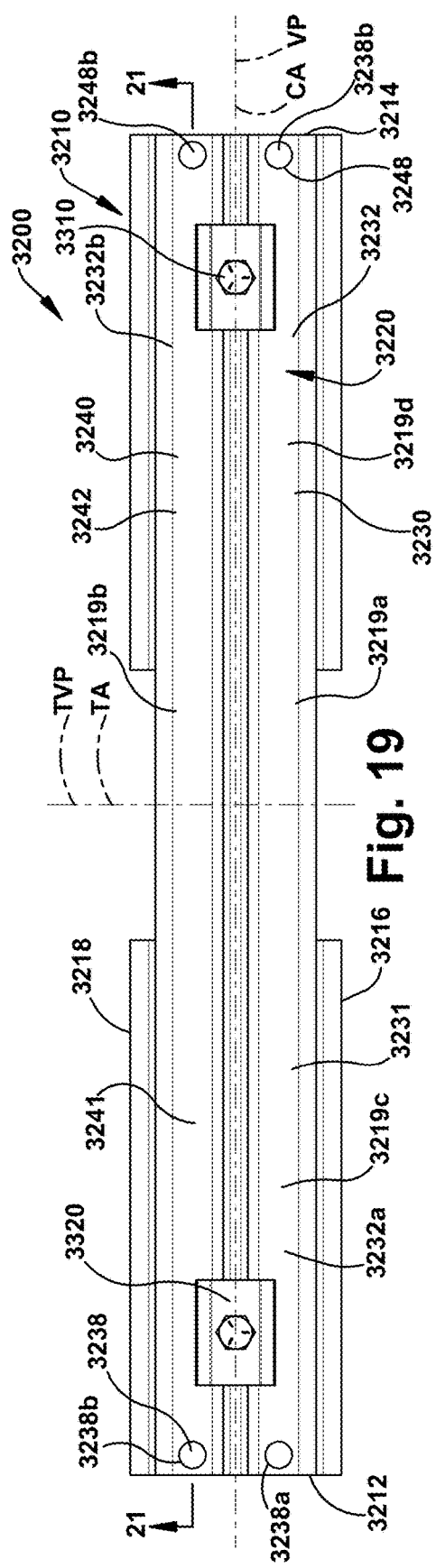
FIG. 19 is a schematic top plan view of the mounting bracket assembly of FIG. 17.
Figure 20:
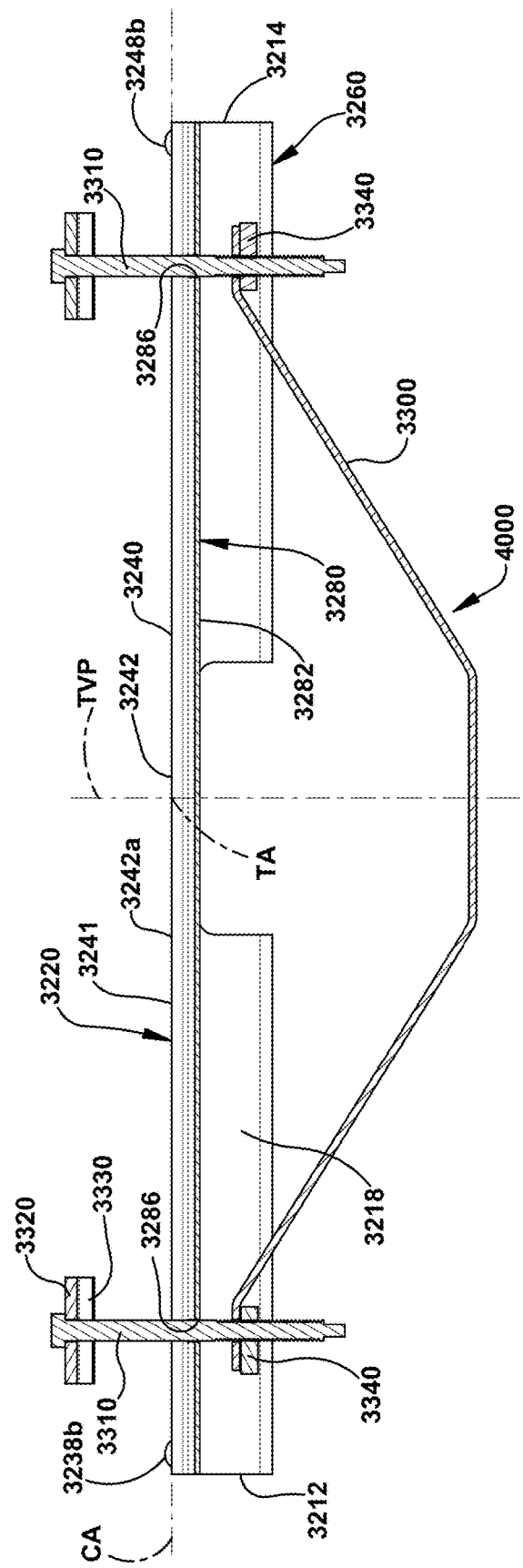
FIG. 20 is a schematic vertical section view of the mounting bracket of FIG. 17, as seen from a plane indicated by the line 20-20 in FIG. 18.
Figure 21:
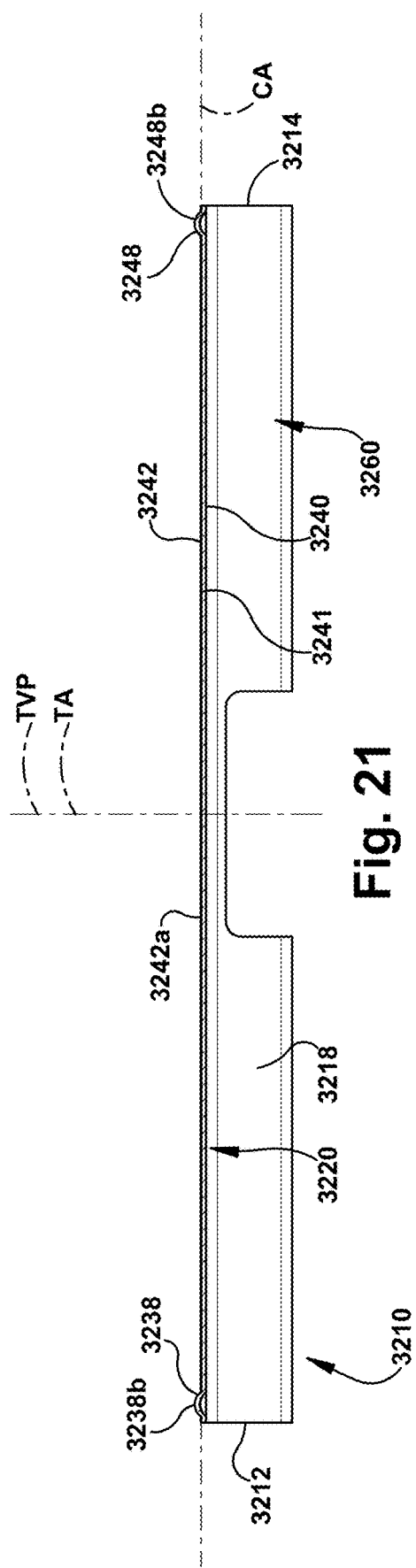
FIG. 21 is a schematic vertical section view of a mounting bracket of the mounting bracket assembly of FIG. 17, as seen from a plane indicated by the line 21-21 in FIG. 19.

As best seen in FIGS. 5-10, each mounting bracket 1210 is generally rectangular when viewed in plan view and extends along a central vertical plane VP that bisects the mounting bracket 1210, the central vertical plane VP extending along a longer extent, that is, the length L, of the mounting bracket 1210. The mounting bracket 1210 is symmetric about the central vertical plane VP, that is, the central vertical plane VP divides the mounting bracket 1210 into a first section 1219a and a second section 1219b wherein the first and second sections of the mounting bracket 1210 are mirror images of each other. As best seen in FIG. 9, the mounting bracket 1210, when viewed in section along a transverse vertical plane TVP extending orthogonally to the central vertical plane VP, is generally an M-shape with a central portion of the "M" being comprised of a vertical and horizontal wall segments comprising a general U-shape, as opposed to angled segments which is typical of the central portion of the letter "M". In one exemplary embodiment, the mounting bracket 1210 of the present disclosure is a unitary structure and includes three structures: a) an upper support structure 1220, which provides a pair of spaced apart, generally planar, horizontally oriented support surfaces 1232a, 1242a configured to support the facing edge portions 1191a, 1191b of the pair of photovoltaic panels 1190a, 1190b, the support surfaces 1232a, 1242a define a horizontal support plane HP of the upper support structure 1220; b) a vertically or axially recessed, central attachment structure 1280, which includes a horizontally extending lower wall 1282 having a pair of spaced apart apertures 1286 for receiving respective ones of the pair of threaded fasteners 1310; and c) a lower projection structure 1260, which includes a pair of downwardly extending vertical ribs 1261, 1266. The lower projection structure 1260 includes a first portion 1270 adjacent the first end 1212 of the mounting bracket 1210, a second portion 1271 adjacent the second end 1214 of the mounting bracket 1210 and a central portion 1272 which includes a through slot or saddle 1278 sized to be received on and engage an upper portion 1155 of the torque tube beam 1150. The through slot or saddle 1278 is comprised of a first slot 1277a defined by an open or cut out portion 1276a in a lower section 1261a of the rib 1261 in the central portion 1272 and an aligned second slot 1277b defined by an open or cut out portion 1276b in a lower section 1266a of the rib 1266. When mounted on the torque tube beam 1150, a central axis CA of the mounting bracket 1210 (extending along the length L of the mounting bracket 1210) is oriented orthogonally to the longitudinal axis LA of the torque tube beam 1150.

The mounting bracket 1210 includes first and second ends 1212, 1214, which are spaced apart and substantially parallel and first and second sides 1216, 1218, which are also spaced apart and substantially parallel. The first and second sides 1216, 1218 are parallel to the central axis CA of the mounting bracket 1210 and are substantially orthogonal to the first and second ends 1212, 1214. As can be seen, when viewed in plan view, the central axis CA bisects an orthogonal distance or width W between the first and second sides 1216, 1218 of the mounting bracket 210, while a transverse axis TA (orthogonal to and intersecting the central axis CA) bisects the length L of the mounting bracket 1210 between the first and second ends 1212, 1214. The central axis CA is coincident with and lies on the central vertical plane VP, while the transverse axis TA is coincident with and lies on the transverse vertical plane TVP. The central vertical plane VP of the mounting bracket 1210 intersects and is substantially orthogonal to the transverse axis TA and extends along and is coincident with the central axis CA and intersects and is substantially orthogonal to the horizontal support plane HP of the upper support structure 1220, while the transverse vertical plane TVP of the mounting bracket 1210 intersects and is substantially orthogonal to the central axis CA and extends along and is coincident with the transverse axis TA and intersects and is substantially orthogonal to the horizontal support plane HP.

As noted above, the mounting bracket 1210 is symmetric about the central vertical plane VP, that is, the vertical plane VP can be considered as dividing the mounting bracket into first (left hand) and second (right hand) sections 1219a, 1219*b* (FIG. 9) of the mounting bracket 1210. The first and second sections 1219*a*, 1219*b*, as divided by the central vertical plane VP, are substantially mirror images of each other. The same is true for the transverse vertical plane TVP, viewed along the central axis CA from front to back, that is, from the first to the second ends 1212, 1214, the mounting bracket 1210 is symmetric about the transverse central vertical plane TVP, that is, the transverse vertical plane TVP can be considered as dividing the mounting bracket into a front half 1219*c* and a back half 1219*d* of the mounting bracket 1210 which are substantially mirror images of each other.

The upper support structure 1220 includes first and second planar bodies 1230, 1240 separated by the recessed, central fastener structure 1280. Extending vertically downwardly from the outer edges of the first and second planar bodies 1230, 1240 are the first and second ribs 1261, 1266 of the lower projection structure 1260. Advantageously, the first and second planar bodies 1230, 1240 each comprise a generally horizontal wall 1231, 1241. Respective upper surfaces 1232, 1242 of the horizontal walls 1231, 1241 define the planar support surfaces 1232*a*, 1242*a*. The support surface 1232*a* of the first planar body 1230 provides a flat support surface to support the edge portion 1191*a* of the photovoltaic module 1190*a* and, more specifically, the support surface 1232*a* supports the lower surface 1193 of the peripheral C-shaped frame 1192 of the photovoltaic module 1190*a*. Similarly, the support surface 1242*a* of the second planar body 1240 provides a flat support surface to support the edge portion 1191*b* of the photovoltaic module 1190*b* and, more specifically, the support surface 1232*a* supports the lower surface 1193 of the peripheral C-shaped frame member 1192 of the photovoltaic module 1190*b*.

The support surface 1232*a* of the upper surface 1232 of the first planar body 1230 defines a horizontal support plane HP1, while the support surface 1242*a* of the upper surface 1242 of the second planar body 1240 defines an aligned horizontal support plane HP2. The aligned first and second horizontal support planes HP1, HP2 are coincident with and are part of the horizontal support plane HP of the upper attachment structure 1220. The horizontal support plane HP essentially defines the axial or vertical level or position wherein lower surfaces 1193 of the C-shaped frame member 1192 (which comprises a lower portion of the respective edge portions 1191*a*, 1191*b* of the adjacent photovoltaic modules 1190*a*, 1190*b*) are supported in a horizontal orientation coincident with the horizontal support plane HP.

The central attachment structure 1280 is recessed vertically below the horizontal plane HP and due to its U-shaped configuration (when viewed in cross section along the transverse vertical plane TVP) advantageously provides additional stiffness and rigidity to the mounting bracket 1210. Advantageously, the central attachment structure 1280 includes a lower horizontal wall 1283 which bridges vertically downwardly extending side walls 1290, 1292. A curved transition wall region extends between an inner portion 1234 of the horizontal wall 1231 of the first planar body 1230 and the side wall 1290, while a similar curved transition wall region extends between an inner portion 1244 of the horizontal wall 1241 of the second planar body 1240 and the side wall 1292. In one exemplary embodiment, the horizontal wall 1283 includes the spaced apart pair of apertures 1286 sized to receive respective ones of the pair of fasteners 1310. When the mounting bracket 1210 is mounted to the torque tube beam 1150, and the pair of fasteners 1310 are tightened to urge the securing strap 1300 against the lower wall 1157 of the torque tube beam 1150. Advantageously, when the pair of fasteners 1310 are tightened to urge the securing strap 1300 against the lower wall 1157 of the torque tube beam 1150, a lower planar surface 1284 of the horizontal wall 1283 bears against an outer surface of the upper wall 1156 of the torque tube beam 1150 along the entirety of the length L of the mounting bracket 1210 thereby providing an additional bearing surface between the mounting bracket assembly 1200*a* and the upper wall 1156 of the torque tube beam 1150 to inhibit axial movement of the mounting bracket assembly 1210*a* with respect to the torque tube beam 1150. The combination of the securing strap 1300 bearing against an outer surface of the lower wall 1157 of the torque tube beam 1150 and the lower planar surface 1248 of the horizontal wall 1283 of the central attachment structure 1280 bearing against the outer surface of the upper wall 1156 of the torque tube beam 1150, movement of the mounting bracket assembly 1210*a* in the axial or vertical direction is inhibited.

Additionally, lower sections 1261*a*, 1266*a* of the downwardly extending ribs 1261, 1266 in the central portion 1273 of the lower projection structure 1260 include the spaced apart pair of cut out portions 1276*a*, 1276*b* defining the pair of slots 1277*a*, 1277*b* of the through slot or saddle 1278. When the mounting bracket 1210 is mounted to the torque tube beam 1150, peripheral portions of the lower sections 1261*a*, 1266*a* of the ribs 1261, 1266 adjacent the slots 1277*a*, 1277*b* similarly bear against the side walls 1158*a*, 1158*b* and upper wall 1156 in the upper portion 1155 of the torque tube beam 1150. Taken together, these multiple bearing surfaces and bearing locations of the mounting bracket 1210 against the upper and side walls 1156, 1158*a*, 1158*b* of the torque tube beam 1150 when the mounting bracket 1210 is mounted to the torque tube beam 1150, combined with the cinching or bearing of the securing strap 1300 against the lower wall 1157 of the torque tube beam 1150 upon tightening of the fasteners 1310, advantageously results in a secure mounting of the mounting bracket assembly 1200*a* and the photovoltaic modules 190*a*, 1190*b* to the torque tube beam 1150 capable of withstanding high wind shear conditions and snow loads.

The mounting bracket 1210 includes the lower projection structure 1260. As noted above, the lower projection structure 1260 includes the first portion 1270 adjacent the first end 1212 of the mounting bracket 1210, the second portion 1271 adjacent the second end 1214 of the mounting bracket 1210 and the central portion 1272 which includes the saddle or through slot 1278 sized to be received on and engage an upper portion 1155 of the torque tube beam 1150. The saddle or through slot 1278 is comprised of the first slot 1277*a* defined by the open or cut out portion 1276*a* in the lower section 1261*a* of the rib 1261 in the central portion 1272 and the aligned second slot 1277*b* defined by the open or cut out portion 1276*b* in a lower section 1266*a* of the rib 1266. In one exemplary embodiment, the transverse vertical plane TVP bisects the first and second slots 1277*a*, 1277*b*, thus, the slots 1277*a*, 1277*b* are aligned with and centered about the transverse vertical plane TVA and are aligned with respect to the transverse axis TA of the mounting bracket 1210. When the mounting bracket 1210 is mounted on the upper portion 1155 of the torque tube beam 1150, that is, the saddle or through slot 1278 receives the upper portion 1155 of the torque tube beam 1150, the alignment of the slots 1277*a*, 12776 insures that the mounting bracket 1210 extends generally orthogonal to the longitudinal axis LA of the torque tube beam 1150.

The first rib 1261 includes a generally planar, downwardly extending vertical wall 1262. At a lower end 1262*a* of the vertical wall 1262 there is a short outwardly extending horizontal wall portion 1263 that functions as a stiffening flange 1263a, advantageously providing additional stiffness and rigidity to the mounting bracket 1210 and providing two additional lower horizontal bearing surfaces 1264c which bear against the side walls 1158a, 1159b of the torque tube beam 1150. When the mounting bracket 1210 is mounted on the upper portion 1155 of the torque tube beam 1150, the first rib 1261 includes an inverted U-shaped peripheral edge 1261b that defines the slot 1277a in the central region 1272 of the lower projection structure 1260 advantageously provides five bearing surfaces against the torque tube 1150: a) a horizontal portion of the inverted U-shaped peripheral edge 1261b defines an upper horizontal bearing surface 1264a which bears against the upper wall 2256 of the torque tube beam 1150; b) two vertical portions of the inverted U-shaped edge 1261b defined by the vertical wall 1262 define two vertical bearing surfaces 1264b, 1264c which bear against the side walls 1158a, 1158b in the upper portion 1155 of the torque tube beam 1150; and c) two horizontal portions of the inverted U-shaped edge 1261b defined by the horizontally extending stiffening flange 1263a define two horizontal bearing surfaces 1264d, 1264d which bear against the side walls 1158a, 1158b6 in the upper portion 1155 of the torque tube beam 1150.

The second rib 1266 includes a generally planar, downwardly extending vertical wall 1267. At a lower end 1267a of the vertical wall 1267 there is a short outwardly extending horizontal wall portion 1268 that functions as a stiffening flange 1268a, advantageously providing additional stiffness and rigidity to the mounting bracket 1210 and providing two additional lower horizontal bearing surfaces 1269c-which bear against the side walls 1158a, 1159b of the torque tube beam 1150. When the mounting bracket 1210 is mounted on the upper portion 1155 of the torque tube beam 1150, the second rib 1266 includes an inverted U-shaped peripheral edge 1266b that defines the slot 12776 in the central region 1272 of the lower projection structure 1260 and advantageously includes five bearing surfaces against the torque tube 1150: a) a horizontal portion of the inverted U-shaped peripheral edge 1266b defines an upper horizontal bearing surface 1269a which bears against the upper wall 2256 of the torque tube beam 1150; b) two vertical portions of the inverted U-shaped edge 1266b, 1266c defined by the vertical wall 1262 define two vertical bearing surfaces 1269b, 1269c which bear against the side walls 1158a, 1158b in the upper portion 1155 of the torque tube beam 1150; and c) two horizontal portions of the inverted U-shaped edge 1266b defined by the horizontally extending stiffening flange 1268a define two horizontal bearing surfaces 1269d, 1269e which bear against the side walls 1158a, 1158b in the upper portion 1155 of the torque tube beam 1150.

When the saddle 1278 of the mounting bracket 1210 is mounted on the upper portion 1155 of the torque tube beam 1150, the saddle 1278 (comprising the two slots 1277a, 1277b of the two ribs 1261, 1266) provides a total often bearing surfaces, namely: 1264a, 1269a (two upper horizontal bearing surfaces); 1264b, 1264c, 1269b, 1269c (four vertical bearing surfaces), 1264d, 1264e, 1269d, 1269e (four horizontal bearing surfaces) which advantageously inhibits axial movement of the mounting bracket 1210 with respect to the torque tube beam 1150 in the axial or vertical downward direction and restrain longitudinal movement of the mounting bracket 1210 with respect to the torque tube beam 1150 along the central axis CA of the mounting bracket. Additionally, when the pair of fasteners 1310 are passed through the respective apertures 1286 of the central attachment structure 1280 and tightened to cinch the securing strap 1300 against the lower wall 1157 of the torque tube beam 1150, the lower bearing surface 1284 of the horizontal wall 1282 of the central attachment structure 1280 bears against the upper wall 1156 of the torque tube beam 1150 and a central portion 1302 of the strap 1300 bears against the lower wall 1157 of the torque tube beam thereby inhibiting movement of the mounting bracket 1210 with respect to the torque tube beam 1150 in the axial direction either upwardly or downwardly and further restrains transverse movement of the mounting bracket 1210 with respect to the torque tube beam 1150 along the longitudinal axis LA of the torque tube beam 1150 (that is, movement along the transverse axis TA of the mounting bracket 1210). In total, the multiple bearing surfaces afforded by the mounting bracket assembly 1200a of the present disclosure, upon tightening of the fasteners 1210 and cinching of the securing strap 1210 snugly against the torque tube beam 1150 advantageously results in a secure mounting of the mounting bracket assembly 1200a and the photovoltaic modules 1190a, 1190b to the torque tube beam 1150 capable of withstanding high wind shear conditions and snow loads.

Figure 6:
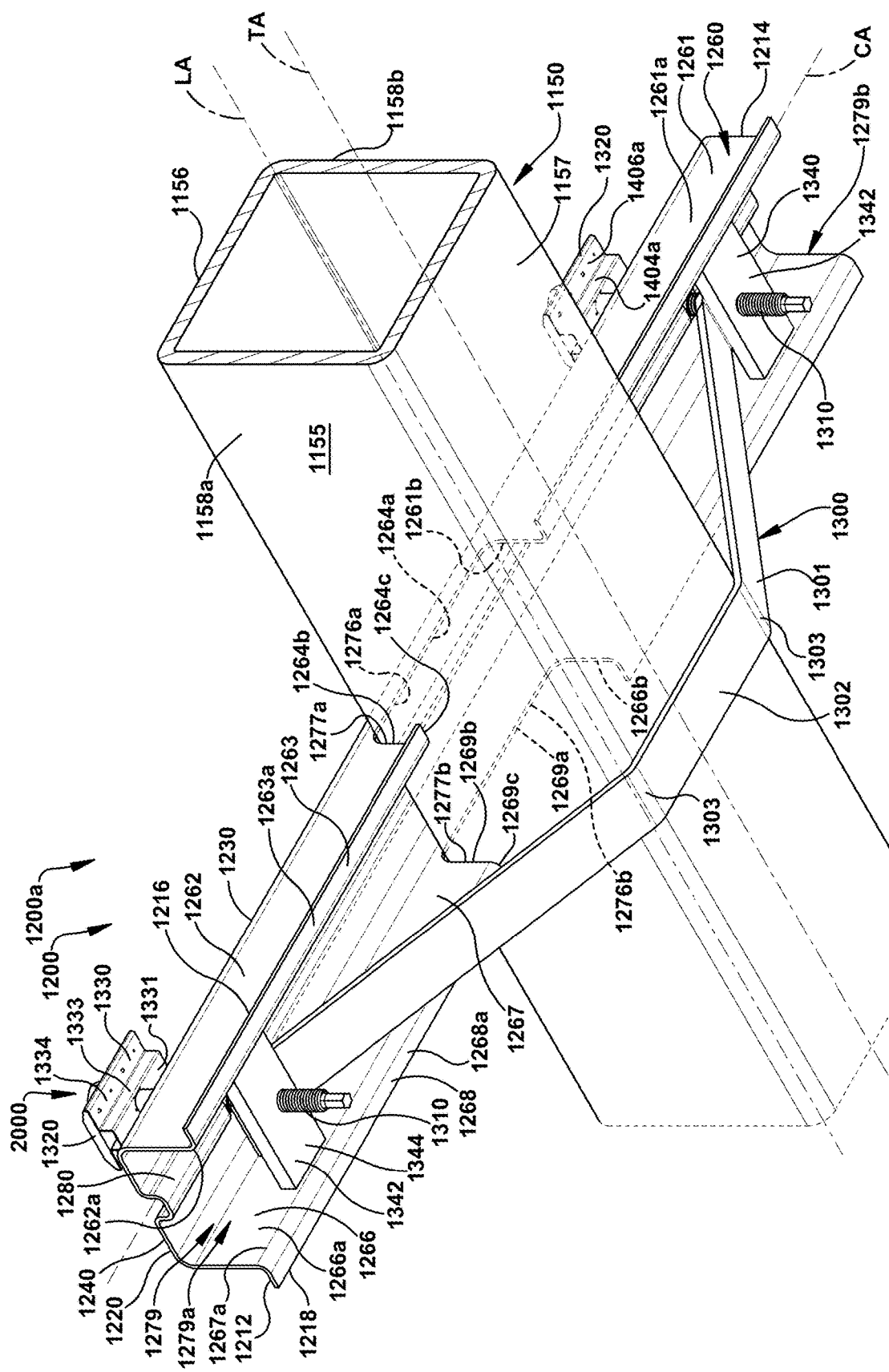
FIG. 6 is a schematic bottom perspective view of the mounting bracket assembly and torque tube beam shown in FIG. 5.

The first rib 1261 extends vertically downwardly from a short curved transition wall segment bridging the outer portion 1235 of the horizontal wall 1231 of the first planar body 1230 of the upper support structure 1120, while the second rib 1266 extends vertically downwardly from a short curved transition wall segment bridging the outer portion 1245 of the horizontal wall 1241 of the second planar body 1240 of the upper support structure 1130. The spaced apart vertical walls 1262, 1267 of the two ribs 1261, 1266 of the lower projection structure 1280 can be viewed as defining a horizontal channel 1279 of the mounting bracket 1210. As best seen in FIG. 6, a first section 1279a of the horizontal channel 1279 is located in the first portion 1270 of the lower projection structure 1260 adjacent the first end 1212, while a second section 1279b of the horizontal channel 1279 is located in the second portion 1271 of the lower projection structure 1260 adjacent the second end 1214.

Fastener Assembly 2000

Figure 4:
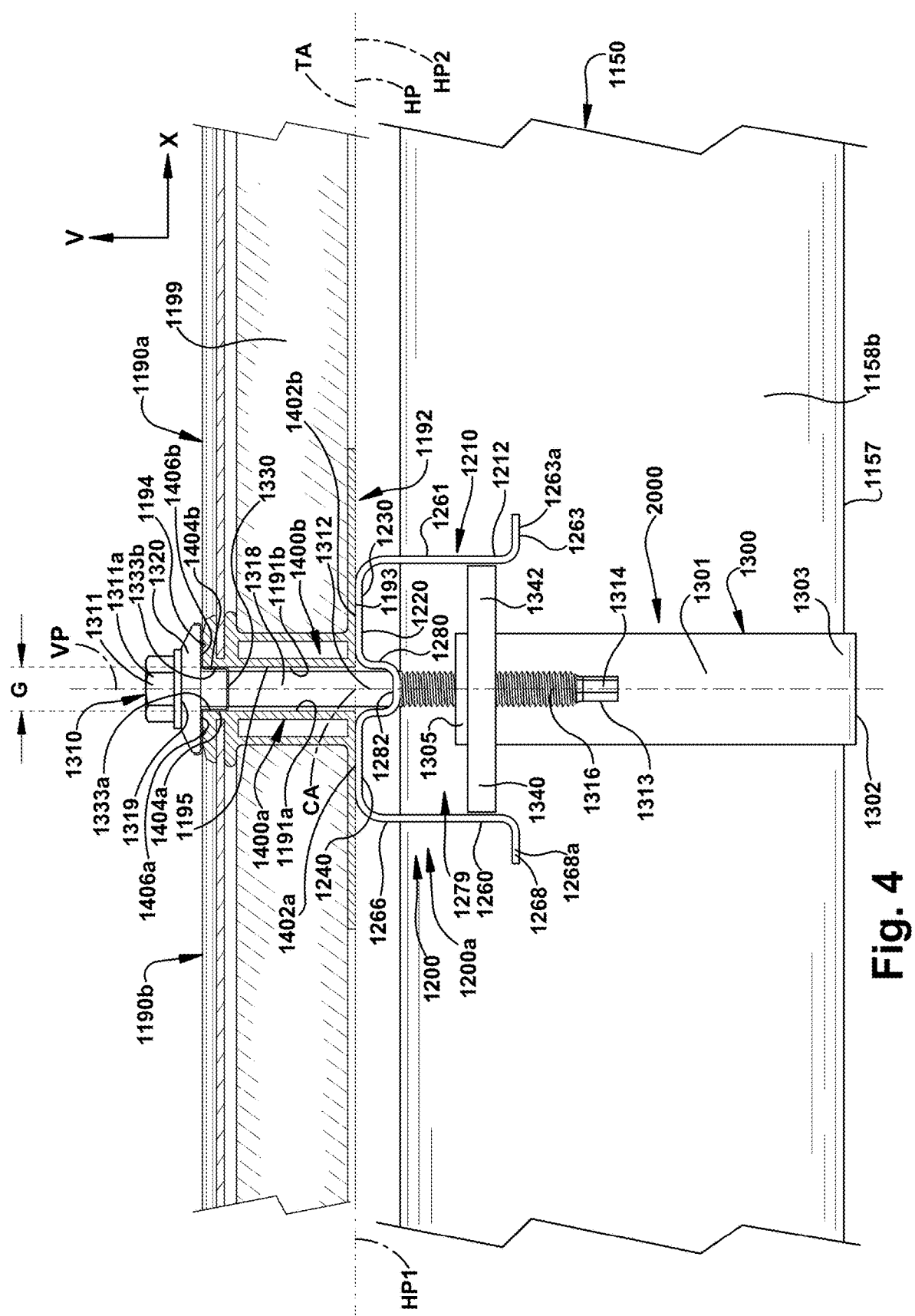
FIG. 4 is a schematic view, partially in side elevation and partially in vertical section, of a portion of the solar tracker assembly of FIG. 1 showing the mounting bracket assembly of FIG. 3, a portion of a pair of photovoltaic modules affixed to the mounting bracket and a portion of the torque tube beam.
Figure 5:
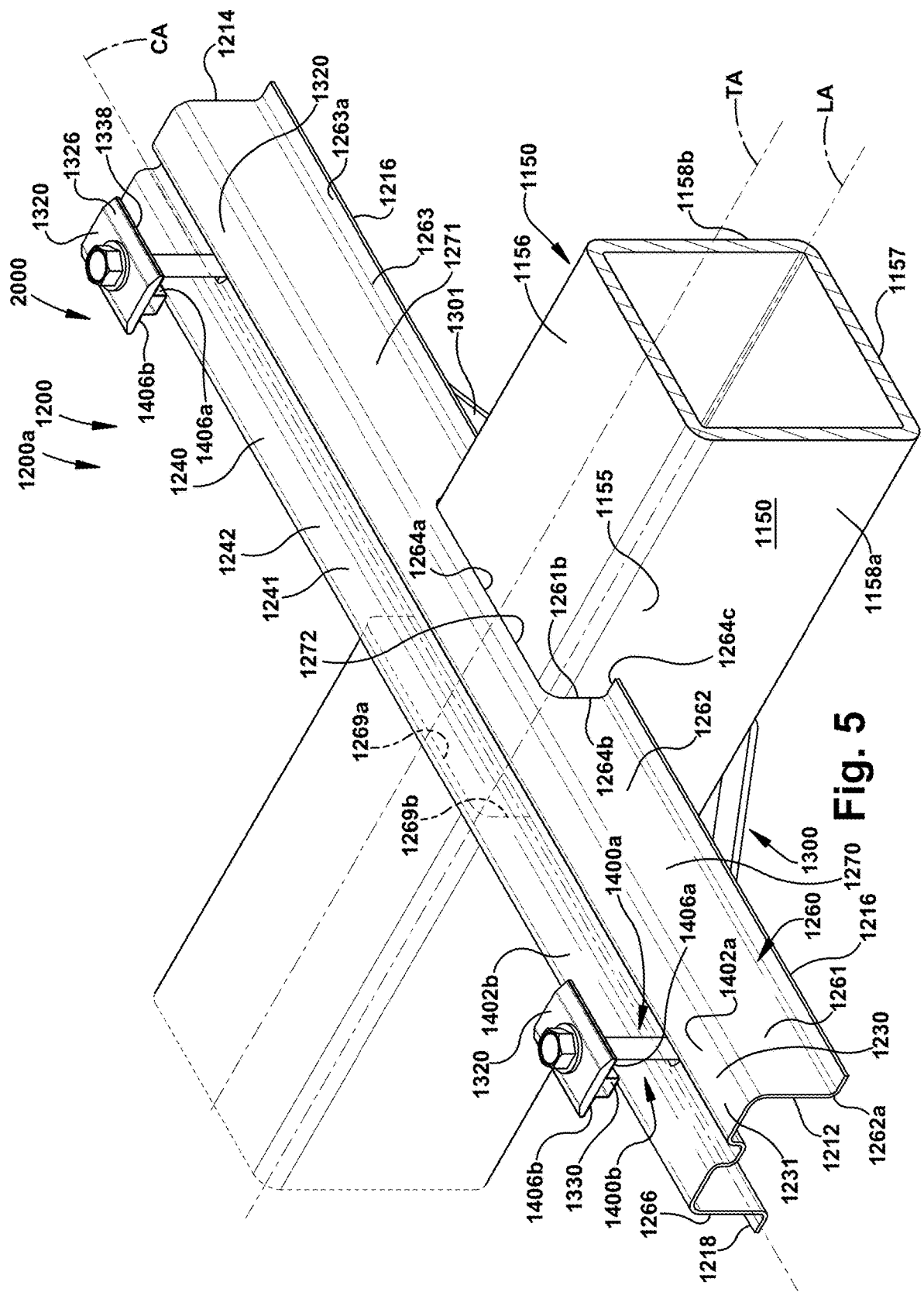
FIG. 5 is a schematic top perspective view of a portion of the solar tracker assembly of FIG. 1 showing the mounting bracket assembly of FIG. 3 affixed to the torque tube beam, with the pair of photovoltaic modules removed for clarity.

As noted previously, the fastener assembly 2000 of the present disclosure advantageously functions both to: a) secure the facing edge portions 1191a, 1191b of the first and second adjacent photovoltaic modules 1190a, 1190b to the mounting bracket 1200a; and b) tighten or cinch the securing strap 1300 against the torque tube beam lower wall 1157 to thereby firmly affix the mounting bracket 1200a to the torque tube beam 1150 and, via the attachment of the photovoltaic modules 1190a, 1190b to the mounting bracket 1210 to thereby securely couple the pair of photovoltaic modules 1190a, 1190b to the torque tube beam 1150. The fastener assembly 2000 includes: a) the pair of fasteners 1310, b) the pair of clamp bodies 1320, c) the pair of bonding clips 1330; d) the pair of fastener engagement members 1340; and e) the securing strap 1300. Specifically, as best seen in FIG. 4, in one exemplary embodiment, the mounting bracket 1210 and fastener assembly 2000 advantageously provide a pair of generally C-shaped mounting pedestals 1400a, 1400b which receive and provide bearing surfaces for securely holding the respective facing edge portions 1191a, 1191b of the first and second adjacent photovoltaic modules 1190a, 1190b. In one exemplary embodiment, the mounting pedestal 1400a for the edge portion 1191a of the photovoltaic module 1190a includes a lower horizontal bearing surface 1402a, a vertical bearing surface 1404a, and an upper horizontal bearing surface 1406a that supports the C-shaped frame member 1192 of the photovoltaic module 1190a, while the mounting pedestal 1400b for the edge portion 1192b of the photovoltaic module 1190b includes a lower horizontal bearing surface 1402b, a vertical bearing surface 1404b, and a upper horizontal bearing surface 1406b that supports the C-shaped frame member 1192 of the photovoltaic module 1190b.

Figure 7:
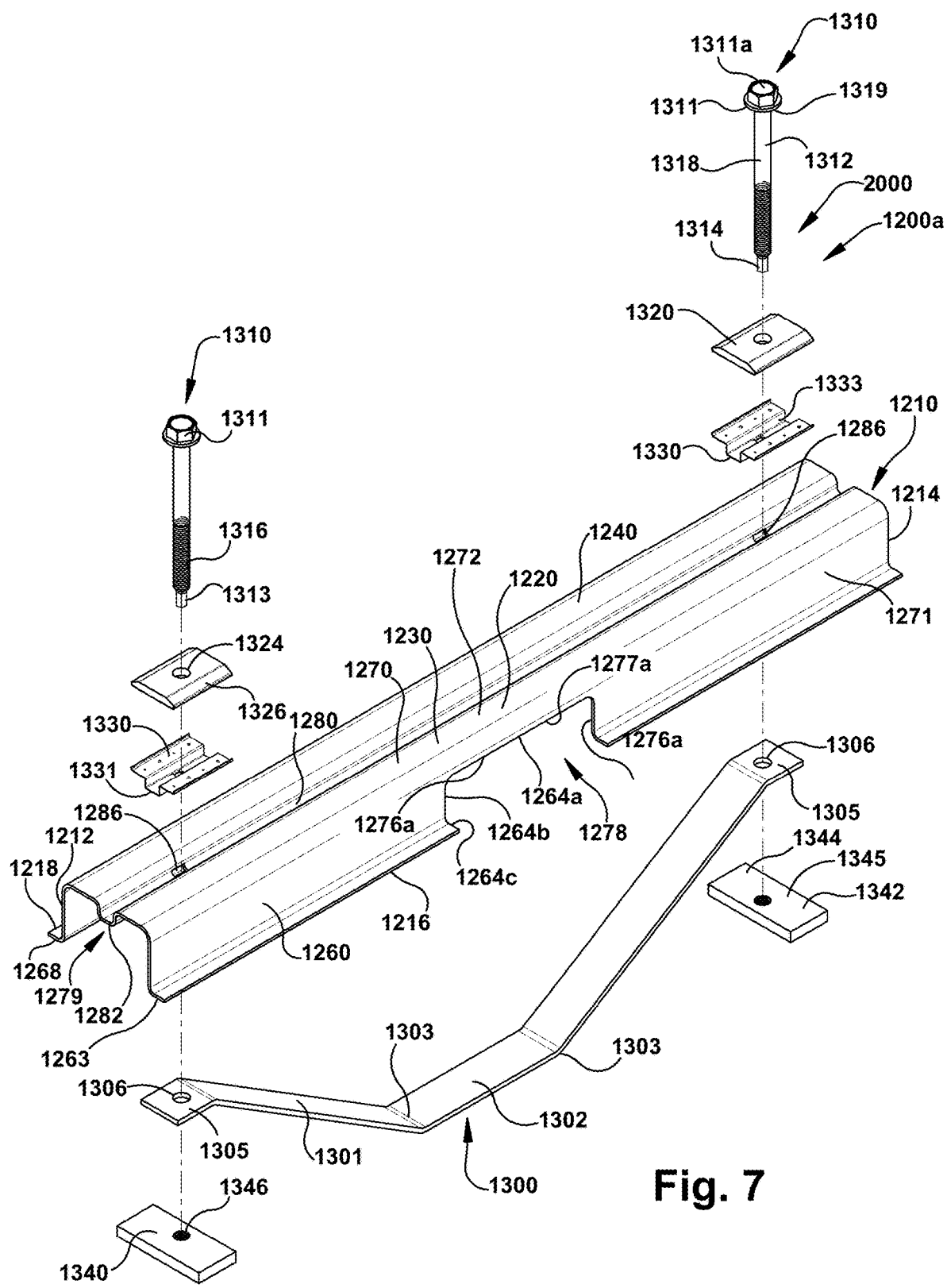
FIG. 7 is a schematic exploded, top perspective view of the mounting bracket assembly of FIG. 3 including a mounting bracket and a fastener assembly, including a pair of fasteners, a pair of clamp bodies, a pair of bonding clips, a pair of fastener engagement members, and a securing strap, of the mounting bracket assembly.
Figure 8:
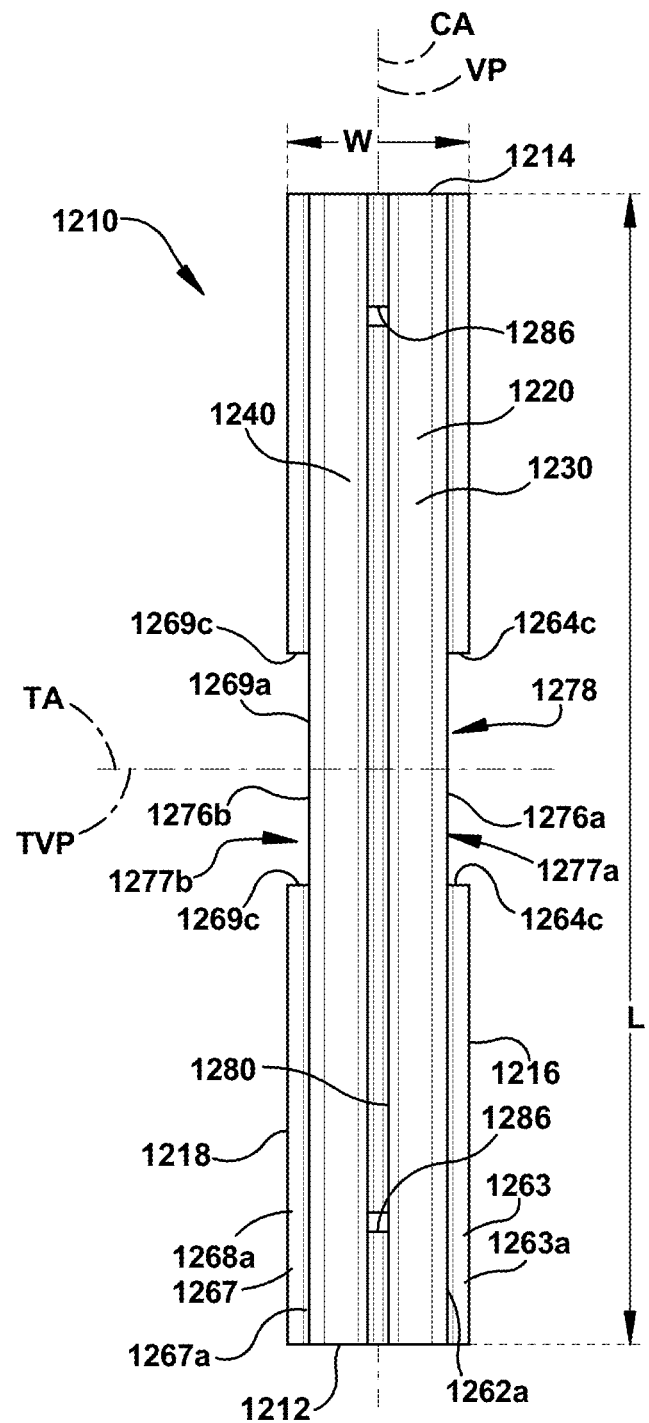
FIG. 8 is a schematic top plan view showing the mounting bracket of the mounting bracket assembly of FIG. 3.

In one exemplary embodiment, as best seen in FIG. 7, the pair of fasteners 1310 each include an enlarged head 1311 and a cylindrical body or shaft 1312 extending from the head 1311. In one exemplary embodiment, the enlarged head 1311 and a distal portion 1313 of the shaft 1312 both includes drivers 1311a, 1314, for example standard hex head drivers, which advantageously allows the pair of fasteners 1310 to be fastened by a worker working from a position above the table 1110 using an appropriate sized driver socket or by a worker working from a position below the table 1110 using an appropriate sized driver socket. Additionally, the shaft 1312 of the fastener 1310 includes a threaded portion 1316 adjacent the driver distal portion 1313. The enlarged head 1311 of each fastener 1310 includes a generally planar lower surface 1319 (FIG. 4) which functions as a seating surface for an upper surface 1328 the clamp body 1320 FIGS. 12 and 13). An outer diameter of the driver distal portion 1313 is slightly smaller than the threaded portion 1316 and the threaded portion 1316 has an outer diameter that is slightly smaller than an unthreaded proximal portion 1318 of the shaft 1312.

In one exemplary embodiment, as best seen in FIGS. 7 and 11, the securing strap 1300 is a flexible, longitudinally extending strap which includes an intermediate section 1301 and a pair of end sections 1305. The intermediate section 1301 includes a central straight portion 1302 having a length approximately equal to a width of the lower wall 1157 of the torque tube beam 1150 and a pair of bends 1303 at either end of the central straight portion 1302. Each of the end sections 1305 including an opening 1306 that receives the respective shaft 1312 of the pair of fasteners 1310. In one exemplary embodiment, the securing strap 1300 is approximately 1 inch wide and has a thickness of 0.11 inch.

As best seen in FIGS. 6 and 7, the threaded portion 1316 of the shaft 1312 of each fastener 1310 is sized to be threadedly received in a threaded central opening 1346 of a respective pair of fastener engagement members 1340. In one exemplary embodiment, the pair of fastener engagement members 1340 comprise a pair of nut plates 1342. Each nut plate 1342 includes a generally rectangular body 1344 and a central threaded opening 1346 that passes vertically through the body 1344. The rectangular body 1344 of the nut plate 1342 is sized such that it is constrained from rotating by the side walls 1290, 1292 of the central attachment structure 1280 of the mounting bracket 1200a. Prior to assembly of the mounting bracket assembly 1200 to the torque tube beam 1150, the pair of fasteners 1310 are inserted through respective openings or apertures 1286 in the horizontal wall 1282 of the central attachment structure 1280 of the mounting bracket 1210. The securing strap 1300 is then positioned such that the shafts 1312 of the pair of fasteners 1310 pass through the respective pair of openings 1306 at opposite end sections 1305 of the securing strap 1300. The threaded end portions 1316 of the pair of fasteners 1310 are then threaded into respective ones of the pair of nut plates 1342 such that the end sections 1305 of the securing strap 1300 in the region of the openings 1306 overlie and bear against an upper surface 1345 of the respective pair of nut plates 1342.

When the mounting bracket assembly 1200a is positioned on the torque tube beam 1150 such that the upper portion 1155 of the torque tube beam is received in the saddle or through slot 1278 of the lower projection structure 1260 of the mounting bracket 1210, the torque tube beam 1150 is interposed between the central portion 1302 of the securing strap 1300 and the mounting bracket 1210. This entrapment of the torque tube beam 1150 between the securing strap 1300 and the lower projection structure 1260 of the mounting bracket 1210 causes the pair of nut plates 1342 to be positioned with within the channel 1279 defined by the ribs 1261, 1266 of the lower projection structure 1260, one nut of the pair of nut plates 1342 being positioned in the first section 1279a of the channel 1279 located in the first portion 1270 of the lower projection structure 1260 and the second nut of the pair of nut plates 1342 being positioned in the second section 1279b of the channel 1279 located in the second portion 1271 of the lower projection structure 1260.

Each fastener of the pair of fasteners 1310 is constrained from downward movement with respect to the mounting bracket 1210a by the horizontal wall 1282 of the central attachment structure 1280. Further, as explained above, the spaced apart vertical walls 1262, 1266 of the two ribs 1261, 1266 of the lower projection structure 1280 define the horizontal channel 1279 of the mounting bracket 1210. The size of the rectangular body 1344 of each nut plate 1342 is large enough such that each nut plate of the pair of nut plates 1342 is constrained from rotation within the channel 1279 by the vertical walls 1262, 1266 of the two ribs 1261, 1266. That is, as the fasteners 1210 are tightened (from either the top of the fastener 1210 using the hex driver head portion 1311a or the bottom of the fastener 1210 using the hex driver distal portion 1314), by threaded engagement, the nut plate 1342 moves vertically upwardly. The end sections 1305 of the securing strap 1300, which bear against the upper surface 1345 of the respective pair of nut plates 1342 and thus also move vertically upwardly with the nut plates 1342. The upward movement of the end sections 1305 of the securing strap 1300, as the pair of fasteners 1210 are tightened cause the central portion 1302 of the securing strap 1300 to tighten or cinch against the lower wall 1157 of the torque tube beam and thereby snugly secures the mounting bracket 1210 to the torque tube beam 1150 by this cinching action.

An alternate exemplary embodiment of the fastener assembly 2000 is schematically depicted at 2000' in FIGS. 37-39. The fastener assembly 2000' is similar in structure and function to the fastener assembly 2000 with the exception that the pair of nut plates 1342 of the fastener assembly 2000 are replaced by a pair of clip style, threaded U-nuts 1350. Each of the clip style, threaded U-nuts 1350 include a generally horizontally oriented clip or bracket 1352 that slides over the respective end portions or end sections 1305 of the securing strap 1300. Each U-nut 1350 includes a downwardly angled tab 1355 extending from an upper leg 1354 of the bracket 1352. The angled tab 1355 is received in the opening 1306 of the end section 1305 of the securing strap 1300 to maintain the position of the U-nut 1350 with respect to the end section 1305 of the securing strap 1300 such that a vertical through bore 1351 of the U-nut 1350 is aligned with the opening 1306 of the end section 1305. Each of the pair of U-nuts 1350 further includes a cylindrical base 1356 extending downward from the bracket 1352. The cylindrical base 1356 includes a threaded opening 1358 that is part of the vertical through bore 1351 of the U-nut 1350. The threaded opening 1358 of the U-nut 1350 receives the threaded portion 1316 of the shaft 1312 of the respective fastener 1310. As with the nut plates 1342 of the fastener assembly 2000, as the pair of fasteners 1210 of the fastener assembly 2000' are tightened, the U-nuts 1350 move upwardly causing the end sections 1305 of the securing strap 1300 to move upward. The upward movement of the end sections 1305 of the securing strap 1300, as the fasteners 1310 are tightened, cause the central portion 1302 of the securing strap 1300 to tighten or cinch against the lower wall 1157 of the torque tube beam and thereby snugly secures the mounting bracket 1210 to the torque tube beam 1150. Suitable U-nuts 1350 are available from A. RAYMOND TINNERMAN INDUSTRIAL, INC., 1060 W. 130th St., Brunswick, Ohio 44112, as part no. 138330005, product description M8 UNUT LUG.

The fastener assembly 2000 also includes the pair of clamp bodies 1320. Each of the pair of clamp bodies 1320 includes a base 1322. The base 1322 includes a vertically extending central opening 1324 and a pair of outwardly extending, oppositely directed overhanging ledges 1326. For each clamp body of the pair of clamp bodies 1320, an upper surface 1328 of the clamp body 1320 is seated against the lower surface 1319 of the enlarged head 1311 of the fastener 1310 and a lower surface 1327 of the base 1322 provides a seating surface for a pair of extending flanges 1334 of a respective bonding clip of the pair of bonding clips 1330. In one exemplary embodiment the clamp body 1320 is fabricated of an aluminum alloy.

The pair of bonding clips 1330 of the fastener assembly 2000 each include a lower recessed base portion 1331, a pair of spaced apart vertically upwardly extending side walls 1333 and a pair of outwardly extending flanges 1334 extending from respective upper ends of the side walls 1333. Each of the side walls 1330 includes an outer wall 1333*a* which is part of a pair of upwardly extending rims 1338 extend along an outermost side 1339 of each of the outwardly extending flanges 1334. Advantageously, the upwardly extending rims 1338 curve up around corresponding outer edges of the pair of extending flanges 1334 of the pair of clamp bodies 1320 to facilitate proper alignment of the clamp bodies 1320 and the corresponding bonding clips 1330. Each of the outwardly extending flanges 1334 includes a generally planar upper surface 1336 and a generally planar lower surface 1337. Each of the upper and lower surfaces 1336, 1337 of the respective flanges 1334 include one or more projections or teeth 1335*a*, 1335*b*, respectively. For each of the pair of bonding clips 1330, the upper surface 1336 of the pair of flanges 1334 seat against the lower surface 1327 of the base 1332 of respective ones of the pair of clamp bodies 1320. The projections 1335*a*, 1335*b* of the upper and lower surfaces 1336, 1337 of the flanges 1334 facilitate a positive electrical connection between the photovoltaic module frame members 1292 and the components of the mounting bracket assembly 1200*a* for electrical grounding purposes. In one exemplary embodiment, the pair of bonding clips 1330 are fabricated of a stainless steel alloy.

Advantageously, the mounting bracket assembly 1200*a* of the present disclosure provides the pair of C-shaped mounting surfaces or pedestals 1400*a*, 1400*b* for securing holding the facing edge portions 1191*a*, 1191*b* of the photovoltaic modules 1190*a*, 1190*b*. As explained previously, in one exemplary embodiment, each of the plurality of photovoltaic modules 1190 includes an outer periphery comprising the C-shaped frame member 1192 which bounds the photovoltaic panel 1199. The C-shaped frame member 1192 includes the lower surface 1193 and the axially or vertically spaced apart parallel upper surface 1194 spaced apart by the vertically extending side wall or side wall surface 1195. Upon assembly, when the facing edge portions 1191*a*, 1191*b* of the adjacent photovoltaic modules 1190*a*, 1190*b* are positioned on the upper support surfaces 1232, 1242 of the first and second planar bodies 1230, 1240 of the upper support structure 1220 of the mounting bracket 1210, the lower surface 1193 of the frame member 1192 of the photovoltaic module 1190*a* bears against and is supported by the upper support surface 1232 of the first body 1230 of the upper support structure 1220 of the mounting bracket 1210, while the lower surface 1193 of the frame member 1192 of the photovoltaic module 1190*b* bears against and is supported by the upper support surface 1242 of the second planar body 1240 of the upper support structure 1220 of the mounting bracket 1210. At the same time, the side wall or side wall surface 1195 of the frame member 1192 of the photovoltaic module 1190*a* bears against respective side walls 1333 of the pair of bonding clips 1330 of the fastener assembly 2000, while the side wall or side wall surface 1195 of the frame member 1192 of the photovoltaic module 1190*b* bears against respective side walls 1333 of the pair of bonding clips 1330 of the fastener assembly 2000. The gap G between facing edge portions 1191*a*, 1191*b* of the photovoltaic modules 1190*a*, 1190*b* is determined by the spacing between the side walls 1333 of the pair of bonding clips 1330. As noted previously, in one exemplary embodiment, the gap G defined by the side walls 1333 of the pair of bonding clips 1330 is approximately 0.394 in. Finally, as the pair of fasteners 1310 of the fastener assembly 2000 are tightened, the lower surfaces 1337 of the outwardly extending flanges 1334 of the pair of bonding clips 1330 contact and bear against the upper surface 1194 of the frame members 1192 of the photovoltaic modules 1190*a*, 1190*b*.

Thus, upon tightening of the pair of fasteners 1310 of the fastener assembly 2000, the lower surface 1193, the side wall surface 1195 and the upper surface 1194 of the C-shaped frame member 1192 of the photovoltaic module 1190*a* are securely held and clamped within the c-shaped pedestal 1400*a*. The C-shaped pedestal 1400*a* includes: a) the lower horizontal bearing surface 1402*a* comprising the upper support surface 1232 of the first planar body 1230 of the upper support structure 1220 of the mounting bracket 1210 (which bears against the lower surface 1193 of the frame member 1192 of the photovoltaic module 1190*a*); b) the vertical bearing surface 1204*a* comprising outer surfaces the side walls 1333 of the pair of bonding clips 1330 of the fastener assembly 2000 (which bear against the side wall surface 1195 of the frame member 1192 of the photovoltaic module 1190*a*); and c) the upper horizontal bearing surface 1406*a* comprising the lower surfaces 1337 of the outwardly extending flanges 1334 of the pair of bonding clips 1330 (which bear against the upper surface 1194 of the frame member 1192 of the photovoltaic module 1190*a*).

Similarly, upon tightening of the pair of fasteners 1310 of the fastener assembly 2000, the lower surface 1193, the side wall surface 1195 and the upper surface 1194 of the C-shaped frame member 1192 of the photovoltaic module 1190*b* are securely held and clamped within the c-shaped pedestal 1400*b*. The C-shaped pedestal 1400*b* includes: a) the lower horizontal bearing surface 1402*b* comprising the upper support surface 1242 of the second planar body 1240 of the upper support structure 1220 of the mounting bracket 1210 (which bears against the lower surface 1193 of the frame member 1192 of the photovoltaic module 1190*b*); b) the vertical bearing surface 1204*b* comprising the side walls 1333 of the pair of bonding clips 1330 of the fastener assembly 2000 (which bear against the side wall surface 1195 of the frame member 1192 of the photovoltaic module 1190*b*); and c) the upper horizontal bearing surface 1406*b* comprising the lower surfaces 1337 of the outwardly extending flanges 1334 of the pair of bonding clips 1330 (which bear against the upper surface 1194 of the frame member 1192 of the photovoltaic module 1190*b*).

Second Exemplary Embodiment of Mounting Bracket Assembly 2200

A second exemplary embodiment of a mounting bracket assembly or mounting bracket apparatus of the present disclosure is shown generally at 3200 in FIGS. 18-21. The mounting bracket assembly 3200 includes a mounting bracket 3210 and a mounting assembly 4000. The mounting assembly 4000 is similar in structure and function to the mounting assembly 2000 of the mounting bracket assembly 1200 of the first exemplary embodiment. Reference is made to the description of the mounting assembly 2000 and, for brevity, will not be repeated in detail with respect to the description of the mounting assembly 4000 of the mounting bracket assembly 3200. The mounting assembly 4000 includes: a) a securing strap 3300, similar to the securing strap 1300 of the fastener assembly 2000 of the first exemplary embodiment; b) a pair of fasteners 3310, similar to the pair of fasteners 1310 of the fastener assembly 2000 of the first exemplary embodiment, for securing the securing strap 3300 to the torque tube beam 1150; c) a pair of clamp bodies 3320, similar to the pair of clamp bodies 1320 of the fastener assembly 2000 of the first exemplary embodiment; d) a pair of bonding clips 3330, similar to the pair of bonding clips 1330 of the fastener assembly 2000 of the first exemplary embodiment; and e) a pair of fastener engagement members 3340, similar to the pair of fastener engagement members 1340 of the fastener assembly 2000 of the first exemplary embodiment.

The mounting bracket 3210 is similar in structure and function to the mounting bracket 1210 of the first exemplary embodiment and includes an upper support structure 3220, a lower projection structure 3260, and a central attachment structure 3280. The mounting bracket 3210 includes first and second ends 3212, 3214, first and second sides 3216, 3218, first and second sections 3219*a*, 3219*b*, bisected by a central axis CA and a central vertical plane VP of the mounting bracket 3210, and front and back halves 3219*c*, 3219*d*, bisected by a transverse axis TA and a transverse vertical plane TVP, similar to the first and second ends 1212, 1214, the first and second sides 1216, 1218, the first and second sections 1219*a*, 1219*b*, and the front and back halves 1219*c*, 1219*d* of the mounting bracket 1210 of the first exemplary embodiment. The lower projection structure 3260 and the central attachment structure 3280 are similar in structure and function to the lower projection structure 1260 and the central attachment structure 1280 of the mounting bracket 1210 of the first exemplary embodiment. The central attachment structure 3280 includes a horizontal wall 3282 having a spaced apart pair of apertures 3286 which extend through the central axis CA of the mounting bracket 3210. In one exemplary embodiment, each of the apertures of the pair of apertures 3286 central attachment structure 3280 are equidistant from the traverse axis TA of the mounting bracket 3210 and are spaced inwardly from the respective first and second ends 3212, 3214 of the mounting bracket 3210 in a direction toward the transverse axis TA. The pair of apertures 3286 receive respective ones of the pair of fasteners 3310 of the fastener assembly 4000. The upper support structure 3220 includes a first planar body 3230 in the first section 3219*a* of the mounting bracket 3210 on one side of the central attachment structure 3280 and a second planar body 3340 in the second section 3219*b* of the mounting bracket 3210 on the other side of the central attachment structure 3280. The first planar body 3230 of the upper support structure 3220 includes a horizontal wall 3231 having an upper surface 3232, while the second planar body 3240 of the upper support structure 3220 includes horizontal wall 3241 having an upper surface 3242.

As shown in FIGS. 1-2, the plurality of photovoltaic modules 1190 are rectangular in top plan view and, in one exemplary embodiment, have dimensions on the order of two meters by one meter. To maximize the number of modules 1190 along an extent of the torque tube beam 1150, each of the plurality of photovoltaic modules 1190 is positioned with respect to the torque tube beam 1150 such that the longer dimension extending along a principal axis PA of each of the plurality of photovoltaic modules 1190 extends in the east-west direction or Y horizontal direction and the shorter dimension of each of the modules 1190 extends in the north-south or X horizontal direction, hence, a width TW of the table 1110 of the solar tracker system 1100 is approximately two meters (78.7 in.). In one exemplary embodiment, a length L of the mounting bracket 3210 is approximately 20 inches. As such, there is a first unsupported "overhand" or extension 9002*a* of the module 1190 of just over 29 inches, as viewed along the principal axis PA, extending beyond the first end 3212 of the mounting bracket 3210 and a second unsupported "overhang" or extension 9002*b* of the module 1190 of just over 29 inches, as viewed along the principal axis PA, beyond the second end 3214 of the mounting bracket 3210. As viewed along the principal axis PA and in overhead plan view, each module of the plurality of modules 1190 may be viewed as having: a) a supported middle portion 9004 of each of the plurality of modules 1190, which would be that portion of a module 1190 that is within a rectangular region approximately one meter wide by 20 inches defined or bounded by first and second ends 3212, 3214 of the pair of mounting brackets 3210 that support the module 1190; and b) the first and second of unsupported extensions 9002*a*, 9002*b* of the module 1190, each of which would be one meter wide by 29 inches in length, that is, those portions of the module 1190 that are beyond the first and second ends 3212, 3214 of the pair of mounting brackets that support the module 1190.

While, as explained above, each module 1190 includes a photovoltaic panel 1199 surrounded by a peripheral frame 1192. In spite of the peripheral frame 1192, the unsupported extensions 9002*a*, 9002*b* of the module 1190 tend to bend or deflect downwardly due to gravitation force. While slight downward deflections of unsupported extensions 9002*a*, 9002*b* of the module 1190 are acceptable, e.g., a total deflection on the order of 0.5 inch at opposite first and second ends 9003*a*, 9003*b* of unsupported extensions 9002*a*, 9002*b* of the module 1190, as compared to the supported middle portion 9004, it is desirable to avoid downward deflections that are too large in magnitude for at least two reasons. From an aesthetic view, large downward deflections of the opposite first and second ends 9003*a*, 9003*b* of the unsupported extensions 9002*a*, 9002*b* of the plurality of modules 1190 may visually noticeable by a customer, which may lead the customer to believe that the solar tracker system 1100 was not properly installed or that the plurality of modules 1190 is not properly supported. Second, too great a deflection of the unsupported extensions 9002*a*, 9002*b* of the plurality of modules 1190 may result in micro-cracking of the cells or material of the photovoltaic panel material. Although the exact values are not known and the extent of micro-cracking would depend on the specific parameters (size, weight, material, stiffness, etc.) of a given photovoltaic panel 1199 and peripheral frame 1192 of a module 1190, as well as wind and other loading forces experienced by the module, etc. However, there is some indication that micro-cracking of the photovoltaic panel material resulting from large deflections of the opposite first and second ends 9003a, 9003b of the unsupported extensions 9002a, 9002b of the plurality of modules 1190 could lead, over time, to a reduction in the production efficiency or electrical output of the plurality of modules 1190.

One approach to dealing with the issue of downward deflection of the unsupported extensions 9002a, 9002b is to increase the length of the mounting bracket 3210 in order to reduce the extent of each of the unsupported extensions 9002a, 9002b of a module 1190. However, increasing the length of the mounting bracket 3210 results in an undesirable increase in fabrication cost of the bracket and the weight of the bracket. Thus, to the extent possible, it would be desirable to avoid increasing the size of the bracket 3210 while still mitigating the issue of downward deflection of the unsupported extensions 9002a, 9002b. The mounting bracket 3210 of the second exemplary embodiment addresses this issue by adding a first upwardly extending protrusion 3238 which extends upwardly from the upper surface 3232 of the first planar body 3230 and a second upwardly extending protrusion 3248 which extends upwardly from the upper surface 3242 of the second planar body 3240. In one exemplary embodiment, the respective upwardly extending protrusions 3238, 3248 are located outwardly of the pair of apertures 3216 of the of the central attachment structure 3280. The protrusions 3238, 3248 bear against a lower surface of the module 1190 and advantageously function to cause the supported middle portion 9004 of each module of the plurality of modules 1190 to be slightly curved or bowed upwardly as the pair of fasteners 3310 are tightened to secure the strap 3300 to the torque tube beam 1150 and secure facing edge portions 1191a, 1191b of the photovoltaic modules 1190a, 1190b to the first and second planar bodies 3230, 3240 of the upper support structure 3220. In one exemplary embodiment, the first upwardly extending protrusion 3238 comprises a spaced apart pair of dome-shaped protrusions 3238a, 3238b in proximity to or adjacent to the first end 3212 of the mounting bracket 3210 and the second upwardly extending protrusion 3248 comprises a spaced apart pair of dome-shaped protrusions 3248a, 3248b in proximity to or adjacent to the second end 3214 of the mounting bracket 3210.

The upward arcuate shape of the supported middle portion 9004 of each module of the plurality of modules 1190 advantageously mitigate the extent of the downward deflection of unsupported extensions 9002a, 9002b of the module 1190. That is, plurality of raised protrusions 3238a, 3238b, 3248a, 3248b define part of a support surface 3232a of the first planar body 3230 of the upper support structure 3220 and define part of a support surface 3242a of the second planar body 3240 of the upper support structure 3220 and cause the supported middle portions 9004 of each of the plurality of modules 1190 to bow upwardly. The lower surface 1193 of the C-shaped frame member 1192 of the supported middle portion 9004 of the module 1190 rests on support surfaces 3232a, 3242a comprising horizontal planar portions of the first and second horizontal walls 3231, 3241 and rests on upper surfaces of the raised protrusions 3238a, 3238b, 3248a, 3248b in regions of the plurality of raised protrusions 3238a, 3238b, 3248a, 3248b. In one exemplary embodiment, a height of each of the raised protrusions 3238a, 3238b, 3248a, 3248b above the planar surface of the respective horizontal walls 3231, 3241 is approximately 0.125 inch and the raised protrusions are formed by a stamping process which is performed subsequent to roll-forming of the mounting bracket 3210. Depending on the direction of the stamping process, the raised protrusions may be formed by embossing or debossing.

The upward bowing of the supported middle portion 9004 of each module 1190 tends to cancel out at least a portion of the downward deflection of the unsupported extensions 9002a, 9002b of each module 1190. Accordingly and advantageously, the net effect is that the downward deflections that opposite ends 9003a, 9003b of the unsupported extensions 9002a, 9002b of each module 1190 is less than otherwise would be experienced absent the upward bowing of the supported middle portion 9004 of the modules 1190 resulting from the presence of the plurality of raised protrusions 3238a, 3238b, 3248a, 3248b of the first and second planar bodies 3230, 3240 of the upper support structure 3220 of the mounting bracket 3210. In one exemplary embodiment, two of the raised protrusions 3238a, 3238b are advantageously located on the upper surface 3232 of the horizontal wall 3231 of the first planar body 3230 in close proximity to the first end 3212 of the mounting bracket 3210 and the other two of the raised protrusions 3248a, 3248b are located the upper surface 3242 of the horizontal wall 3241 of the second planar body 3240 in close proximity to the second end 3214 of the mounting bracket 3210.

Third Exemplary Embodiment of Mounting Bracket Assembly 5200

Figure 22:
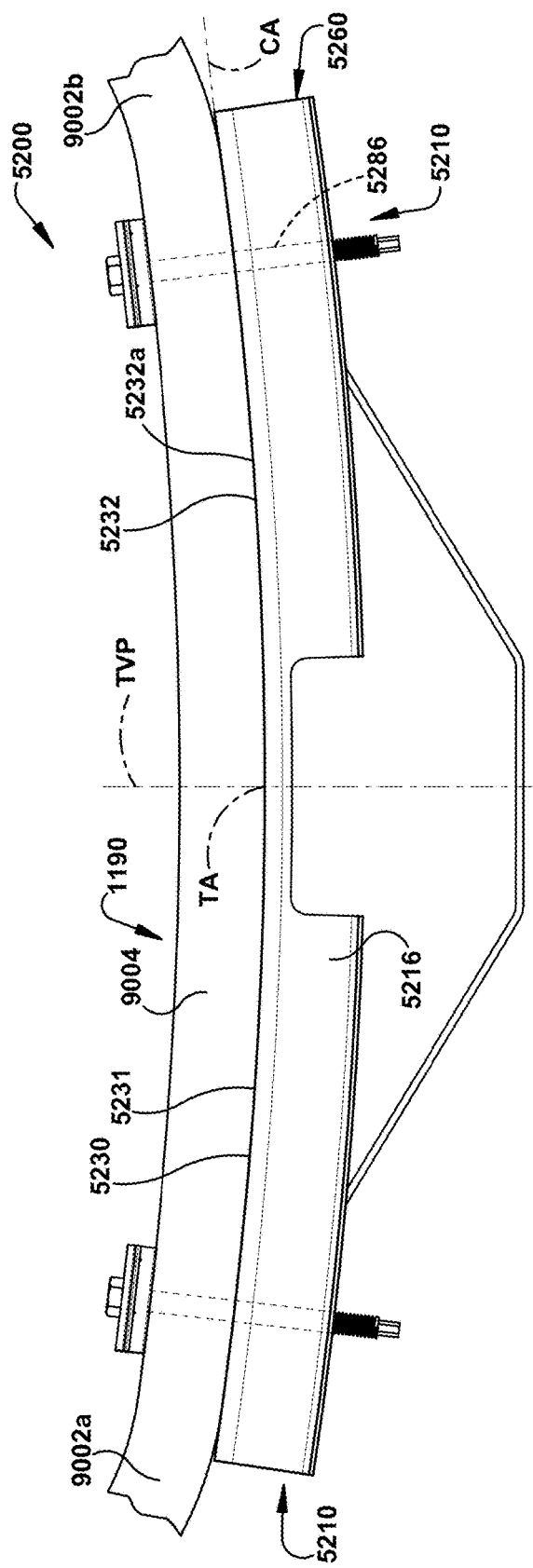
FIG. 22 is a schematic front elevation view of a third exemplary embodiment of a mounting bracket assembly of the present disclosure.
Figure 23:
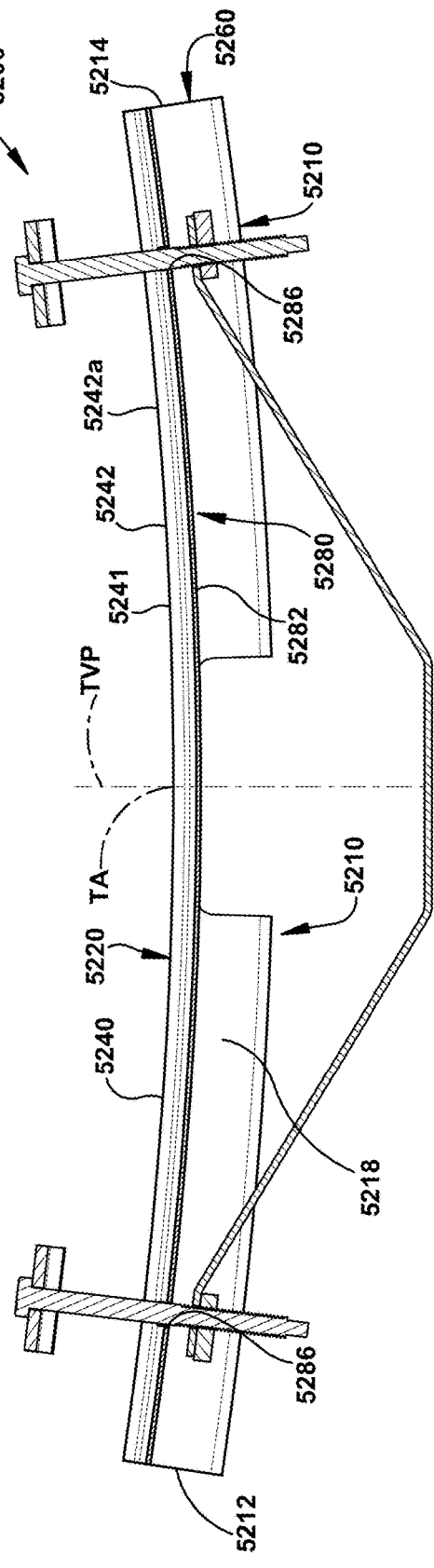
FIG. 23 is a schematic vertical section view of the mounting bracket of FIG. 22.
Figure 24:
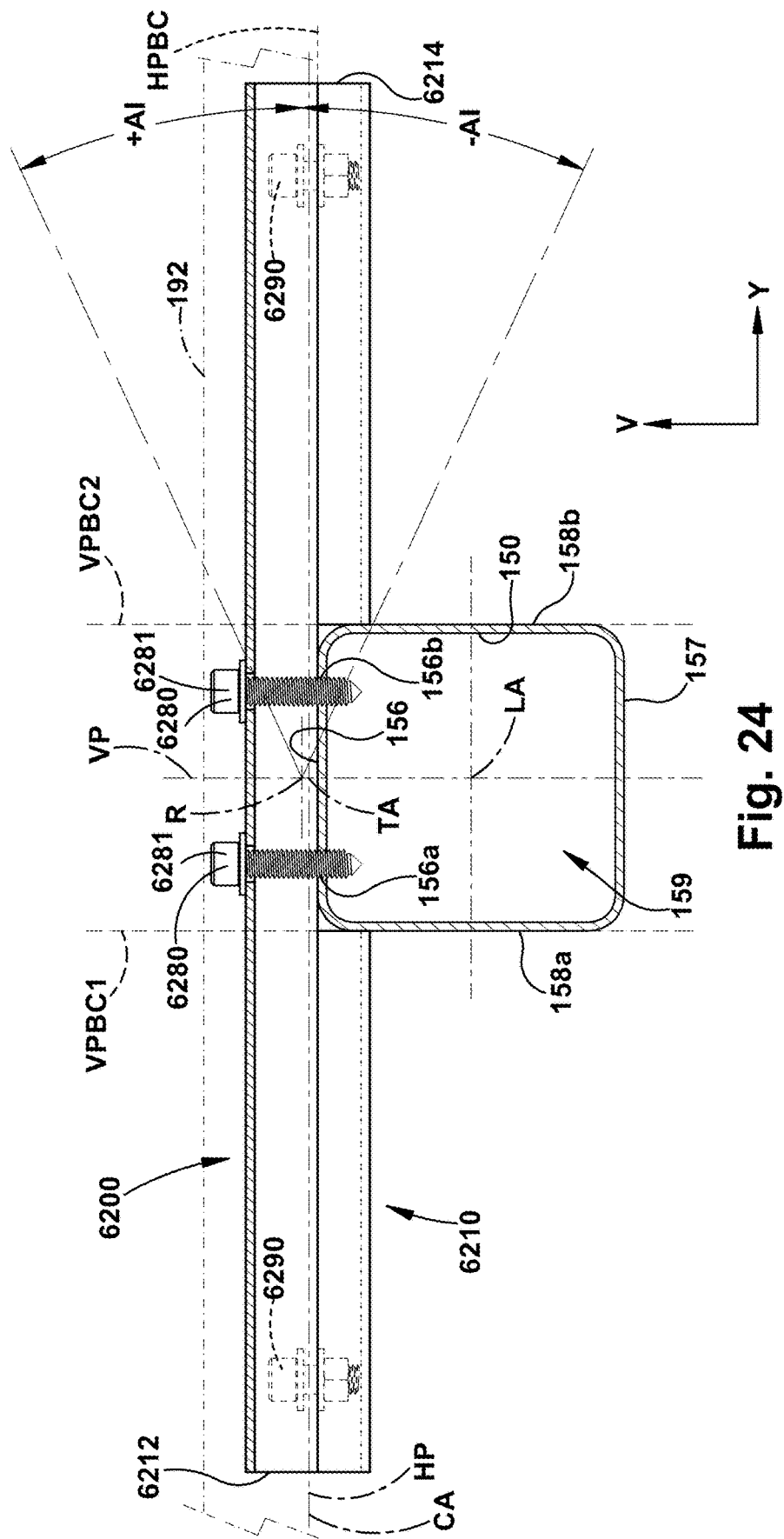
FIG. 24 is a schematic vertical section view of a portion of a fourth exemplary embodiment of a mounting bracket assembly of the present disclosure, as mounted to a portion of a torque tube beam suitable for use with the solar tracker assembly.

A third exemplary embodiment of a mounting bracket assembly of the present disclosure is shown generally at 5200 in FIGS. 22 and 23. The mounting bracket assembly 5200 includes a mounting bracket 5210 and a fastener assembly 5999. The fastener assembly 6000 is similar in structure and function to the fastener assemblies 2000, 4000 of the mounting bracket assemblies 1200, 3200 of the first and second exemplary embodiments. The mounting bracket 5210 is similar in structure and function to the mounting bracket 1210 of the first exemplary embodiment. The mounting bracket 5210 includes an upper support structure 5220, a lower projection structure 5260, and a central attachment structure 5280. The mounting bracket 5210 includes first and second ends 5212, 5214 and first and second sides 5216, 5218. A central axis CA and a vertical plane VP extend parallel to the first and second sides 5216, 5218 and bisects the first and second ends 5212, 5214 and a transverse axis TA and transverse vertical plane extend parallel to the first and second ends and bisects the first and second sides 5216, 5218. The vertical plane VP is aligned with and includes the central axis CA and the transverse vertical plane TVP is aligned with and includes the transverse axis TA.

The lower projection structure 5260 and the central attachment structure 5280 are similar in structure and function to the lower projection structure 1260 and the central attachment structure 1280 of the mounting bracket 1210 of the first exemplary embodiment. The central attachment structure 5280 includes a horizontal wall 5282 having a spaced apart pair of apertures 5286 which extend through the central axis CA of the mounting bracket 5210. In one exemplary embodiment, each of the apertures of the pair of apertures 5286 central attachment structure 5280 are equidistant from the traverse axis TA of the mounting bracket 5210 and are spaced inwardly from the respective first and second ends 5212, 5214 of the mounting bracket 5210 in a direction toward the transverse axis TA.

As explained with respect to the mounting bracket assembly 3200 of the second exemplary embodiment, it is desirable to mitigate the downward deflection the first and second unsupported extensions 9002a, 9002b of each module of the plurality of modules 1190. In the mounting bracket 3210 of the second exemplary embodiment, the presence of the plurality of upwardly extending protrusions 3238, 3248 cause a desirable upward bow of the supported middle portion 9004 of the module 1190. As an alternative, in the mounting bracket 5210 of the third exemplary embodiment, the mounting bracket 5210 is fabricated of roll-formed steel and is given a slight upward curvature or bow during the roll-forming process. The upward curvature of the mounting bracket 5210 is symmetrical, that is, it is a mirror image with respect to the transverse vertical plane TVP of the mounting bracket 5210. As such, the upper support structure 5220 (as well as the lower projection structure 5260 and the central attachment structure 5280) is slightly arcuate or slightly curved upwardly. The upper support structure 5220 includes a first, upwardly curved planar body 5230 and a second, upwardly curved planar body 5240 spaced apart by the central attachment structure 5280. The first curved planar body 5230 of the upper surface structure 5220 includes an upwardly curved wall 5231 having an arcuate upper surface 5232, while the second curved planar body 5240 of the upper support structure 5220 includes an upwardly curved wall 5241 having an arcuate upper surface 5242. The respective arcuate upper surfaces 5232, 5242 of the first and second planar bodies 5230, 5240 define a pair of upwardly curved support surfaces 5232a, 5242a of the upper support structure 5220. The arcuate upper surface 5232 of the first planar body 5230 of the upper support structure 5220 and the upper surface 5242 of the second planar body 5240 of the upper support structure 5220 have centers of curvatures that are vertically above the mounting bracket 5210 and are horizontally aligned. That is, the center of curvature of the arcuate upper surface 5232 would define a line segment that is as wide as a width of the surface 5232, similarly, the center of curvature of the arcuate upper surface 5242 would define a line segment that is as wide as a width of the surface 5242. The two center of curvature line segments would be coaxial with each other and parallel to and vertically above the transverse axis TA of the mounting bracket 5210.

The pair of upwardly curved, planar support surfaces 5232a, 5242a of the upper support structure 5220 of the mounting bracket 5210 advantageously function to cause the supported middle portion 9004 of each module of the plurality of modules 1190 to be slightly curved or bowed upwardly as the pair of fasteners 3310 are tightened to secure the strap 3300 to the torque tube beam 1150 and secure facing edge portions 1191a, 1191b of the photovoltaic modules 1190a, 1190b to the first and second curved planar bodies 5230, 5240 of the upper support structure 5220. The lower surface 1193 of the C-shaped frame member 1192 of the supported middle portion 9004 of the module 1190 rests on and conforms to the curvature of the arcuate support surfaces 5232a, 5242a and hence the supported middle portion 9004 of the module 1190 conforms to the upward arcuate shape of the first and second curved planar bodies 5230, 5240 of the upper support structure 5220. The upward arcuate shape of the supported middle portion 9004 of each module of the plurality of modules 1190 advantageously mitigate the extent of the downward deflection of unsupported extensions 9002a, 9002b of the module 1190. This upward bowing of the supported middle portion 9004 of each module 1190 tends to cancel out at least a portion of the downward deflection of the unsupported extensions 9002a, 9002b of each module 1190. Accordingly and advantageously, the net effect is that the downward deflections that opposite ends 9003a, 9003b of the unsupported extensions 9002a, 9002b of each module 1190 is less than otherwise would be experienced absent the upward bowing of the supported middle portion 9004 of the modules 1190 resulting from the pair of upwardly curved, planar support surfaces 5232a, 5242a of the upper support structure 5220 of the mounting bracket 5210. In one exemplary embodiment, the bowing or curvature of the arcuate support surfaces 5232a, 5242a provides a vertical offset along the length of the mounting bracket 5210 such that a vertical position or height of the support surfaces 5232a, 5242a adjacent the first and second ends 5212, 5214 is vertically above a vertical position or height of the support surfaces 5232a, 5242a at a center of the support surfaces 5232a, 5242a through with the transverse axis TA passes is approximately in a range of 0.250-0.750 inch.

Fourth Exemplary Embodiment of Mounting Bracket Assembly 6200

Figure 25:
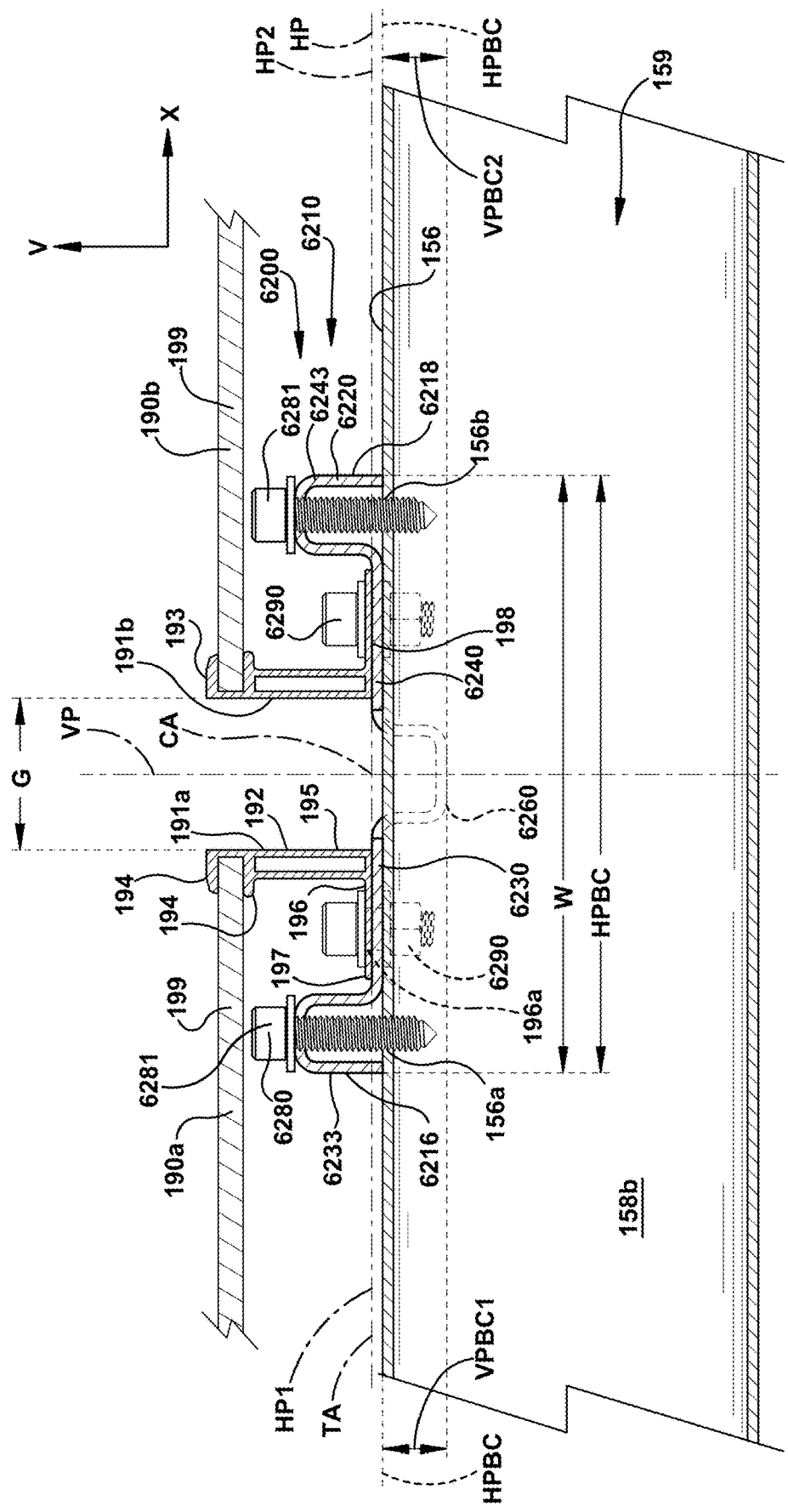
FIG. 25 is a schematic section view showing the mounting bracket assembly of FIG. 24, a portion of a pair of photovoltaic modules having E-shaped frame members affixed to a the mounting bracket assembly and a portion of the torque tube beam.
Figure 26:
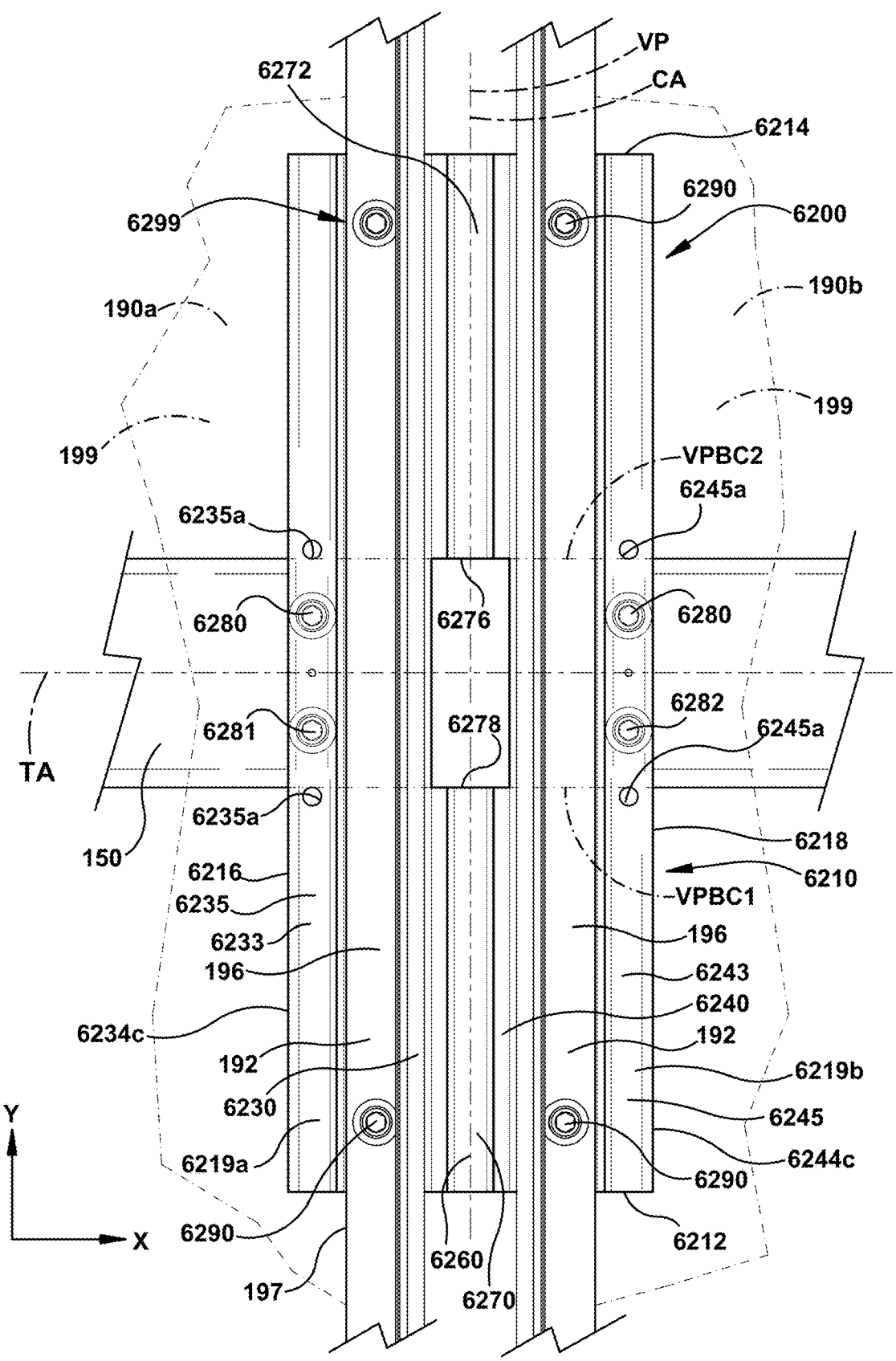
FIG. 26 is a schematic top plan view showing the mounting bracket assembly of FIG. 24, a portion of the pair of photovoltaic modules affixed to the mounting bracket assembly and a portion of the torque tube beam.

A fourth exemplary embodiment of a mounting bracket of the present disclosure is seen generally at 6200 in FIGS. 24-31. The mounting bracket assembly 6200 includes a mounting bracket 6210 and a fastener assembly or fastener set 6299 for attaching the mounting bracket 6210 to a torque tube 150, similar in structure and function to the torque tube 1150 of the solar tracker system 1100 of the first exemplary embodiment. The mounting bracket assembly 6200 is suited to be used for supporting a plurality of photovoltaic modules 190 wherein facing edges portions 191a, 191b of adjacent photovoltaic modules 190a, 190b include generally E-shaped frame members 192, as shown schematically, in, for example, FIG. 25. In FIG. 25, for example, modules 190a, 190b, of the plurality of photovoltaic modules 190, include generally E-shaped frame members 192 along the facing edge portions 191a, 191b that function to: a) secure the solar panels 199; and b) provide a rigid structure to allow the modules 190a, 190b to be secured to the mounting bracket 210. Specifically, in one exemplary embodiment, each of the E-shaped frame members 192 includes an upper portion 193 and a lower portion 195. The upper portion 193 of the E-shaped frame member 192 includes a pair of horizontally extending arms 194 that capture and hold the solar panel 199. The lower portion 195 of the E-shaped frame member 192 includes a horizontally extending flange 196. The flange 196 includes a plurality of apertures 196a sized to receive a respective fastener of a second plurality of fasteners 6290 of the fastener set 6299 for securing the modules 190a, 190b to the mounting bracket 210. The fastener set 6299, in addition to the second plurality of fasteners 6290, also includes a first plurality of fasteners 6280 which secure the mounting bracket 6210 to the torque tube beam 150.

In one exemplary embodiment of the mounting bracket assembly 6200, the mounting bracket 6210 is generally rectangular when viewed in plan view and extends along a central vertical plane VP that bisects the mounting bracket 6210, the central vertical plane VP extending along a longer extent, that is, a length L, of the mounting bracket 6210. The mounting bracket 6210 is symmetric about the central vertical plane VP, that is, the central vertical plane VP divides the mounting bracket 6210 into a first section 6219a and a second section 6219b wherein the first and second sections of the mounting bracket 6210 are mirror images of each other. The mounting bracket 6210 includes an upper attachment structure 6220, which is substantially planar and defines a horizontal plane HP, and a generally U-shaped lower projection structure 6260, which interrupts the upper attachment structure 6220, and extends in the vertical direction V downwardly in a central region 6222 of the upper attachment structure 6220. Stated another way, curved upper transition or end portions 6262, 6264 of the U-shaped lower projection structure 2260 are horizontally spaced apart by the central region 6222 of the upper attachment structure 6220. The mounting bracket 6210 defines a central axis CA, which is coincident with the central vertical plane VP of the mounting bracket 6210 and is also coincident with a horizontal plane HP of the upper attachment structure 6220. The horizontal plane HP of the upper attachment structure 6220 is defined by first and second upper planar surfaces 6231, 6241 of first and second planar bodies 6230, 6240 of the upper attachment structure 6220. Thus, the central axis CA of the mounting bracket 6210 passes through the intersection of the central vertical plane VP of the mounting bracket 6210 and the horizontal plane HP of the upper attachment structure 6220 of the mounting bracket 6210. The mounting bracket 6210 also defines a transverse axis TA that is coincident with the horizontal plane HP of the upper attachment structure 6220 and intersects and is orthogonal to the central axis CA mounting bracket 6210. The transverse axis TA of the mounting bracket 6210 is equidistant between first and second ends 6212, 6214 of the mounting bracket 6210 and passes through the first and second upper planar surfaces 6231, 6241 of the first and second planar bodies 6230, 6240 of the upper attachment structure 6220.

The mounting bracket 6210 is mounted by the first plurality of fasteners 6280 to the torque tube beam 150 such that the central axis CA of the mounting bracket 6210 is substantially orthogonal to and vertically above a longitudinal axis LA of the torque tube beam 150. That is, the mounting bracket 6210 is typically oriented in an east-west orientation and extends along the central axis CA in an east-west horizontal direction Y that is substantially orthogonal to an axis of rotation R and the longitudinal axis LA of the torque tube beam 150. The transverse axis TA, when viewed in plan view, bisects a shorter extent, that is, the width W, of the upper attachment structure 6220 of the mounting bracket 6210 and is substantially parallel to and vertically above the longitudinal axis LA of the torque tube beam 150.

Figure 29:
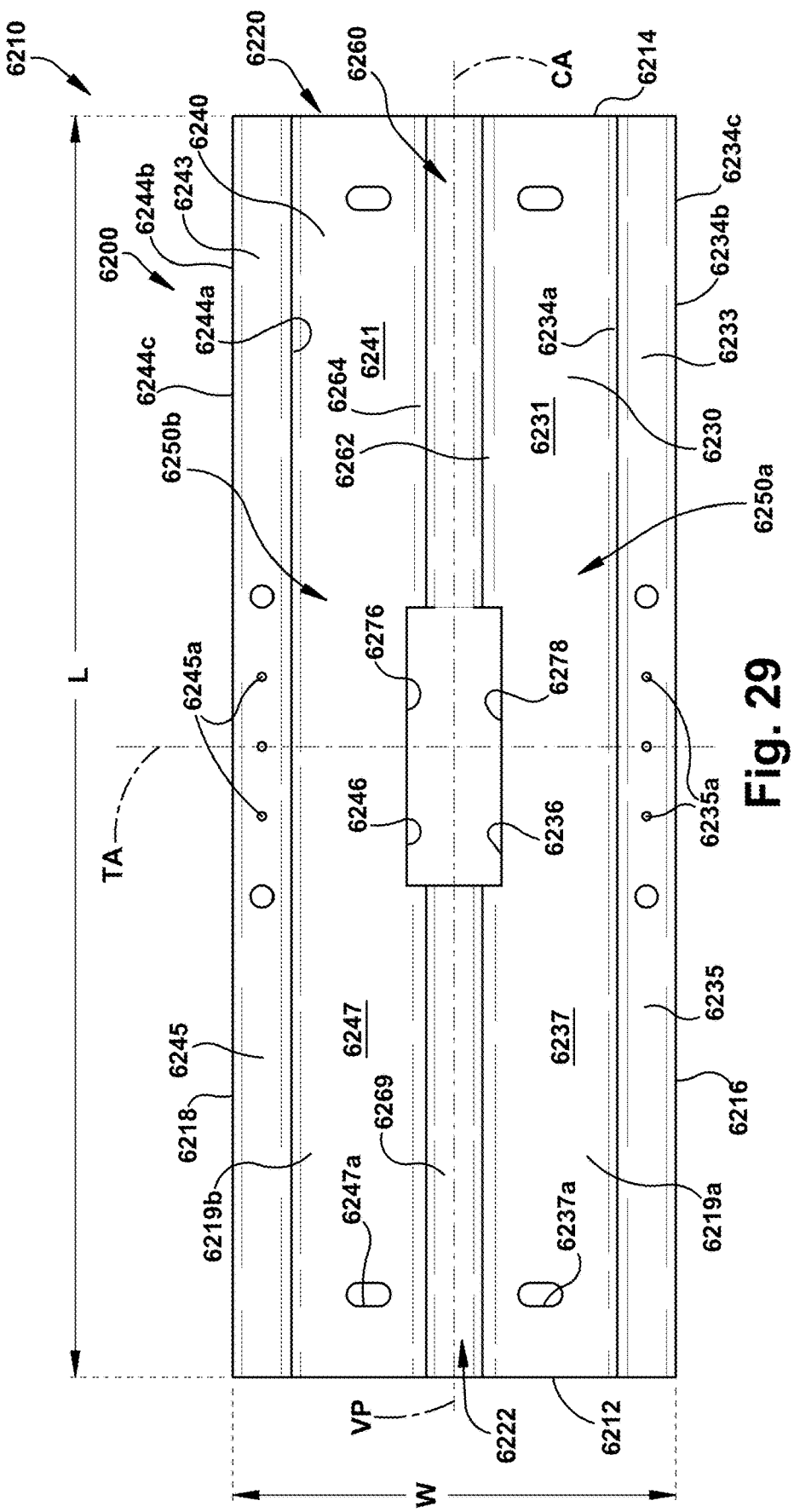
FIG. 29 is a schematic top plan view of the mounting bracket of FIG. 27.
Figure 32:
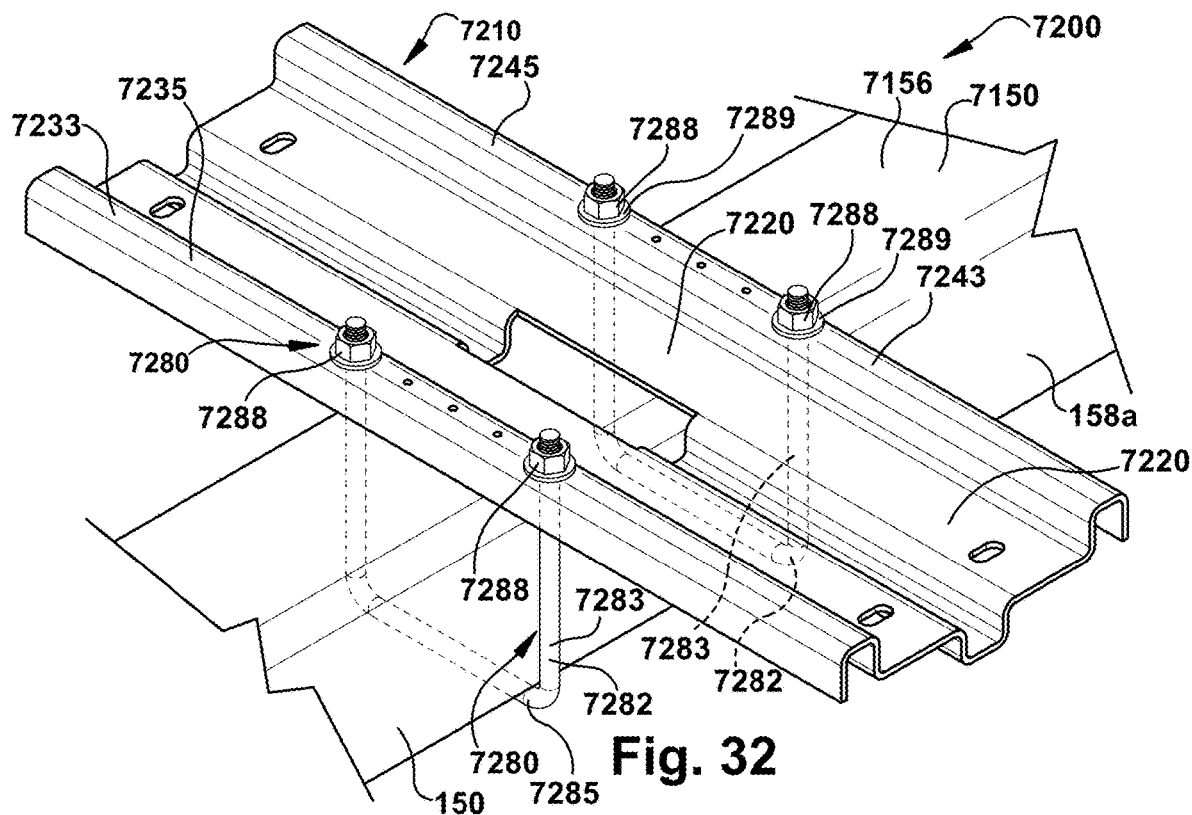
FIG. 32 is a schematic perspective view of a fifth exemplary embodiment of a mounting bracket assembly of the present disclosure mounted to a portion of a torque tube beam suitable for use with the solar tracker assembly of the present disclosure.
Figure 33:
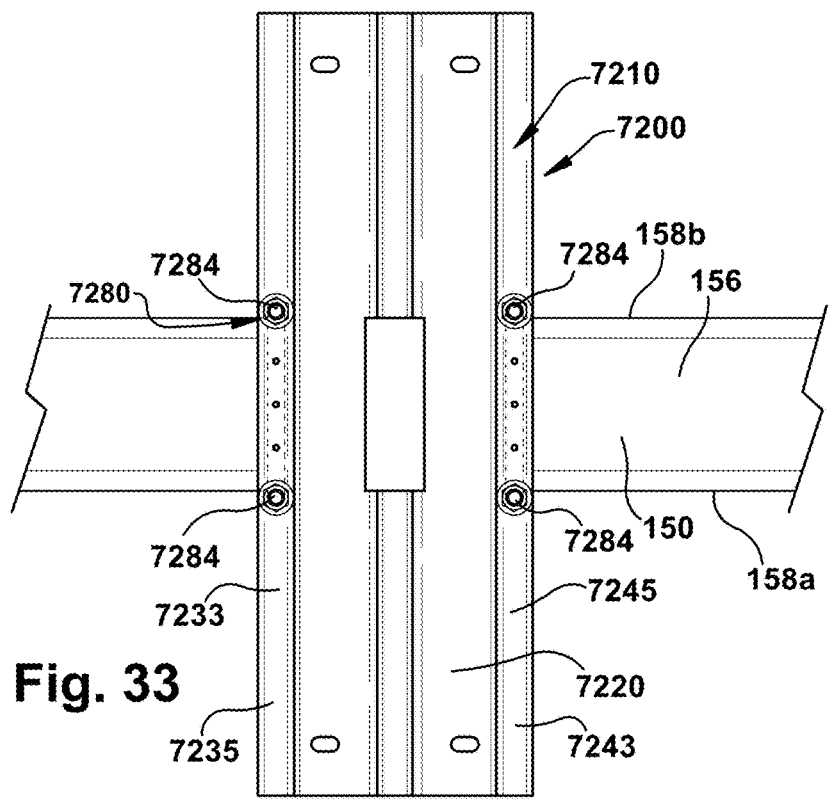
FIG. 33 is a schematic top plan view of the mounting bracket assembly of FIG. 32, as mounted to a portion of the torque tube beam.
Figure 34:
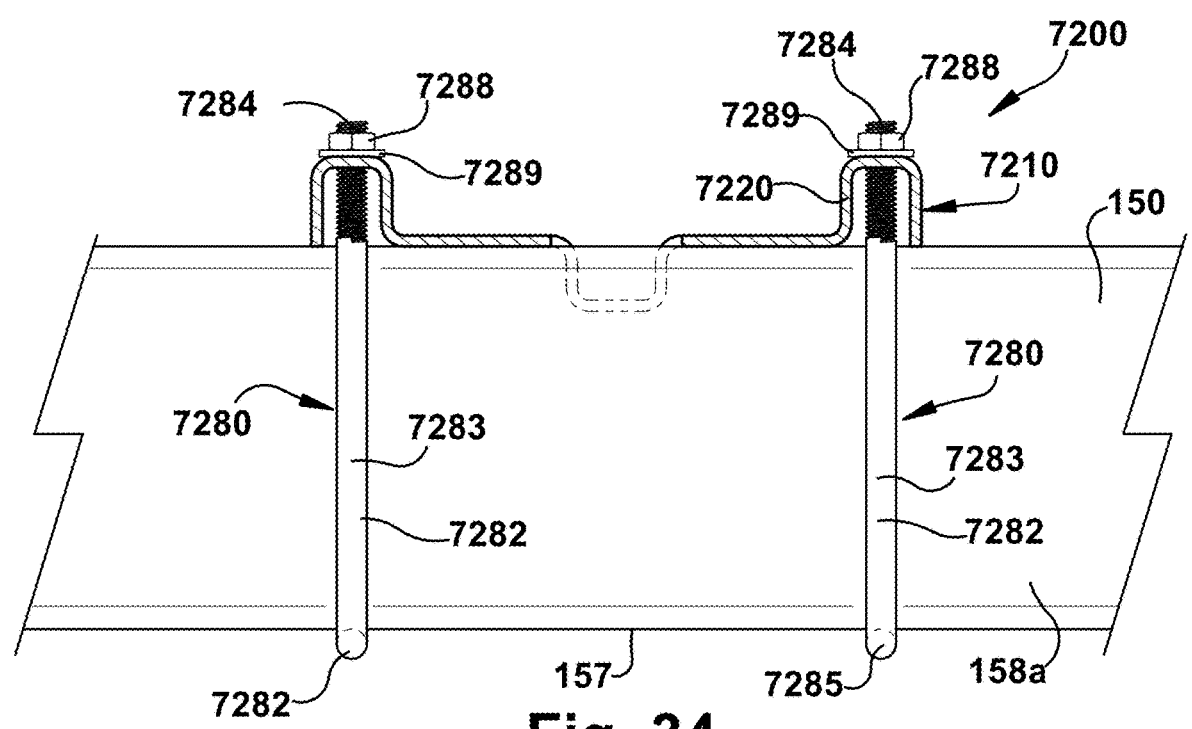
FIG. 34 is a schematic front elevation view of the mounting bracket assembly of FIG. 32, as mounted to a portion of the torque tube beam.
Figure 35:
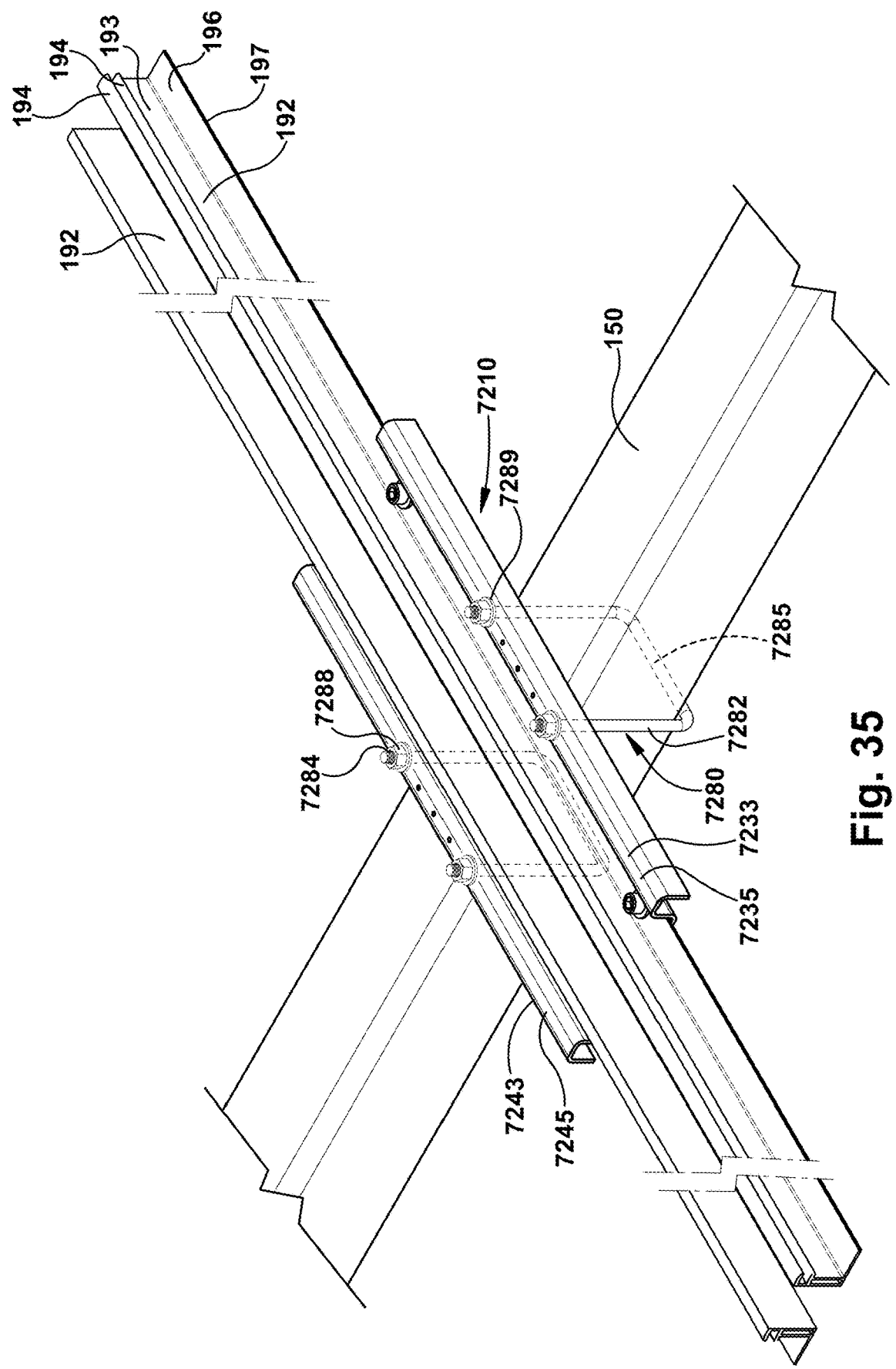
FIG. 35 is a schematic top perspective view of the mounting bracket assembly of FIG. 32, as mounted to a portion of the torque tube beam and further including E-shaped frame members of a pair of photovoltaic modules affixed to the mounting bracket.

As noted above, the mounting bracket 6210 is generally rectangular when viewed in plan view and includes first and second ends 6212, 6214, which are spaced apart and substantially parallel and first and second sides 6216, 6218, which are also spaced apart and substantially parallel. The first and second sides 6216, 6218 are parallel to the central axis CA of the mounting bracket 6210 and are substantially orthogonal to the first and second ends 6212, 6214. As can be seen in FIG. 29, when viewed in plan view, the central axis CA bisects an orthogonal distance or width W between the first and second sides 6216, 6218 of the mounting bracket 6210, while the transverse axis TA bisects an orthogonal distance or length L of the mounting bracket 6210 between the first and second ends 6212, 6214. The central vertical plane VP of the mounting bracket 6210 intersects and is substantially orthogonal to the transverse axis TA and extends along and is coincident with the central axis CA and intersects and is substantially orthogonal to the horizontal plane HP. As noted above, the mounting bracket 6210 is symmetric about the central vertical plane VP, that is, the vertical plane VP can be considered as dividing the mounting bracket into first (left hand) and second (right hand) sections 6219a, 6219b of the mounting bracket 6210. The first and second sections 6219a, 6219b, as divided by the central vertical plane VP, are substantially mirror images of each other.

The central region 6222 of the upper attachment structure 6220 extends along the central axis CA of the mounting bracket 6210 and is bounded by upper end portions 6262, 6264 of the lower projection structure 6260 that define first and second curved transition regions. That is, the central region 6222 of the upper attachment structure 6220 is occupied by the lower projection structure 6260. On one side of the central region 6222 of the upper attachment structure 6220, that is, adjacent the upper end portion 6262a of the lower projection structure 6260, is the first planar body 6230. That is, the first planar body 6230 extends from the upper cured transition or end portion 6262 defined by an upper portion of a first vertical wall 6266 of the lower projection structure 6260. The first planar body 6230 extends between an inverted, generally U-shaped upwardly extending first rib 6233, the first curved transition or end portion 6262 of the lower projection structure 6260 and the first and second ends 6212, 6214 of the mounting bracket 6210. A boundary between the first planar body 6230 and the first rib 6233 is defined by an interior vertical wall 6234a of the first rib 6233.

On the other side of the central region 6222 of the upper attachment structure 6220, that is, adjacent the upper end portion 6264a of the lower projection structure 6260, is the second planar body 6240. That is, the second planar body 6240 extends from the curved upper transition or end portion 6264 of the lower projection structure 6260 which defined by an upper portion of a second vertical wall 6268 of the lower projection structure 6260. The second planar body 6240 extends between an inverted, generally U-shaped upwardly extending second rib 6243, the curved upper end portion 6264 of the lower projection structure 6260 and the first and second ends 6212, 6214 of the mounting bracket 6210. A boundary between the second planar body 6240 and the second rib 6243 is defined by an interior vertical wall 6244a of the second rib 6243.

The upper surface 6231 of the first planar body 6230 defines a first horizontal plane HP1 and the upper surface 6241 of the second planar body 6240 defines a second horizontal plane HP2. As can be seen in FIG. 25, the first and second horizontal planes HP1, HP2 are aligned. If extended beyond the extent of the first and second planar bodies 6230, 6240, the first and second horizontal planes HP1, HP2 would be coincident with each other and would be substantially parallel to and coincident with the central axis CA of the mounting bracket 6210. Taken together, the first and second planar bodies 6230, 6240 define the combined horizontal plane HP that intersects and encompasses the central axis CA of the mounting bracket 6210. Essentially, central region 6222 of the upper attachment structure 6200 is defined by the lower projection structure 6260 and the central region 6222 separates the first and second planar bodies 6230, 6240 or, stated in another way, the lower projection structure 6260 interrupts the continuity of the horizontal planes HP1, HP2 and interrupts the continuity of the combined horizontal plane HP of the upper attachment structure 6220 in the central region 6222 of the upper attachment structure 6200.

Turning to the lower projection structure 6260, when viewed in plan view, the central region 6222 of the upper attachment structure 6220 overlies the lower projection structure 6260. That is, the lower projection structure 6260 interrupts and spaces apart the first and second planar bodies 6230, 6240 of the upper attachment structure 6220. The lower projection structure 6260 extends parallel to the central axis CA and includes the first and second curved transition regions 6262, 6264, a spaced pair of vertically extending, generally planar first and second side walls 6266, 6268 which are connected by a horizontally extending end wall 6269 at respective lower portions 6266a, 6268a of the first and second side walls 6266, 6268. The first and second curved transition or upper end portions 6262, 6264 of the lower projection structure 6260 define the upper bounds of the lower projection structure 6260. The horizontal end wall 6269 defines a lower end portion 6269a of the generally U-shaped lower projection structure 6260 and like the first and second side walls 6266, 6268 extend substantially parallel to the central axis CA of the mounting bracket 6210. The first and second side walls 6266, 6268 are parallel to the central vertical plane VP of the mounting bracket 6210. The central vertical plane VP is coincident with the central axis CA of the mounting bracket 6210 and orthogonal to the horizontal planes HP1, HP2, HP of the upper attachment structure 6220 of the mounting bracket 6210.

The lower projection structure 6260, viewed along the central axis CA of the mounting bracket 6210 includes a first portion 6270 adjacent the first end 6212 of the mounting bracket 6210 and a second portion 6272 adjacent the second end 6214 of the mounting bracket 6210. The first and second portions 6270, 6272 of the lower projection structure 6260 are separated and spaced apart by a third open or cut out portion 6276. The cut out portion 6276 defines a transversely extending, pass through slot or through slot 6278 that receives the torque tube beam 150. The through slot 6278 is defined by facing peripheral edges 6270a, 6272a of the first and second portions 6270, 6272 of the lower projection structure 6260 and the facing interior vertical edges 6236, 6246 of the first and second planar bodies 6230, 6240 of the upper attachment structure 6220 in the region of the cut out portion 6276 of the lower projection structure 6260. The facing first and second side walls 6266, 6268 of the lower projection structure 6260 are substantially parallel to the central axis CA and, if extended, represent the interior boundaries of the first and second planar bodies 6230, 6240, respectively, with respect to the central region 6222 of the upper attachment structure 6220. The through slot 6278 extends substantially parallel to the transverse axis TA of the mounting bracket 6310 and allows the torque tube beam 150 to pass through the lower projection structure 6260 of the mounting bracket 6210.

The upper surface 6231 of the first planar body 6230 extends generally horizontally along the first horizontal plane HP1. The first planar body 6230 includes the upper surface 6231 and a lower surface 6232. The upper surface 6241 of the second planar body 6240 extends generally horizontally along the second horizontal plane HP2. The second planar body 6240 includes the upper surface 6242 and a lower surface 6244. The first planar body 6230 terminates at a first interior vertical side wall 6234a of the inverted, generally U-shaped upwardly extending first rib 6233. The first rib 6233 is generally parallel to the central axis CA of the bracket member 6210 and includes the inner side wall 6234a and an outer side wall 6234b. The inner side wall 6234a and the outer side wall 6234b are substantially parallel and are spaced apart by a first horizontal end wall 6235 bridging upper end portions of the inner and outer side walls 6234a, 6234b. An outer surface 6234c of the outer side wall 6234b defines the first side 6216 of the mounting bracket 6210 and the outer side wall 6234b terminates in a distal end 6234d of the outer side wall 6234b. The upper surface 6231 of the first planar body 6230 defines a horizontally extending first central support 6237. The first central support 6237 extends between the first rib 6233 and the central region 6222 of the upper attachment structure 6220 and the first and second ends 212, 214 of the bracket member 210.

Similarly, the second planar body 240 terminates at a first interior vertical side wall 6244a of the inverted, generally U-shaped upwardly extending second rib 6243. The second rib 6243 is generally parallel to the central axis CA of the bracket member 610 and includes the inner side wall 6244a and an outer side wall 6244b. The inner side wall 6244a and the outer side wall 6244b are substantially parallel and are spaced apart by a second horizontal end wall 6245 bridging upper portions of the inner and outer side walls 6244a, 6244b. An outer surface 6244c of the outer side wall 6244b defines the second side 6218 of the mounting bracket 6210 and the outer side wall 6244b terminates in a distal end 6244d of the outer side wall 6244b. The upper surface 6241 of the second planar body 6240 defines a horizontally extending second central support 6247. The second central support 6247 extends between the second rib 6243 and the central region 6222 of the upper attachment structure 6220 and the first and second ends 6212, 6214 of the bracket member 6210.

Figure 27:
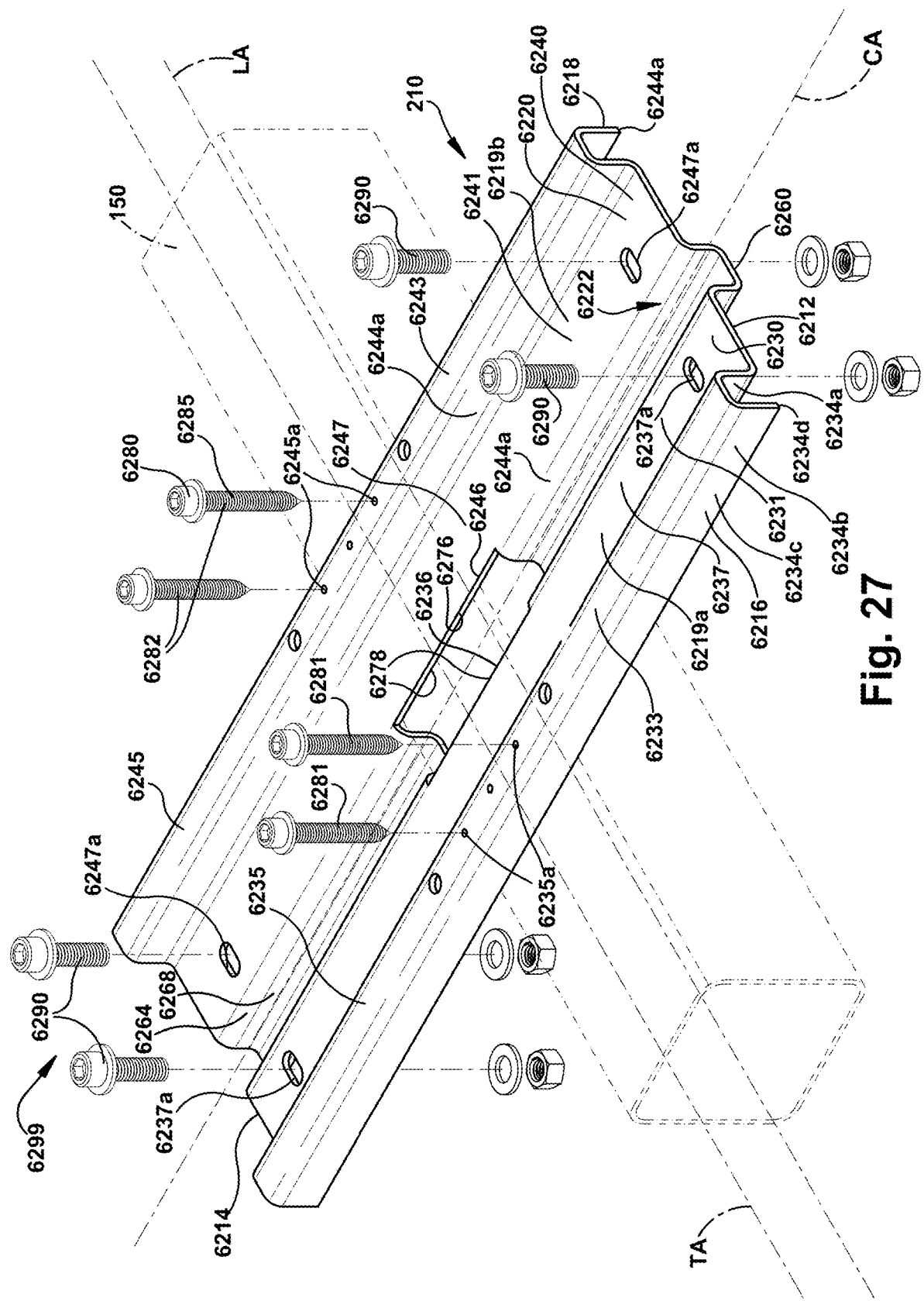
FIG. 27 is a schematic exploded, top perspective view of the mounting bracket assembly of FIG. 24 including a mounting bracket and a fastener set including a first plurality of fasteners and a second plurality of fasteners, the fastener set for mounting the mounting bracket to the torque tube beam and securing the pair of photovoltaic modules to the mounting bracket.
Figure 28:
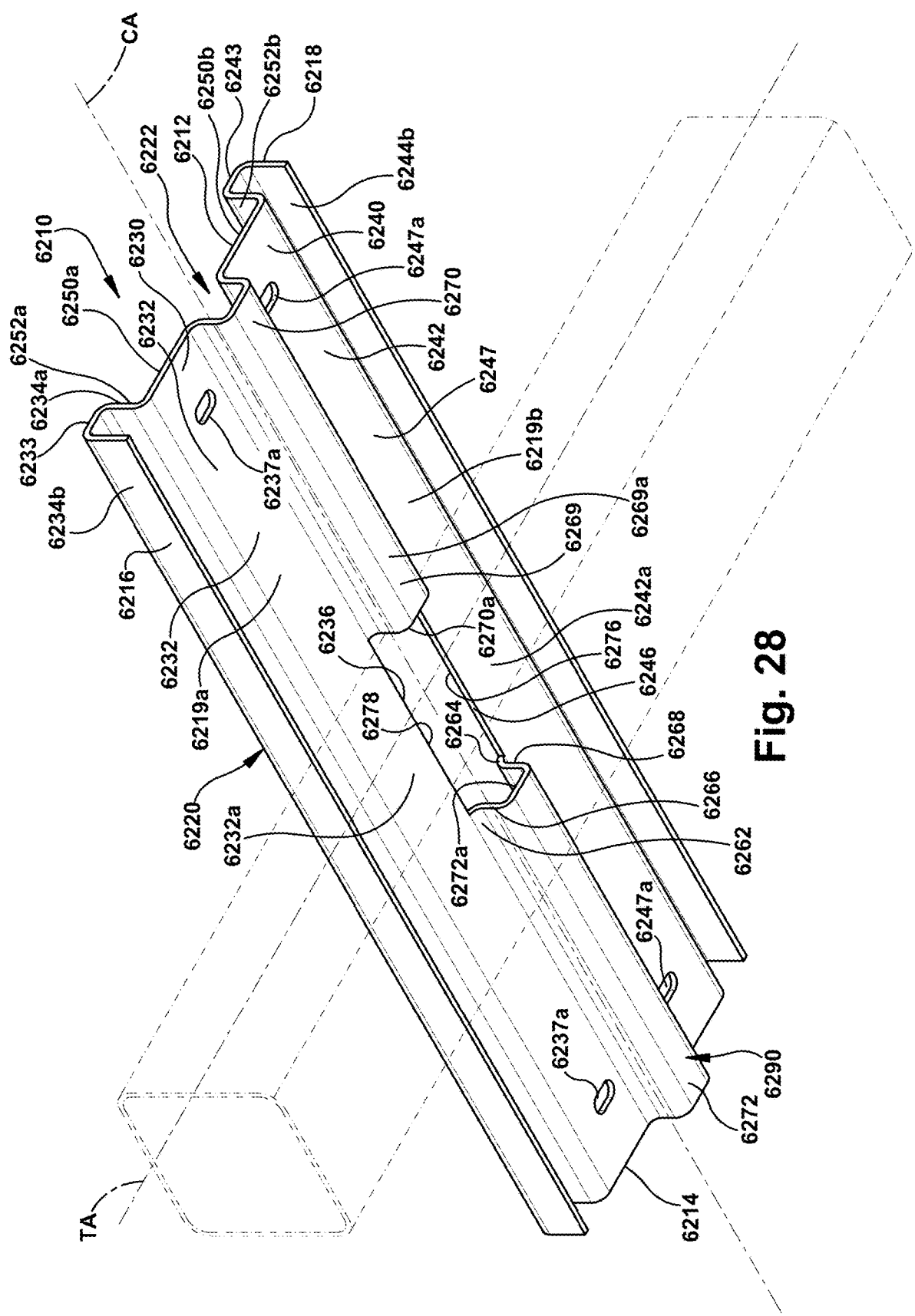
FIG. 28 is a schematic bottom perspective view showing the mounting bracket of FIG. 27 without the fastener set, the mounting bracket being positioned on a portion of the torque tube beam.

For securing the mounting bracket 6210 to the torque tube beam 150, in one exemplary embodiment, the first horizontal end wall 6235 of the first rib 6233 of the upper attachment structure 6220 includes one or more apertures 6235a sized to receive one or more corresponding first corresponding fasteners 6281 (two fasteners 6281 are shown in FIG. 27) of the first plurality of fasteners 6280 of the fastener set 6299. The first fastener 6281 of the plurality of fasteners 6280 extends through a first aligned aperture 156a in an upper wall 156 of the torque tube beam 150 to secure or mount the mounting bracket 6210 and, more particularly, to secure or mount the first section 6219a of the mounting bracket 6210 to the torque tube beam 150. Similarly, the second horizontal end wall 6245 of the second rib 6243 of the upper attachment structure 6220 includes one or more apertures 6245a sized to receive one or more corresponding second corresponding fasteners 6282 (two fasteners 6282 are shown in FIG. 27) of the first plurality of fasteners 6280. The second fastener 6282 extends through an aligned aperture 156b in the upper wall 156 of the torque tube beam 150 to secure or mount the mounting bracket 6210 and, more particularly, to secure or mount the second section 6219b of the mounting bracket 6210 to the torque tube beam 150. In one exemplary embodiment, the fasteners 6281, 6282 of the first plurality of fasteners 6280 are self-tapping screws 6285 that do not require a corresponding nut to hold the fasteners 6280 in place. That is, there is no need for a mating nut within the hollow interior region 151 of the torque tube beam 150. In one exemplary embodiment, four self-tapping screws 6285 extend through apertures 6235a, 6245a in the first and second ribs 6233, 6243 of the upper attachment structure 6220 and thread into threaded openings 156a, 156b in the upper wall 156 of the torque tube 150 to secure or mount the mounting bracket 6210 to the torque tube 150. It should be understood that depending on expected wind loads and other conditions, the first plurality of fasteners 6280 could include two screws, four screws or six screws to secure or mount the mounting bracket 6210 to the torque tube beam 150.

As mentioned previously, each module, for example modules 190a, 190b, of the plurality of photovoltaic modules 190 includes generally E-shaped frame members 192 along facing edge portions 191a, 191b that function to: a) secure the solar panels 199; and b) provide a rigid structure to allow the modules 190a, 190b to be secured to the mounting bracket 6210. Specifically, in one exemplary embodiment, each of the E-shaped frame members 192 includes the upper portion 193 and the lower portion 195. The upper portion 193 of the E-shaped frame member 192 includes the pair of horizontally extending arms 194 that capture and hold the solar panel 199. The lower portion 195 of the E-shaped frame member 192 includes the horizontally extending flange 196. The flange 196 includes a plurality of apertures 196*a* sized to receive a respective fastener from the second plurality of fasteners 6290 of the fastener set 6299 for securing the modules 190*a*, 190*b* to the mounting bracket 6210. The flange 196 of the frame member 192 of the module 190*a* is received on the first central support 6237 of the upper attachment structure 6220 of the mounting bracket 6210. The first rib 6233 constrains and helps align the flange 196 such that a distal end 197 of the flange 196 is in proximity to the first rib 6233 when the photovoltaic module 190*a* is properly positioned for installation on the mounting bracket 6210. When the photovoltaic module 190*a* is properly positioned on the mounting bracket 6210, a lower surface 198 of the flange 196 of the frame member 192 is seated on the first central support 6237 of the first planar body 6230 and the frame member 192 bears against the upper surface 6231 of the first planar body 6230 in the region of the first central support 6237. In one exemplary embodiment, the E-shaped frame members 192 extend around the entirety of the periphery of the solar panels 199.

Similarly, the flange 196 of the frame member 192 of the adjacent module 190*b* is received on the second support 6247 of the upper attachment structure 6220 of the mounting bracket 6210. The second rib 6243 constrains and helps align the flange 196 such that the distal end 197 of the flange 196 is in proximity to the second rib 6243 when the photovoltaic module 190*b* is properly positioned for installation on the mounting bracket 6210. When the photovoltaic module 190*b* is properly positioned on the mounting bracket 210, the lower surface 198 of the flange 196 of the frame member 192 is seated on the second central support 6247 of the second planar body 6240 and the frame member 192 bears against the upper surface 6241 of the second planar body 6240 in the region of the second central support 6247. Advantageously, the first and second ribs 6233, 6243 provide for both increased structural rigidity and stiffness of the mounting bracket 6210 and facilitate alignment of the photovoltaic modules 190*a*, 190*b* to the mounting bracket 6210 by providing positive alignment stops for the distal ends 197 of the flange 196 of the modules 190*a*, 190*b*. The first and second central supports 6237, 6247 of the first and second planar bodies 6230, 6240 include a plurality of apertures 6237*a*, 6247*a* that are aligned with a plurality of apertures 196*a* in the flanges 196 of the modules 190*a*, 190*b*. The second plurality of fasteners 6290 extend through the aligned apertures 6237*a*, 6247*a*, 196*a* to secure the frame members 192 and thereby the modules 190*a*, 190*b* to the mounting bracket 6210 and to thereby secure or couple the modules 190*a*, 190*b* to the torque tube beam 150. In one exemplary embodiment, as best seen in FIG. 27, the fasteners of the second plurality of fasteners 290 include combinations of threaded bolts and matching threaded nuts and interposed washers, for securing the plurality of modules 190 to the mounting bracket 6210.

As can be seen in FIG. 29, the first central support 6237 of the first body 6230 of the upper attachment structure 6220 and the first rib 6233 of the upper attachment structure 6220 define a first mounting pedestal 6250*a* for the mounting bracket 6210. The mounting pedestal 6250*a* advantageously facilitates alignment of the flange 196 of the frame member 192 in both horizontal and vertical directions for the photovoltaic module 190*a* as the photovoltaic module 190*a* is positioned for attachment to the first central support 6237 by the second plurality of fasteners 6290. Specifically, the first rib 6233 of the first mounting pedestal 6250*a* provides a first vertical wall 6252*a* for guiding and aligning the flange 196 into proper position, that is, the first vertical wall 6252*a* of the first mounting pedestal 6250*a* provides a positive horizontal stop for the distal end 197 of the flange 196 as the frame member 192 is moved downwardly in the vertical direction V such that the lower surface 198 of the flange 196 of the photovoltaic module 190*a* is properly positioned and seated on the first central support 6237. The first central support 6237 of the first mounting pedestal 6250*a* provides a first horizontal wall 6254*a*. The first horizontal wall 6254*a* of the first mounting pedestal 250*a* provides a planar support surface for receiving and seating the planar lower surface 198 of the flange 196 of the flame 192 of the photovoltaic module 190*a*.

Similarly, the second central support 6247 of the second body 6240 of the upper attachment structure 6220 and the second rib 6243 of the upper attachment structure 6220 define a second mounting pedestal 6250*b* for the mounting bracket 6210. The second mounting pedestal 6250*b* advantageously facilitates alignment of the flange 196 of the frame member 192 in both horizontal and vertical directions for the photovoltaic module 190*b* as the photovoltaic module 190*b* is positioned for attachment to the second central support 6247 by the second plurality of fasteners 6290. Specifically, the second rib 6243 of the second mounting pedestal 6250*b* provides a second vertical wall 6252*b* for guiding and aligning the flange 196 into proper position, that is, the second vertical wall 6252*b* of the second mounting pedestal 6250*b* provides a positive horizontal stop for the distal end 197 of the flange 196 as the frame member 192 is moved downwardly in the vertical direction V such that the lower surface 198 of the flange 196 of the photovoltaic module 190*b* is properly positioned and seated on the second central support 6245. The second central support 6247 of the second mounting pedestal 6250*b* provides a second horizontal wall 6254*b*. The second horizontal wall 6254*b* of the second mounting pedestal 6250*b* provides a planar support surface for receiving and seating the planar lower surface 198 of the flange 196 of the flame 192 of the photovoltaic module 190*b*.

The through slot 6278 of the cut out 6276 of the lower projection structure 6260 of the mounting bracket 6210 advantageously allows the mounting bracket 6210 to be mounted orthogonally across the torque tube beam 150 such that the facing peripheral edges 6270*a*, 6272*a* of the first and second portions 6270, 6272 of the lower projection structure 6260 contact and bear against respective side walls 158*a*, 158*b* of the torque tube beam 150 and the lower planar surface 6232 of the first planar body 6230 and the lower planar surface 6242 of the second planar body 6240 contact and bear against the upper wall 156 of the torque tube beam 150. Essentially, the through slot 6278 of the lower projection structure 6260 allows the mounting bracket 6210 to be mounted like a saddle across the torque tube beam 150 wherein the central axis CA of the mounting bracket 6210 is substantially orthogonal to the longitudinal axis LA of the torque tube beam 150. This saddle-type overlying of the mounting bracket 6210 on the upper and side walls 156, 158*a*, 158*b* of the torque tube beam 150 provides for a stable and secure mounting for the mounting bracket 6210 on the torque tube beam 150. That is, the facing peripheral edges 6270*a*, 6272*a* of the first and second portions 6270, 6272 of the lower projection structure 6260 advantageously bear against a significant vertical extent of the side walls 158*a*, 158*b* of the torque tube beam 150. This bearing contact of the peripheral edges 6270*a*, 6272*a* against the side walls 158*a*, 158*b*, together with the first plurality of fasteners 6280 extending though the apertures 6235*a*, 6245*a* of the aend walls 6235, 6245 of the first and second ribs 6233, 6243 of the upper attachment structure 6220 and through aligned apertures 156*a*, 156*b* of the upper wall 156 of the torque tube beam 150, mitigate the tendency for the mounting bracket 6210 to "rock" or pivot as mounted on the torque tube beam 150 about the transverse axis TA of the mounting bracket 6150 under high wind conditions. Moreover, central portions 6232*a*, 6242*a* of the lower surfaces 6232, 6242 of the first and second planar bodies 6230, 6240 of the upper attachment structure 6220 overlie and engage the upper wall 156 of the torque tube beam 150. Additionally, the distal end 6234*d* of the outer side wall 6234*b* of the first rib 6233 and the distal end 6244*d* of the outer side wall 6244*b* of the second rib 6243 also overlie and engage the upper wall 156 of the torque tube beam 150. Advantageously, the combination of: a) the bearing contact between the central portions 6232*a*, 6242*a* of the lower surfaces 6232, 6242 of the first and second planar bodies 6230, 6240 of the upper attachment structure 6220 and the upper wall 156 of the torque tube beam 150; b) the bearing contact between the horizontally extending distal end 6234*d* of the outer side wall 6234*b* of the first rib 6233 and the upper wall 156 of the torque tube beam 150; and c) the bearing contact between the horizontally extending distal end 6244*d* of the outer side wall 6244*b* of the second rib 6243 and the upper wall 156 of the torque tube beam 150, along with the first plurality of fasteners 6280 extending though the apertures 6235*a*, 6245*a* of the first and second ribs 6233, 6243 of the upper attachment structure 6220 and through aligned apertures 156*a*, 156*b* of the upper wall 156 of the torque tube beam 150, mitigate the tendency for the mounting bracket 6210 to "rock" or pivot as mounted on the torque tube beam 150 about the central axis CA of the mounting bracket 6210 under high wind conditions. Stated another way, the upper attachment structure 6220 provides a horizontal plane of bearing contact HPBC with respect to the upper wall 156 of the torque tube beam 150. The bearing contact horizontal plane HPBC is defined by and includes the central portions 6232*a*, 6242*a* of the lower surfaces 6232, 6242 for the first and second planar bodies 6230, 6240 of the upper attachment structure 6220 and the horizontally extending distal ends 6234*d*, 6244*d* of the outer side walls 6234*b*, 6244*b* of the first and second ribs 6233, 6243. The lower projection structure 6260 provides two vertical planes of bearing contact VPBC1, VPBC2. The first vertical plane of bearing contact VPBC1 is defined by and includes the peripheral edge 6270*a* of the first portion 6270 of the lower projection structure 6260. The second vertical plane of bearing contact VPBC2 is defined by and includes the peripheral edge 6272*a* of the second portion 6272 of the lower projection structure 6260. The vertical and horizontal bearing contact planes VPBC1, VPBC2, HPBC advantageously bear against a significant extent of the upper wall 156 and side walls 158*a*, 158*b* of the torque tube beam 150 to mitigate the tendency for the mounting bracket 6210 to "rock" or pivot with respect to the torque tube beam 150 about either the central axis CA or the transverse axis TA of the mounting bracket 150.

Additionally and advantageously, since central portions 6232*a*, 6242*a* of the respective lower surfaces 6232, 6242 of the first and second planar bodies 6230, 6240 contact and rest on the upper wall 156 of the torque tube beam 150 and since the width of the mounting bracket 6210 is relatively thin, a vertical distance or offset between the lower surface 198 of the frame member 192 of the modules 190*a*, 190*b* and the upper wall 156 of the torque tube beam 150 is minimized. This proximity between the frame member 192 of the modules 190*a*, 190*b* and the torque tube 150 advantageously reduces the torque load applied to the torque tube beam 150 by the plurality of photovoltaic modules 190 under high wind conditions. Moreover, the downwardly extending lower projection structure 6260 is a U-shaped structure disposed between the first and second planar bodies 6230, 6240 of the upper attachment structure 6220. Like the inverted U-shaped ribs 6233, 6243, the lower projection structure 6260, because it protrudes vertically from the generally planar upper attachment structure 6220 advantageously functions to increase the structural rigidity and stiffness of the mounting bracket 6210. This increased rigidity and stiffness of the mounting bracket 6210 provides for a more stable and secure mounting pedestals 6250*a*, 6250*b* for mounting the plurality of photovoltaic modules 190 to the mounting bracket 6210 and provides for a more stable and secure mounting of the mounting bracket 6210 to the torque tube beam 150. The stable and secure mounting pedestals 6250*a*, 6250*b* for the plurality of photovoltaic modules 190 afforded by the mounting bracket 6210 and the inherent strength and stiffness of the mounting bracket 6210 resulting from its structure including the inverted U-shaped first and second ribs 6233, 6243 and the U-shaped lower projection structure 6260 is especially advantageous given the wind loads applied to the plurality of photovoltaic modules 190 due to their large surface areas especially when positioned at a maximum angle of inclination of the modules 190 in windy conditions where the modules are more exposed to horizontal wind forces due to the maximum angle of inclination.

Fifth Exemplary Embodiment of Mounting Bracket Assembly 7200

A fifth exemplary embodiment of a mounting bracket assembly of the present disclosure is shown generally at 7200 in FIGS. 32-36. The mounting assembly 7200 includes a mounting bracket 7210. The mounting bracket 7210 is generally similar in configuration and structure to the configuration and structure of the mounting bracket 6210 of the mounting bracket assembly 6200 of the fourth exemplary embodiment. For brevity, the mounting bracket 7210 will not be described in detail, instead, reference is made to the description of the mounting bracket 6210 of the fourth exemplary embodiment.

Figure 36:
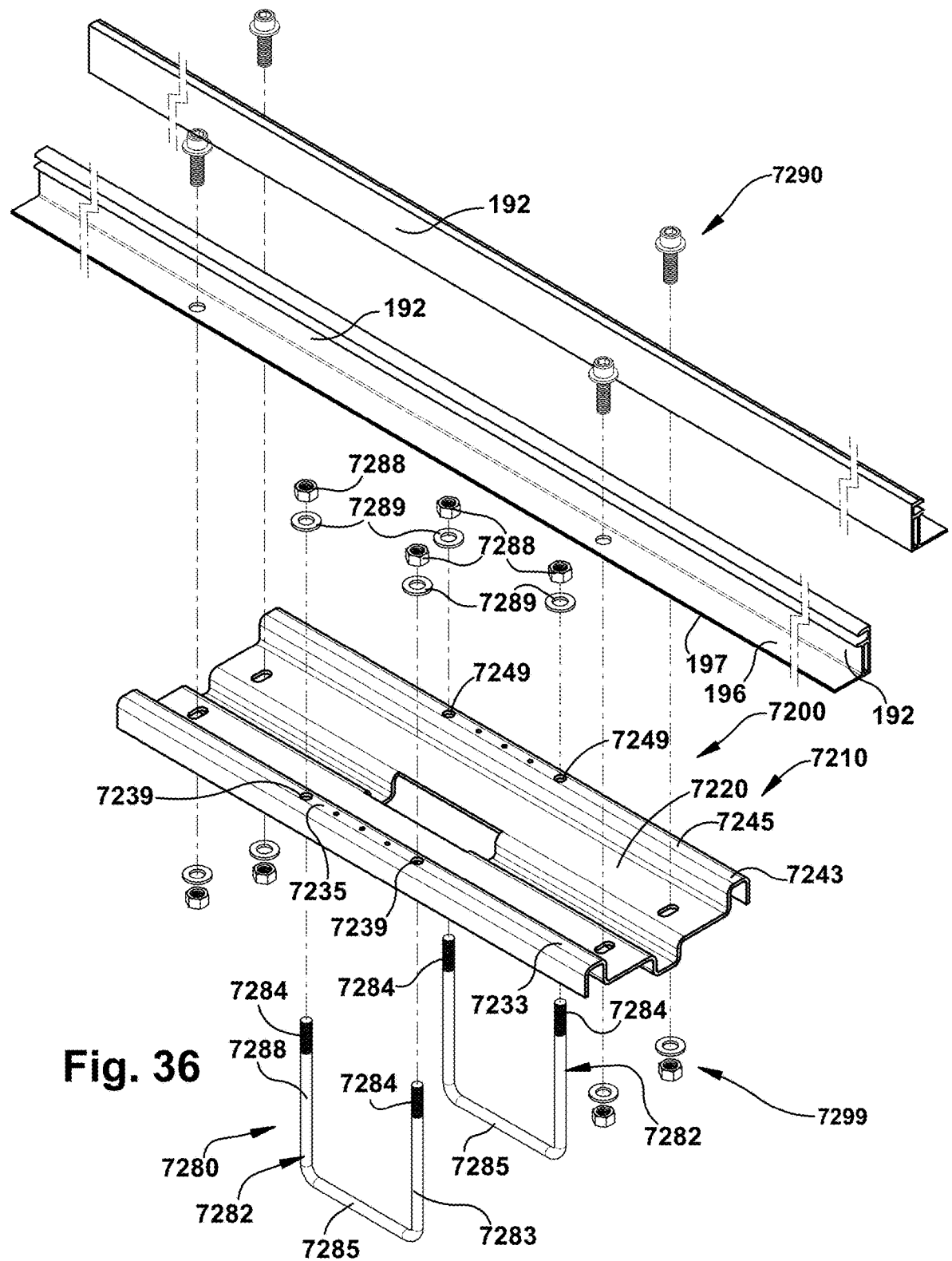
FIG. 36 is a schematic exploded, top perspective view of the mounting bracket assembly of FIG. 32, a portion of the torque tube beam and the E-shaped frame members of FIG. 35.

The primary difference between the mounting bracket assembly 7200 of the fifth exemplary embodiment and the mounting bracket assembly 6200 of the fourth exemplary embodiment is the fastener structure 7299 (FIG. 36). The fastener structure 7299 includes a first fastener assembly 7280, in place of the first plurality of fasteners 6280 of the fourth exemplary embodiment, employed for mounting the mounting bracket 7210 to the torque tube beam 150. The fastener structure 7299 further includes a second plurality of fasteners 7290, substantially identical in structure and function to the second plurality of fasteners 6290 of the fastener set 6299 of the fourth exemplary embodiment of the mounting bracket assembly 6200, for mounting the frame members 192 to the mounting bracket 7210, as described previously. The second plurality of fasteners 7290, being substantially identical in structure and function to the second plurality of fasteners 6290 of the fourth exemplary embodiment, are shown schematically in FIG. 36 and will not be discussed in detail with regard to the fifth exemplary embodiment.

In the mounting bracket assembly 6200, the plurality of fasteners 6280 for mounting the mounting bracket 6210 to the torque tube beam 150 comprised the plurality of self-tapping screws 6285 that extended through apertures 6235a, 6245a in the first and second ribs 6233, 6243 of the upper attachment structure 6220 and threaded into threaded openings 156a, 156b in the upper wall 156 of the torque tube 150 to secure or mount the mounting bracket 6210 to the torque tube beam 150. By comparison, in one exemplary embodiment, the fastener assembly 7280 comprises a pair of U-bolt fasteners 7282 having threaded distal ends and four matching nuts 7288 and four washers 7289 associated with respective ones of the nuts 7288. Each of the U-bolt fasteners 7282 include a pair of vertically upward extending legs 7283 and a horizontal cross member 7285 bridging the two legs 7283. Each of the legs 7283 include threaded end portions 7284. The threaded end portions 7284 of the legs 7283 extend through aligned apertures 7239, 7249 of first and second ribs 7233, 7234 of an upper attachment structure 7220 of the mounting bracket 7210. As the threaded nuts 7288 are threaded onto the threaded end portions 7284 of the U-bolt fasteners 7282, the cross member 7285 of each of the U-bolt fasteners 7282 is pulled upwardly and bears against a lower wall 157 of the torque tube beam 150. The washers 7289 are interposed between the respective nuts 7388 and the first and second horizontal end walls 7235, 7245 of the first and second ribs 7233, 7243 of the upper attachment structure 7220 of the mounting bracket 7210. As the threaded nuts 7288 are tightened on the threaded end portions 7284 of the U-bolt fasteners 7282, lower faces of each of the washers 7289 bear against the first and second horizontal end walls 7235, 7245 of the first and second ribs 7233, 7243 of the upper attachment structure 7220 of the mounting bracket 7210 to secure or mount the mounting bracket 7210 to the torque tube beam 150. The U-bolt fasteners 7282 are sized such that the pair of legs 7283 of each of the pair of U-bolt fasteners 7282 extends along respective side walls 158a, 158b of the torque tube beam 150. Advantageously, since cross members 7285 of the U-bolt fasteners 7282 extend across a total width of the lower wall 157 of the torque tube beam 150, the attachment force is distributed across a greater area than would be the case, for example, if a pair of threaded fasteners (like the self-tapping screws 6285 of the fourth embodiment) were used. Hence, the use of a pair of U-bolt fasteners 7383 as part of the first fastener assembly 7280 advantageously provide for a strong and durable attachment structure of the mounting bracket 7210 to the torque tube beam 150, even under high wind load conditions.

As used herein, terms of orientation and/or direction such as upward, downward, forward, rearward, upper, lower, inward, outward, inwardly, outwardly, horizontal, horizontally, vertical, vertically, distal, proximal, axially, radially, etc., are provided for convenience purposes and relate generally to the orientation shown in the Figures and/or discussed in the Detailed Description. Such orientation/direction terms are not intended to limit the scope of the present disclosure, this application and the invention or inventions described therein, or the claims appended hereto.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A mounting bracket for mounting to a torque tube beam of a solar tracker assembly and for supporting respective edge portions of a pair of photovoltaic modules, the mounting bracket comprising:
    an upper support structure, a central attachment structure and a lower projection structure extending in a vertical direction downwardly away from the upper support structure, the mounting bracket including a first end and a spaced apart second end defining a length of the mounting bracket with respect to a first direction and a first side and a second side defining a width of the mounting bracket in a second direction, the first direction and the second direction being mutually orthogonal and transverse to the vertical direction, the mounting bracket bisected by a central vertical plane extending in the first direction;
    the upper support structure of the mounting bracket including a first body and a second body spaced apart and spaced from the central vertical plane by the central attachment structure, the first body including a first upper support surface for supporting an edge portion of a first photovoltaic module and the second body defining a second upper support surface for supporting an edge portion of a second photovoltaic module; and
    the lower projection structure extending vertically downward with respect to the first and second bodies, a first rib extending downwardly from the first body, a second rib extending downwardly from the second body, the first and second ribs being spaced apart and defining a horizontal channel that is open in the vertical direction downwardly away from the upper support structure, a lower portion of the lower projection structure including a through slot, an extent of the through slot in the first direction being sized to receive a torque tube beam.

2. The mounting bracket of claim 1 wherein the mounting bracket comprises a single, unitary structure.

3. The mounting bracket of claim 1 wherein the central attachment structure includes a first side wall and a second side wall spaced apart by a horizontal wall, the horizontal wall being recessed vertically below the first and second bodies of the upper support structure.

4. The mounting bracket of claim 3 wherein the first body of the upper support structure extends from the first side wall of the central attachment structure and the second body of the upper support structure extends from the second side wall of the central attachment structure.

5. The mounting bracket of claim 1 wherein the first and second ribs of the lower projection structure extend vertically downwardly and parallel to the central vertical plane of the mounting bracket.

6. The mounting bracket of claim 1 wherein the lower projection structure includes a first portion adjacent the first end of the mounting bracket, a second portion adjacent the second end of the mounting bracket, and a central portion intermediate the first and second portions, the central portion including the through slot, the through slot being orthogonal to the central vertical plane of the mounting bracket.

7. The mounting bracket of claim 1 wherein the through slot of the lower portion of the lower projection structure comprises a first slot in a lower portion of the first rib and a second slot in a lower portion of the second rib.

8. The mounting bracket of claim 1 wherein the first rib of the lower projection structure includes a first vertical wall and a first horizontal wall the second rib of the lower projection structure includes a second vertical wall and a second horizontal wall.

9. The mounting bracket of claim 1 wherein the first upper support surface of the first body and the second upper support surface of the second body of the upper support structure are substantially planar.

10. The mounting bracket of claim 1 wherein the first upper support surface of the first body of the upper support structure is arcuate and the second upper support surface of the second body of the upper support structure is arcuate, each of the first upper support surface and the second upper support surface having a center of curvature located vertically above the upper support structure.

11. The mounting bracket of claim 10 wherein the first upper support surface and the second upper support surface have substantially identical radii of curvature.

12. The mounting bracket of claim 1 wherein the first upper support surface of the first body of the upper support structure includes a generally planar surface and a first upwardly extending protrusion located in proximity to the first end of the mounting bracket and a second upwardly extending protrusion located in proximity to the second end of the mounting bracket and further wherein the second upper support surface of the second body of the upper support structure includes a generally planar surface and a third upwardly extending protrusion located in proximity to the first end of the mounting bracket and a fourth upwardly extending protrusion located in proximity to the second end of the mounting bracket.

13. The mounting bracket of claim 3 wherein the horizontal wall of the central attachment structure includes a first aperture on one side of the through slot of the lower projection structure and a second aperture on an opposite side of the through slot of the lower projection structure.

14. The mounting bracket of claim 1 wherein the mounting bracket includes a first section on one side of the central vertical plane and a second section on an opposite side of the central vertical plane, the first and second sections being mirror images.

15. A combination of a mounting bracket assembly and a torque tube beam of a solar tracker assembly, the mounting bracket assembly mounted to the torque tube beam and supporting respective edge portions of a pair of photovoltaic modules, the combination comprising:
the torque tube beam including an upper wall and a lower wall spaced apart by first and second vertically extending side walls;
the mounting bracket assembly including:
a mounting bracket including:
an upper support structure, a central attachment structure and a lower projection structure extending in a vertical direction downwardly away from the upper support structure, the mounting bracket including a first end and a spaced apart second end defining a length of the mounting bracket with respect to a first direction and a first side and a second side defining a width of the mounting bracket in a second direction, the first direction and the second direction being mutually orthogonal and transverse to the vertical direction, the mounting bracket bisected by a central vertical plane extending in the first direction;
the upper support structure of the mounting bracket including a first body and a second body spaced apart and spaced from the central vertical plane, the first body including a first upper support surface for supporting an edge portion of a first photovoltaic module and the second body defining a second upper support surface for supporting an edge portion of a second photovoltaic module; and
the lower projection structure extending vertically downward with respect to the first and second bodies, a first rib extending downwardly from the first body, a second rib extending downwardly from the second body, the first and second ribs being spaced apart and defining a horizontal channel that is open in the vertical direction downwardly away from the upper support structure, a lower portion of the lower projection structure including a through slot, an extent of the through slot in the first direction being sized to receive the torque tube beam; and
a fastener assembly including:
a securing strap including a first end section and a second end section spaced apart by an intermediate section and first and second fasteners, the first fastener coupled to the central attachment structure and coupled to the first end section of the securing strap and the second fastener coupled to the central attachment structure and coupled to the second end section of the securing strap, the securing strap extending around the torque tube beam to secure the mounting bracket to the torque tube beam.

16. The combination of claim 15 wherein the first fastener includes a head and a shaft extending from the head, the head bearing against the central attachment structure of the mounting bracket and the shaft extending through a first aperture in the central attachment structure and the second fastener includes a head and a shaft extending from the head, the head bearing against the central attachment structure of the mounting bracket and the shaft extending through a second aperture in the central attachment structure and wherein the fastener assembly further includes first and second nut plates, the first nut plate including a threaded opening receiving a threaded portion of the first fastener and the second nut plate includes a threaded opening receiving a threaded portion of the second fastener, the first end section of the securing strap coupled to the first nut plate such that as the first fastener is tightened, the first end section of the securing strap and the first nut plate move upwardly toward the central attachment structure and the second end section of the securing strap coupled to the second nut plate such that as the second fastener is tightened, the second end section of the securing strap and the second nut plate move upwardly toward the central attachment structure thereby causing the securing strap to bear against the lower wall of the torque tube beam to secure the mounting bracket to the torque tube beam.

17. The combination of claim 15 wherein the central attachment structure of the mounting bracket includes a first side wall and a second side wall spaced apart by a horizontal wall, the horizontal wall being recessed vertically below the first and second bodies of the upper support structure.

18. The combination of claim 17 wherein the first body of the upper support structure extends from the first side wall of the central attachment structure and the second body of the upper support structure extends from the second side wall of the central attachment structure.

19. The combination of claim 15 wherein the first and second ribs of the lower projection structure of the mounting bracket extend parallel to the central vertical plane of the mounting bracket.

20. The combination of claim 15 wherein the lower projection structure of the mounting bracket includes a first portion adjacent the first end of the mounting bracket, a second portion adjacent the second end of the mounting bracket, and a central portion intermediate the first and second portions, the central portion including the through slot, the through slot being orthogonal to the central vertical plane of the mounting bracket.

21. A mounting bracket for mounting to a torque tube beam and supporting photovoltaic modules, the mounting bracket comprising:
an upper support structure, a central attachment structure and a lower projection structure extending downwardly from the upper support structure, the mounting bracket including a first end and a spaced apart second end defining a length of the mounting bracket with respect to a first direction and a first side and a second side defining a width of the mounting bracket in a second direction, the first direction and the second direction being mutually orthogonal and transverse to the vertical direction;
the upper support structure of the mounting bracket including a first body and a second body, the first body and the second body being spaced apart and spaced from a central vertical plane extending in the first direction, the first body including a first upper support surface for supporting a portion of a first photovoltaic module and the second body defining a second upper support surface for supporting a portion of a second photovoltaic module; and
the lower projection structure extending downwardly with respect to the first and second bodies, a first rib extending downwardly from the first body, a second rib extending downwardly from the second body, the first and second ribs being spaced apart and defining a horizontal channel that is open in the vertical direction downwardly away from the upper support structure, a lower portion of the lower projection structure including a through slot, an extent of the through slot in the first direction being sized to receive a torque tube beam.

22. The mounting bracket of claim 21 wherein the first and second ribs of the lower projection structure are substantially parallel.

23. The mounting bracket of claim 21 wherein the first body and the second body are spaced from the central vertical plane by the central attachment structure.

24. The mounting bracket of claim 1 wherein the first and second ribs of the lower projection structure are substantially parallel.

25. The combination of claim 15 wherein first and second ribs of the lower projection structure of the mounting bracket are substantially parallel.

* * * * *